US012640872B2

(12) United States Patent
Farag

(10) Patent No.: US 12,640,872 B2
(45) Date of Patent: May 26, 2026

(54) METHOD AND APPARATUS FOR ROUND-TRIP CARRIER-PHASE OPERATION

(71) Applicant: Samsung Electronics Co., Ltd., Suwon-si (KR)

(72) Inventor: Emad Nader Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 18/347,495

(22) Filed: Jul. 5, 2023

(65) Prior Publication Data

US 2024/0048309 A1 Feb. 8, 2024

Related U.S. Application Data

(60) Provisional application No. 63/466,126, filed on May 12, 2023, provisional application No. 63/456,716, filed on Apr. 3, 2023, provisional application No. 63/440,311, filed on Jan. 20, 2023, provisional application No. 63/411,481, filed on Sep. 29, 2022, provisional application No. 63/395,652, filed on Aug. 5, 2022, provisional application No. 63/392,790, filed on Jul. 27, 2022, provisional application No. 63/392,798, filed on Jul. 27, 2022, provisional application No. 63/390,583, filed on Jul. 19, 2022.

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC .......................... H04L 5/0048; H04W 72/0446
See application file for complete search history.

(56) References Cited

U.S. PATENT DOCUMENTS

| | | |
|---|---|---|
| 11,353,542 B2 | 6/2022 | Da et al. |
| 2022/0043099 A1 | 2/2022 | Da et al. |
| 2023/0180172 A1 | 6/2023 | Zhang et al. |

FOREIGN PATENT DOCUMENTS

| | | |
|---|---|---|
| CN | 110062457 A | 7/2019 |
| CN | 114598987 A | 6/2022 |

(Continued)

OTHER PUBLICATIONS

International Search Report and Written Opinion issued Oct. 31, 2023 regarding International Application No. PCT/KR2023/010388, 9 pages.

(Continued)

*Primary Examiner* — Melvin C Marcelo

(57) ABSTRACT

Methods and apparatuses for round-trip carrier-phase operation in a wireless communication system. A method of operating a user equipment (UE) includes receiving, from a first transmit receive point (TRP), a first downlink (DL) position reference signal (PRS) and measuring a first carrier phase associated with a center frequency of the first DL PRS. The method further includes including, in a measurement report, (i) a carrier phase measurement based on the measurement of the first carrier phase and (ii) a DL reference signal time difference (RSTD) measurement or a UE receive-transmit time difference measurement and transmitting the measurement report.

18 Claims, 16 Drawing Sheets

(56) References Cited

FOREIGN PATENT DOCUMENTS

WO        2021227821 A1    11/2021
WO        WO-2023149995 A1 *   8/2023    ............ H04W 64/00

OTHER PUBLICATIONS

Intel Corporation, "Design Aspects of Carrier Phase Measurements for NR Positioning Enhancements", 3GPP TSG RAN WG1 #109-e, R1-2204807, Apr. 2022, 26 pages.
Moderator (CATT), "FL Summary for Potential Positioning Enhancements", 3GPP TSG RAN WG1 Meeting #103-e, R1-2009314, Nov. 2020, 60 pages.
Extended European Search Report issued May 27, 2025 regarding Application No. 23843361.9, 13 pages.
Moderator (CATT), "FL Summary #1 for NR DL and UL carrier phase positioning", 3GPP TSG RAN WG1 Meeting #112bis-e, R1-2303888, Apr. 2023, 55 pages.
Samsung, "On NR DL and UL Carrier Phase Positioning", 3GPP TSG RAN WGI #112bis-e, R1-2303136, Apr. 2023, 13 pages.
Xiaomi, "Improved accuracy based on NR carrier phase measurement", 3GPP TSG RAN WG1 #109-e, R1-2203824, May 2022, 4 pages.
Moderator (CATT), "FL Summary for improved accuracy based on NR carrier phase measurement", 3GPP TSG RAN WG1 Meeting #109e, R1-2205164, May 2022, 56 pages.
Rapporteur (Intel Corporation), "RAN1 agreements for Rel-18 WI on Expanded and Improved NR Positioning", 3GPP TSG RAN WG1 Meeting #112, R1-2302220, Feb. 2023, 13 pages.

"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.
"3rd Generation Partnership Project; Technical Specification Group Radio Access Network; NR; Physical layer procedures for control (Release 17)", 3GPP TS 38.213 V17.2.0, Jun. 2022, 256 pages.
"3rd Generation Partnership Project; Technical Specification Group Radio Access Network; NR; Physical layer procedures for data (Release 17)," 3GPP TS 38.214 V17.2.0 , Jun. 2022, 228 pages.
"5G; NR; Physical layer measurements (3GPP TS 38.215 version 17.2.0 Release 17)", ETSI TS 138 215 V17.2.0, Sep. 2022, 33 pages.
"5G; NR; Medium Access Control (MAC) protocol specification (3GPP TS 38.321 version 17.1.0 Release 17)", ETSI TS 138 321 V17.1.0 , Aug. 2022, 244 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.2.0, Jun. 2022, 584 pages.
"LTE; 5G; LTE Positioning Protocol (LPP) (3GPP TS 37.355 version 17.2.0 Release 17)", ETSI TS 137 355 V17.2.0, Oct. 2022, 349 pages.
"5G; NG-RAN; NR Positioning Protocol A (NRPPa) (3GPP TS 38.455 version 17.2.0 Release 17)", ETSI TS 138 455 V17.2.0, Oct. 2022, 199 pages.

* cited by examiner

600

Symbol
Number

PRB
n+1

PRB
n

Symbols for DL PRS

700

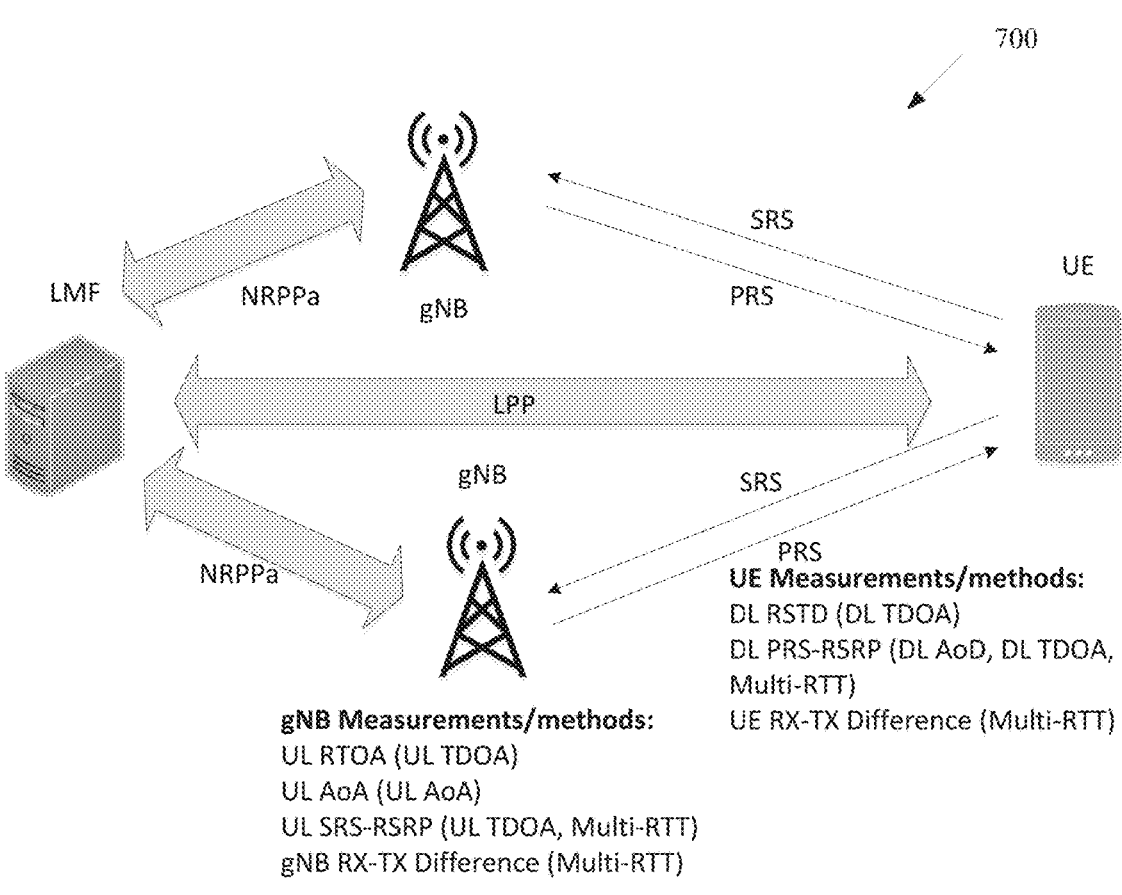

gNB Measurements/methods:
UL RTOA (UL TDOA)
UL AoA (UL AoA)
UL SRS-RSRP (UL TDOA, Multi-RTT)
gNB RX-TX Difference (Multi-RTT)

UE Measurements/methods:
DL RSTD (DL TDOA)
DL PRS-RSRP (DL AoD, DL TDOA, Multi-RTT)
UE RX-TX Difference (Multi-RTT)

AoA: Angle of Arrival
AoD: Angle of Departure
LMF: Location Management Function
LPP: LTE Positioning Protocol
NRPPa: NR Positioning Protocol annex
PRS: Positioning Reference Signal RSRP: Reference Signal Receive Power
RSTD: Reference Signal Time Difference
RTOA: Relative Time of Arrival
RTT: Round Trip Time
SRS: Sounding Reference Signal
TDOA: Time Difference Of Arrival
RSRPP: Reference Signal Received Path Power

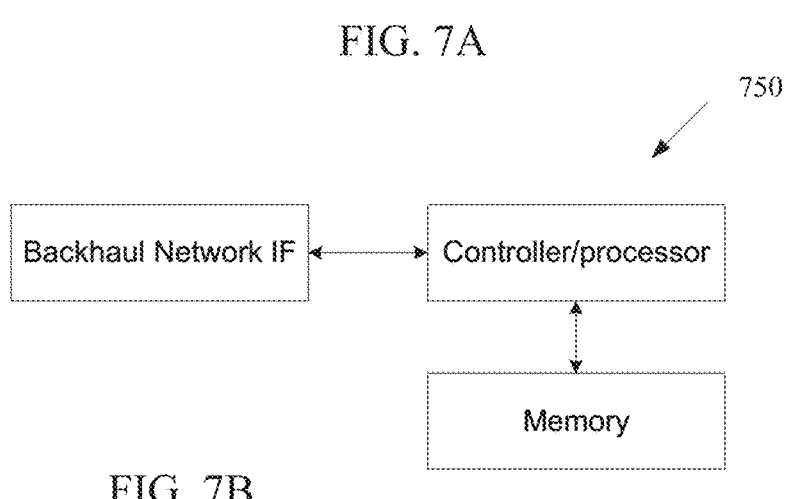

For phase continuity after removing CP $$\varphi_{l+1} = \left(2\pi f_c N_u^\mu T_c\right) \bmod 2\pi$$

1900

$\varphi$: symbol phase

1950

$\phi_1 = -2\pi (L/\lambda) \sin \theta$ $L \sin \theta$ $\theta$ $L$

Tx 0

Tx 1

$\phi_0 = 0$ $\phi_1 = 0$ $\phi_0$ and $\phi_1$ are the initial phase of each transmitter

2000 gNB1
(TRP1)

gNB2
(TRP2)

UE          Reference unit
(RU)

METHOD AND APPARATUS FOR ROUND-TRIP CARRIER-PHASE OPERATION

CROSS-REFERENCE TO RELATED APPLICATIONS AND CLAIM OF PRIORITY

The present application claims priority to: U.S. Provisional Patent Application No. 63/390,583, filed on Jul. 19, 2022; U.S. Provisional Patent Application No. 63/392,790, filed on Jul. 27, 2022; U.S. Provisional Patent Application No. 63/392,798, filed on Jul. 27, 2022; U.S. Provisional Patent Application No. 63/395,652, filed on Aug. 5, 2022; U.S. Provisional Patent Application No. 63/411,481, filed on Sep. 29, 2022; U.S. Provisional Patent Application No. 63/440,311, filed on Jan. 20, 2023; U.S. Provisional Patent Application No. 63/456,716, filed on Apr. 3, 2023; and U.S. Provisional Patent Application No. 63/466,126, filed on May 12, 2023. The contents of the above-identified patent documents are incorporated herein by reference.

TECHNICAL FIELD

The present disclosure relates generally to wireless communication systems and, more specifically, the present disclosure relates to a round-trip carrier-phase operation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a round-trip carrier-phase operation in a wireless communication system.

In one embodiment, a user equipment (UE) is provided. The UE includes a transceiver configured to receive, from a first transmit receive point (TRP), a first downlink (DL) position reference signal (PRS). The UE further includes a processor operably coupled to the transceiver. The processor is configured to measure a first carrier phase associated with a center frequency of the first DL PRS and include, in a measurement report, (i) a carrier phase measurement based on the measurement of the first carrier phase and (ii) a DL reference signal time difference (RSTD) measurement or a UE receive-transmit time difference measurement. The transceiver is further configured to transmit the measurement report.

In another embodiment, a base station (BS) is provided. The BS includes a transceiver configured to receive, from a UE, a sounding reference signal (SRS) for positioning and a processor operably coupled to the transceiver. The processor is configured to measure a carrier phase associated with a center frequency of the SRS, include, in a first measurement report, (i) a first carrier phase measurement based on the measurement of the carrier phase (ii) an uplink (UL) relative time of arrival (RTOA) measurement or a BS receive-transmit time difference measurement, and transmit, to a location management function (LMF), the first measurement report.

In yet another embodiment, a method of operating a UE is provided. The method includes receiving, from a first TRP, a first DL PRS and measuring a first carrier phase associated with a center frequency of the first DL PRS. The method further includes including, in a measurement report, (i) a carrier phase measurement based on the measurement of the first carrier phase and (ii) a DL RSTD measurement or a UE receive-transmit time difference measurement and transmitting the measurement report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A illustrates an example of overall positioning architecture according to embodiments of the present disclosure;

FIG. 7B illustrates an example of LMF according to embodiments of the present disclosure;

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.2.0, "NR; Physical channels and modulation"; 3GPP TS 38.212 v17.2.0, "NR; Multiplexing and Channel coding"; 3GPP TS 38.213 v17.2.0, "NR; Physical Layer Procedures for Control"; 3GPP TS 38.214 v17.2.0, "NR; Physical Layer Procedures for Data"; 3GPP TS 38.215 v17.2.0, "NR; Physical Layer Measurements"; 3GPP TS 38.321 v17.1.0, "NR; Medium Access Control (MAC) protocol specification," 3GPP TS 38.331 v17.1.0, "NR; Radio Resource Control (RRC) Protocol Specification"; and 3GPP TS 36.213 v17.2.0, "Evolved Universal Terrestrial Radio Access (E-UTRA); Physical layer procedures."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (1-D-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
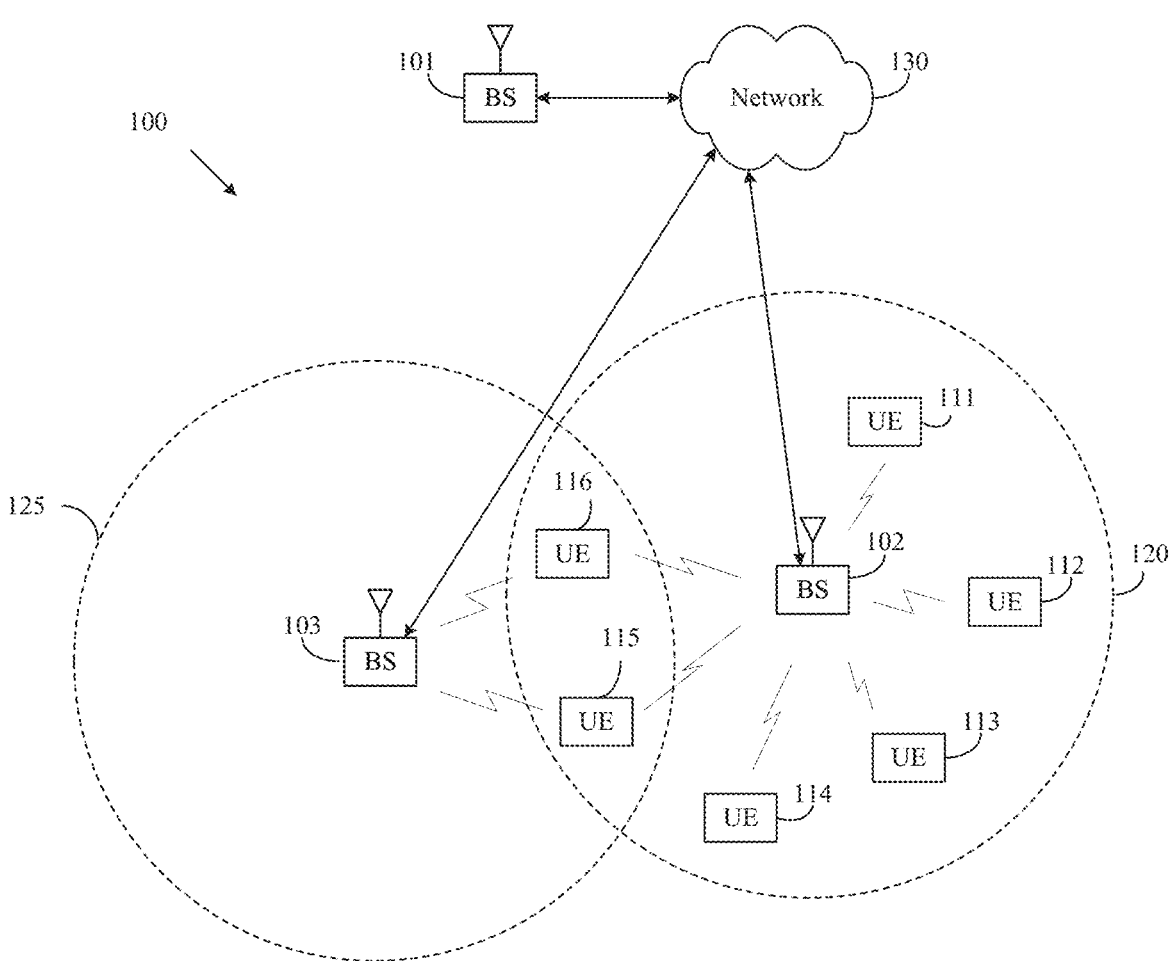
FIG. 1 illustrates an example of wireless network according to embodiments of the present disclosure.
Figure 2:
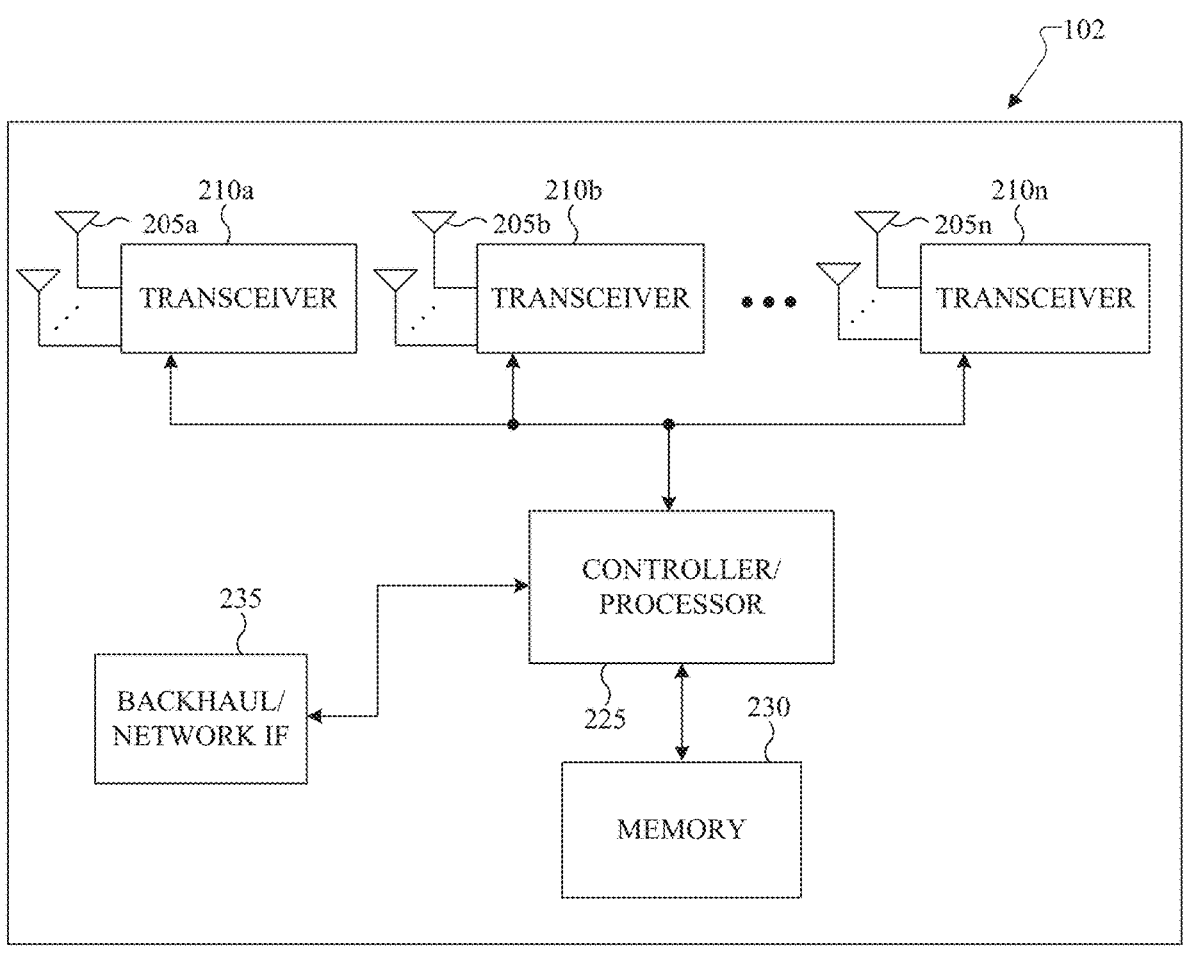
FIG. 2 illustrates an example of gNB according to embodiments of the present disclosure.
Figure 3:
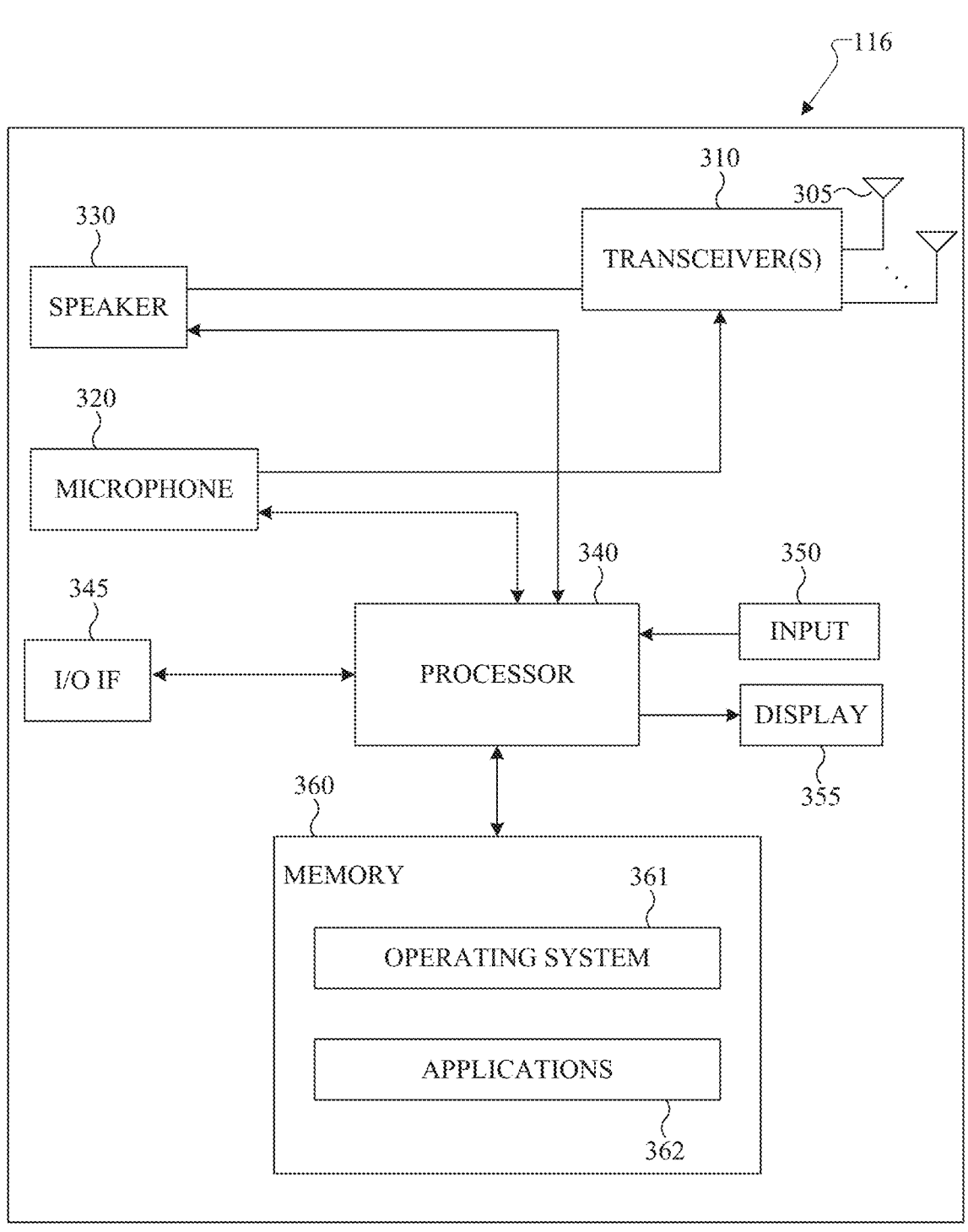
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3' generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a round-trip carrier-phase operation in a wireless communication system. In certain embodiments, and one or more of the gNBs 101-103 includes circuitry, programing, or a combination thereof, for a round-trip carrier-phase operation in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channels and/or signals and the transmission of DL channels and/or signals by the transceivers 210a-210n in accordance with well-known principles. The controller/processor 225 could support additional functions as well, such as more advanced wireless communication functions and/or positioning functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for a round-trip carrier-phase operation in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals and the transmission of UL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a round-trip carrier-phase operation in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
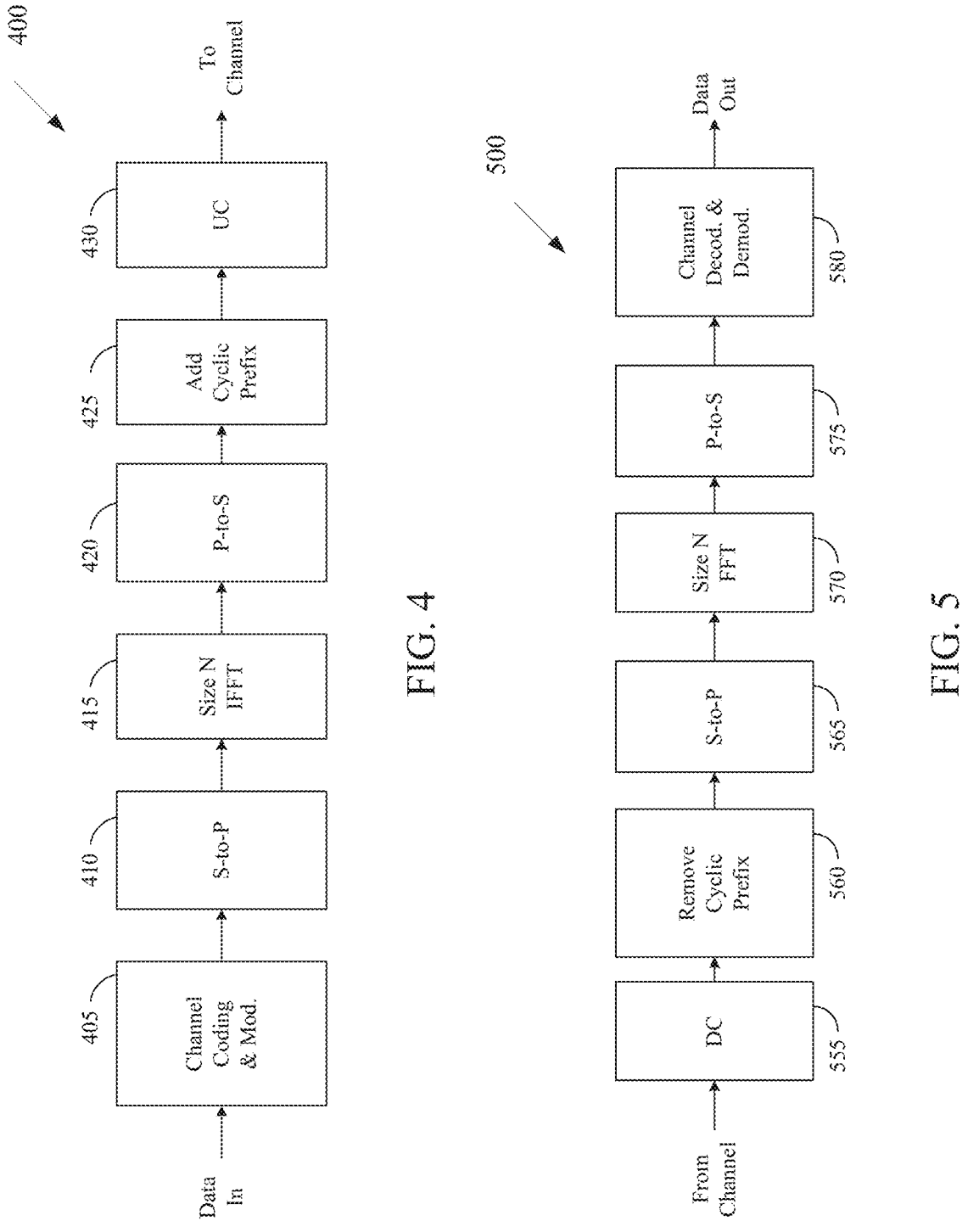
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the transmit path 400 and the receive path 500 are configured to support a round-trip carrier-phase operation in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also TS 38.211). In addition, a slot can have symbols for SL communications. A UE can be configured one or more bandwidth parts (BWPs) of a system BW for transmissions or receptions of signals or channels.

The time-continuous signal $$s_l^{(p,\mu)}(t)$$

on antenna port p and sub-carrier spacing configuration μ for OFDM symbol l in a subframe for any physical channel or signal, except PRACH is given by:

$$\begin{cases} \bar{s}_l^{(p,\mu)}(t) & t_{start,l}^{\mu} \le t < t_{start,l}^{\mu} + T_{symb,l}^{\mu} \\ 0 & \text{otherwise} \end{cases} \text{ where:}$$

$$l \in \{0, 1, \ldots, N_{slot}^{subframe,\mu} \cdot N_{symb}^{slot} - 1\};$$

$$N_{slot}^{subframe,\mu}$$

is the number of slots in a subframe with sub-carrier spacing configuration μ;

$$N_{symb}^{slot}$$

is the number of symbols in a slot, for example 14 symbols in a slot;

$$t_{start,l}^{\mu}$$

is the start of symbol l;

$$T_{symb,l}^{\mu} = (N_u^{\mu} + N_{CP,l}^{\mu})T_c$$

is the duration of symbol l, $$N_u^\mu = 2048\kappa \cdot 2^{-\mu} \text{ and } N_{CP,l}^\mu$$

is the CP length for symbol l, $$N_{CP,l}^\mu$$

is given by $$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases};$$

$\kappa{=}64$ which is the ratio between $T_s$ and $T_c \cdot T_s{=}1/(\Delta f_{ref} \cdot N_{f,ref})$, with $\Delta f_{ref}{=}15$ kHz and $N_{f,ref}{=}2048$. $T_c{=}1/(\Delta f_{max} \cdot N_f)$, with $\Delta f_{max}{=}480$ kHz and $N_f{=}4096$;

$$\bar{s}_l^{(p,\mu)}(t) = \sum_{k=0}^{N_{grid,x}^{size,\mu} \cdot N_{sc}^{RB}-1} a_{k,l}^{(p,\mu)} e^{j2\pi\left(k+k_0^\mu - \frac{N_{grid,x}^{size,\mu} \cdot N_{sc}^{RB}}{2}\right)\Delta f\left(t-N_{CP,l}^\mu T_c - t_{start,l}^\mu\right)};$$

$$N_{grid,x}^{size,\mu}$$

is a resource grid size in resource blocks for a carrier with sub-carrier spacing $\mu$, x provides the transmission direction and can be UL or DL or SL, $$N_{grid,x}^{size,\mu}$$

is indicated by higher layer signaling, where a resource block has $$N_{sc}^{RB}$$

sub-carriers, in one example, $$N_{sc}^{RB}$$

can be 12 sub-carriers;

$$N_{grid,x}^{start,\mu}$$

is the starting position of the resource grid of a carrier with sub-carrier spacing $\mu$ provided by higher layer parameter offsetToCarrier in the SCS-SpecificCarrier IE, which is defined as an offset in frequency domain between Point A (lowest subcarrier of common RB 0) and the lowest usable subcarrier on this carrier in number of PRBs (using the subcarrierSpacing defined for this carrier);

$\Delta f$ is the sub-carrier spacing corresponding to the sub-carrier spacing configuration, $\Delta f{=}15 \cdot 2^\mu$ kHz, where $\mu{=}0, 1, 2, 3,$ and 4 for sub-carrier spacing; 15, 30, 60, 120 and 240 kHz respectively, the frequency location of a subcarrier refers to the center frequency of that subcarrier;

$$a_{k,l}^{(p,\mu)}$$

is the resource element value for sub-carrier k and symbol l, on antenna port p and with sub-carrier configuration $\mu$; and $$k_0^\mu = \frac{N_{grid,x}^{start,\mu} + N_{grid,x}^{size,\mu}}{2} N_{SC}^{RB} - \frac{N_{grid,x}^{start,\mu_0} + N_{grid,x}^{size,\mu_0}}{2} N_{sc}^{RB} \cdot 2^{\mu_0-\mu},$$

with $\mu_0$ being the largest sub-carrier spacing configuration configured by the higher layer parameters scs-SpecificCarrierList.

The generated OFDM symbol, $$s_l^{(p,\mu)}(t),$$

is then up converted to the carrier frequency $f_c$ using the following equation:

$$s_l^{(p,\mu)}(t) = \text{Re}\left\{s_l^{(p,\mu)}(t) \cdot e^{j2\pi f_0\left(t-t_{start,l}^\mu - N_{CP,l}^\mu T_c\right)}\right\}.$$

In a downlink, the UE receives DL positioning reference signal (PRS), where a positioning frequency layer consists of one or more DL PRS resources sets. Each DL PRS resource set consists of one or more DL PRS resources. The reference signal sequence is defined by:

$$r(m) = \frac{1}{\sqrt{2}}((1 - 2c(2m)) + j(1 - 2c(2m + 1))).$$

The pseudo-random sequence c(n) is a length-31 Gold sequence defined as: $c(n){=}(x_1(n{+}N_c){+}x_2(n{+}N_c))$ mod 2 where: $N_c{=}1600$, $x_1(n{+}31){=}(x_1(n{+}3){+}x_1(n))$ mod 2, and $x_1(n{+}31){=}(x_2(n{+}3){+}x_2(n{+}2){+}x_2(n{+}1){+}x_2(n))$ mod 2.

The first m-sequence is initialized with $x_1(0){=}1$, and $x_1(n){=}0$, for $n{=}1 \ldots 30$. The second m-sequence is initialized with $c_{init}$, where $c_{init}$:

$$c_{init} = \left(2^{22}\left\lfloor \frac{n_{ID,seq}^{PRS}}{1024}\right\rfloor + \right.$$

$$\left. 2^{10}\left(N_{symb}^{slot} n_{s,f}^\mu + l + 1\right)\left(2\left(n_{ID,seq}^{PRS} \bmod 1024\right) + 1\right) + \left(\left(n_{ID,seq}^{PRS} \bmod 1024\right)\right)\right) \bmod 2^{31}$$

where $$N_{symb}^{slot}$$

is the number of symbols per slot, $$n_{s,f}^{\mu}$$

is the slot number, l is the symbol number within a slot and $$n_{ID,seq}^{PRS}$$

is a higher layer provided parameter (dl-PRS-Sequen-ceID-r16), with $$n_{ID,seq}^{PRS} \in \{0, 1, \dots , 4095\}.$$

The DL PRS sequence is mapped to resource elements $$a_{k,l}^{(p,\mu)}$$

within a slot, where k is the sub-carrier frequency, l is the symbol number within the slot, p is the antenna port, which for DL PRS is p=5000 and μ is the sub-carrier spacing configuration, by:

$$a_{k,l}^{(p,\mu)} = \beta_{PRS} r(m)$$

where: $\beta_{PRS}$ is a scaling factor, $$m = 0, 1, \dots , k = m K_{comb}^{PRS} + \left( \left( k_{offset}^{PRS} + k' \right) \bmod K_{comb}^{PRS} \right), K_{comb}^{PRS}$$

is the comb size, which is given by higher layer parameter dl-PRS-CombSizeN, with $$K_{comb}^{PRS} \in \{2, 4, 6, 12\}, k_{offset}^{PRS}$$

is the sub-carrier offset, which is given by higher layer parameter dl-PRS-ReOffset, with $$k_{offset}^{PRS} \in \{0, 1, \dots , K_{comb}^{PRS} - 1\},$$

k' is a sub-carrier offset that is a function of the symbol number within a slot a given by TABLE 1.

$$l = l_{start}^{PRS}, l_{start}^{PRS} + 1, \dots , l_{start}^{PRS} + L_{PRS} - 1, l_{start}^{PRS}$$

is the first DL PRS symbol in a slot, which is given by higher layer parameter dl-RS-ResourceSymbolOffset, $L_{PRS}$ is the number of DL PRS symbols in a slot, with $L_{PRS} \in \{2, 4, 6, 12\}$.

TABLE 1

| $K_{comb}^{PRS}$ | Symbol number within PRS resource $1 - 1_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

The allowed combination of is one of $$\{L_{PRS}, K_{comb}^{PRS}\}$$

is one of {{2, 2}, {4, 2}, {6, 2}, {12, 2}, {4, 4}, {12, 4}, {6, 6}, {12, 6}, {12, 12}}.

Figure 6:
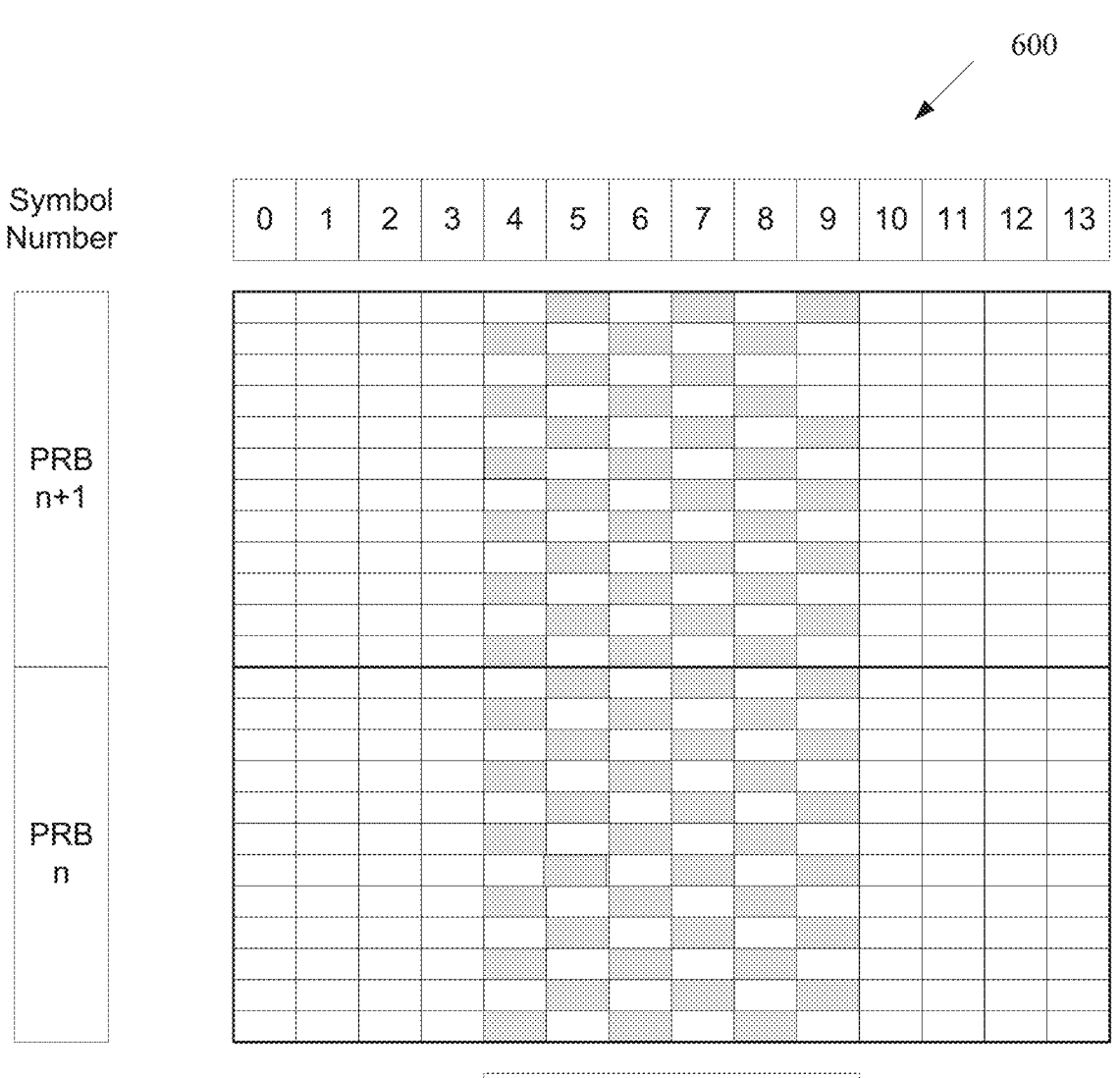
FIG. 6 illustrates an example of DL PRS resources within a slot according to embodiments of the present disclosure.

FIG. 6 illustrates an example of DL PRS resources within a slot 600 according to embodiments of the present disclosure. The embodiment of the DL PRS resources within a slot 600 illustrated in FIG. 6 is for illustration only.

FIG. 6 illustrates an example DL PRS resources within a slot, with $$K_{comb}^{PRS} = 2, k_{offset}^{PRS} = 0, L_{PRS} = 6, \text{ and } l_{start}^{PRS} = 4.$$

In an uplink, a UE can transmit positioning sounding reference signal (SRS). A positioning SRS is configured by higher layer IE SRS-PosResource.

The positioning SRS sequence is a low PAPR sequence of length $$N_{ZC} = M_{sc,b}^{SRS}$$

given by:

$$r^{(p)}(n, l') = r_{u,v}^{(\alpha,\delta)}(n) = e^{j\alpha n} \bar{r}_{u,v}(n),$$

$$0 \leq n < M_{ZC} \text{ where } M_{ZC} = m N_{sc}^{RB}/2^{\delta}, \delta = \log(K_{TC}),$$

with $K_{TC}$ being the transmission comb number is provided in higher layer IR transmissionComb, $K_{TC} \in \{2, 4, 8\}$. l' is the positioning SRS symbol within a positioning SRS resource of a slot, $$l' \in \{0, 1, \dots , N_{symb}^{SRS} - 1\}, N_{symb}^{SRS}$$

is the number of SRS symbols in a slot. For positioning SRS, there is one antenna port, the cyclic shift α is given by $$\alpha = 2\pi \frac{n_{SRS}^{cs}}{n_{SRS}^{cs,max}},$$

with $$n_{SRS}^{cs}$$

being provided by higher layer in IE transmissionComb, $$n_{SRS}^{cs,max}$$

depends on $K_{TC}$ as illustrated in TABLE 2.

TABLE 2

| $K_{TC}$ | $n_{SRS}^{cs,\,max}$ |
| --- | --- |
| 2 | 8 |
| 4 | 12 |
| 8 | 6 | u is the group number $u \in \{0, 1, \ldots, 29\}$, v is the base sequence number, with $v \in \{0, 1\}$, if $6 \le N_{ZC} \le 60$ and $v \in \{0\}$, if $60 < N_{ZC}$. The base sequence, $\bar{r}_{u,v}(n)$, is generated as follows: (1) for $N_{ZC} \in \{6, 12, 18, 24\}$, $\bar{r}_{u,v}(n) = e^{j\varphi(n)\pi/4}$, with $0 \le n < M_{ZC} - 1$. $\varphi(n)$ is given by TS 38.211; (2) for $N_{ZC} = 30$, $$\bar{r}_{u,v}(n) = e^{-j\frac{\pi(u+1)(n+1)(n+2)}{31}},$$

with $0 \le n < M_{ZC} - 1$; and (3) for $N_{ZC} \ge 30$, $\bar{r}_{u,v}(n) = x_q(n \bmod N_{ZC})$, $$x_q(n) = e^{-j\frac{\pi q m(m+1)}{N_{ZC}}}.$$

$N_{ZC}$ is the largest prime number less than $$M_{ZC} \cdot q = \lfloor \bar{q} + 1/2 \rfloor + v \cdot (-1)^{\lfloor 2\bar{q} \rfloor} \cdot \bar{q} = N_{ZC}\frac{u+1}{31}.$$

The sequence group u is given by:

$$u = \left(f_{gh}(n_{s,f}^{\mu}, l') + n_{ID}^{SRS}\right). \text{ Where, } n_{ID}^{SRS}$$

is provided by higher layer parameter sequenceID, with $$n_{ID}^{SRS} \in \{0, 1, \ldots, 65535\}.$$

Higher layer parameter groupOrSeqeunceHopping determines the values of u and v:

if groupOrSequenceHopping equals "neither," neither group, nor sequence hopping may be used and $$f_{gh}(n_{s,f}^{\mu}, l') = 0, \text{ and } v = 0;$$

if groupOrSequenceHopping equals "groupHopping," group hopping but not sequence hopping is used and $$v = 0, \text{ and } f_{gh}(n_{s,f}^{\mu}, l') =$$

$$\left(\sum_{m=0}^{7} c\left(8\left(n_{s,f}^{\mu} N_{symb}^{slot} + l_0 + l'\right) + m\right) \cdot 2^m\right) \bmod 30, \ N_{symb}^{slot}$$

is the number of symbols in a slots, $l_0$ is the first positioning SRS symbols in the slot, and c(n) a length-31 Gold sequence defined as $c(n) = (x_1(n+N_c) + x_2(n+N_c)) \bmod 2$, with $N_c = 1600$, $x_1(n+31) = (x_1(n+3) + (n))$ mod 2, $x_1(n+31) = (x_2(n+3) + x_2(n+2) + x_2(n+1) + x_2(n))$ mod 2, the first m-sequence is initialized with $x_1(0) = 1$, and $x_2(n) = 0$, for $n = 1 \ldots 30$. The second m-sequence is initialized with emit, where $$c_{init} = n_{ID}^{SRS};$$

and
if groupOrSequenceHopping equals "sequenceHopping," sequence hopping but not group hopping is used and $$f_{gh}(n_{s,f}^{\mu}, l') = 0 \text{ and } v = \begin{cases} c\left(n_{s,f}^{\mu} N_{symb}^{slot} + l_0 + l'\right) & M_{sc,b}^{SRS} \ge 6N_{sc}^{RB} \\ 0 & \text{otherwise} \end{cases}$$

$$N_{symb}^{slot}$$

is the number of symbols in a slots, $l_0$ is the first positioning SRS symbols in the slot, and c(n) a length-31 Gold sequence as previously defined.

The positioning SRS sequence, $r^{(p)}(n, l')$, is mapped to resource elements $$a_{k,l}^{(p)}$$

within a slot, where k is the sub-carrier frequency, 1 is the symbol number within the slot and p is the antenna port, where for positioning SRS there is one antenna port, by $$a_{k,l}^{(p)} = \beta_{SRS} r^{(p)}(k', l'), \ l = l' + l_0 \text{ where } \beta_{SRS}$$

is a scaling factor, $$k' = 0, 1, \ldots, M_{sc,b}^{SRS} - 1, \ M_{sc,b}^{SRS} = m_{SRS,b} N_{SC}^{RB}/K_{TC}, \ m_{SRS,b}$$

is provided by TS 38.211, and $$l' = 0, 1, \ldots, N_{symb}^{SRS} - 1.$$

$l = l' + l_0$, with $l_0$ the first positioning SRS symbols in the slot, where $l_0 \in \{0, 1, \ldots, 13\}$.

$$k = K_{TC}k' + k_0^{(p)}, K_{TC}$$

in the transmission comb number as previously described, $$k_0^{(p)} = \bar{k}_0^{(p)} + \sum_{b=0}^{B_{SRS}} K_{TC} M_{sc,b}^{SRS} n_b,$$

$$\bar{k}_0^{(p)} = n_{shift} N_{sc}^{RB} + \left(k_{TC}^{(p)} + k'_{offset}\right) \bmod K_{TC}, k_{TC}^{(p)} = \bar{k}_{TC}$$

for positioning SRS, $\bar{k}_{TC}$ is the transmission comb offset included within higher layer IE transmissionComb, with $$\bar{k}_{TC} \in \{0, 1, \dots , K_{TC} - 1\}, k'_{offset}$$

is a symbol dependent sub-carrier offset given by Table 3, $n_{shift}$ is given by higher layer parameter freqDomainShift and it adjusts the frequency allocation with respect to a reference point. If $$N_{BWP}^{start} \le n_{shift}$$

the reference point for $$k_0^{(p)}$$

is sub-carrier 0 in common resource block 0, otherwise the reference point is the lowest subcarrier of the BWP. $n_b$ is a frequency positioning index. For positioning SRS, $B_{SRS}=0$, $b_{hop}=0$, and frequency hopping is disable. $n_b$ is given by:

$$n_b = \left\lfloor \frac{2n_{RRC}}{m_{SRS,b}} \right\rfloor \bmod N_b,$$

$n_{RRC}$ is given Dy higher layer parameter freqDomainPosition, and $m_{SRS,b}$ and $N_b$ are determined by TS 38.211 with $b=B_{SRS}$ and the configured value of $C_{SRS}$.

surement, and NR E-CID DL CSI-RS RRM measurement. NG-RAN measurements for positioning include; UL relative time of arrival (UL-RTOA), UL angle of arrival (UL AoA), UL SRS reference signal received power (UL SRS-RSRP), UL SRS reference signal received path power (UL SRS-RSRPP) and gNB Rx-Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

Positioning schemes can be UE-based, i.e., the UE determines the location or UE-assisted (e.g., location management function (LMF) based), i.e., UE provides measurements for a network entity (e.g., LMF) to determine the location, or NG-RAN node assisted (i.e., NG-RAN node such as gNB provides measurement to LMF). LTE positioning protocol (LPP) (e.g., as illustrated in TS 37.355), first introduce for LTE and then extended to NR is used for communication between the UE and LMF. NR positioning protocol annex (NRPPa) (e.g., as illustrated in TS 38.455) is used for communication between the gNB and the LMF. FIG. 7A illustrates the overall positioning architecture along with positioning measurements and methods.

FIG. 7A illustrates an example of overall positioning architecture 700 according to embodiments of the present disclosure. The embodiment of the overall positioning architecture 700 illustrated in FIG. 7A is for illustration only.

FIG. 7B illustrates an example of LMF 750 according to embodiments of the present disclosure. The embodiment of the LMF 750 illustrated in FIG. 7B is for illustration only.

FIG. 7B illustrates an example LMF according to this disclosure. The embodiment of the LMF shown in FIG. 7B is for illustration only. However, LMFs come in a wide variety of configurations, and FIG. 7B does not limit the scope of this disclosure to any particular implementation of an LMF.

As shown in FIG. 7B, the LMF includes a controller/processor, a memory, and a backhaul or network interface.

The controller/processor can include one or more processors or other processing devices that control the overall operation of the LMF. For example, the controller/processor can support functions related to positioning and location

TABLE 3

| | | | | $k_{offset}^0, k_{offset}^1, \dots , k_{offset}^{N_{symb}^{SRS}-1}$ | |
|---|---|---|---|---|---|
| $K_{TC}$ | $N_{symb}^{SRS} = 1$ | $N_{symb}^{SRS} = 2$ | $N_{symb}^{SRS} = 4$ | $N_{symb}^{SRS} = 8$ | $N_{symb}^{SRS} = 12$ |
| 2 | 0 | 0, 1 | 0, 1, 0, 1 | — | — |
| 4 | — | 0, 2 | 0, 2, 1, 3 | 0, 2, 1, 3, 0, 2, 1, 3 | 0, 2, 1, 3, 0, 2, 1, 3, 0, 2, 1, 3 |
| 8 | — | — | 0, 4, 2, 6 | 0, 4, 2, 6, 1, 5, 3, 7 | 0, 4, 2, 6, 1, 5, 3, 7, 0, 4, 2, 6 |

NR supports positioning on the Uu interface. In the DL, positioning reference signal (PRS) can be transmitted by a gNB to a UE to enable the UE to perform positioning measurements. In the UL, a UE can transmit positioning sounding reference signal (SRS) to enable a gNB to perform positioning measurements. UE measurements for positioning include; DL PRS reference signal received power (DL PRS RSRP), DL PRS reference signal received path power (DL PRS RSRPP), DL reference signal time difference (DL RSTD), UE Rx-Tx time difference, NR enhanced cell ID (E-CID) DL SSB radio resource management (RRM) measervices. Any of a wide variety of other functions can be supported in the LMF by the controller/processor. In some embodiments, the controller/processor includes at least one microprocessor or microcontroller.

The controller/processor is also capable of executing programs and other processes resident in the memory, such as a basic OS. In some embodiments, the controller/processor supports communications between entities, such as gNB and UE and supports protocols such as LPP and NRPPa. The controller/processor can move data into or out of the memory as required by an executing process.

The controller/processor is also coupled to the backhaul or network interface. The backhaul or network interface allows the LMF to communicate with other devices or systems over a backhaul connection or over a network. The interface can support communications over any suitable wired or wireless connection(s). For example, when the LMF is implemented as part of a cellular communication system or wired or wireless local area network (such as one supporting 5G, LTE, or LTE-A), the interface can allow the LMF to communicate with gNBs or eNBs or other network elements over a wired or wireless backhaul connection. The interface includes any suitable structure supporting communications over a wired or wireless connection, such as an Ethernet or RF transceiver.

The memory is coupled to the controller/processor. Part of the memory can include a RAM, and another part of the memory can include a Flash memory or other ROM. In certain embodiments, a plurality of instructions, such as a location management algorithm is stored in memory. The plurality of instructions are configured to cause the controller/processor to perform positioning or location services algorithms.

The positioning solutions are provided for release 16 targeting the following commercial requirements for commercial applications as shown in TABLE 4.

TABLE 4

| Requirement characteristic | Requirement target |
| --- | --- |
| Horizontal Positioning Error | Indoor: 3 m for 80% of the UEs<br>Outdoor: 10 m for 80% of the UEs |
| Vertical Positioning Error | Indoor: 3 m for 80% of the UEs<br>Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL time difference of arrival (DL-TDOA), using positioning reference signals (PRS) for time of arrival measurements. NR also supports UL time difference of Arrival (UL-TDOA), using sounding reference signals (SRS) for time of arrival measurements.

NR also supports round-trip time (RTT) with one or more neighboring gNBs or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, terrestrial beacon system (TBS), as well as sensors within the UE such as accelerometers, gyroscopes, magnetometers, etc. Some of the UE sensors are also known as Inertial Measurement Unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (see TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases. The study focused on identifying positioning use cases and requirements for V2X and public safety as well as identifying potential deployment and operation scenarios. The outcome of the study item is included in TR 38.845. V2X positioning requirements depend on the service the UE operates, and are applicable to absolute and relative positioning. Use cases include indoor, outdoor and tunnel areas, within network coverage or out of network coverage; as well as positioning with GNSS-based positioning available, or not available, or not accurate enough; and positioning with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range.

The 5G system can also support determining the velocity of a UE with a speed accuracy better that m/s and a 3-Dimension direction accuracy better than 5 degrees. Public safety positioning is to be supported indoor and outdoor, with in network coverage or out of network coverage; as well as positioning with GNSS-based positioning available, or not available, or not accurate enough. Public safety positioning use case target a 1-meter horizontal accuracy and a vertical accuracy of 2 m (absolute) or 0.3 m (relative).

In terms of deployment and operation scenarios, TR 38.845 has identified the following: (1) for network coverage: In-network coverage, partial network coverage as well as out-of-network coverage. In addition to scenarios with no GNSS and no network coverage; (2) radio link Uu interface (UL/DL interface) based solutions, PC5 interface (SL interface) based solutions and their combinations (hybrid solutions). As well as RAT-independent solutions such as GNSS and sensors; (3) positioning calculation entity: Network-based positioning when the positioning estimation is performed by the network and UE-based positioning when the positioning estimation is performed by the UE; (4) UE Type: For V2X UEs, this can be a UE installed in a vehicle, a road side unit (RSU), or a vulnerable road user (VRU). Some UEs can have distributed antennas, e.g., multiple antenna patterns that can be leveraged for positioning. UEs can have different power supply limitations, for example PUEs or handheld UEs have limited energy supply compared to other UEs; and (5) spectrum: This can include licensed spectrum and unlicensed spectrum for the Uu interface and the PC5 interface; as well as ITS-dedicated spectrum for the PC5 interface.

Figure 8:
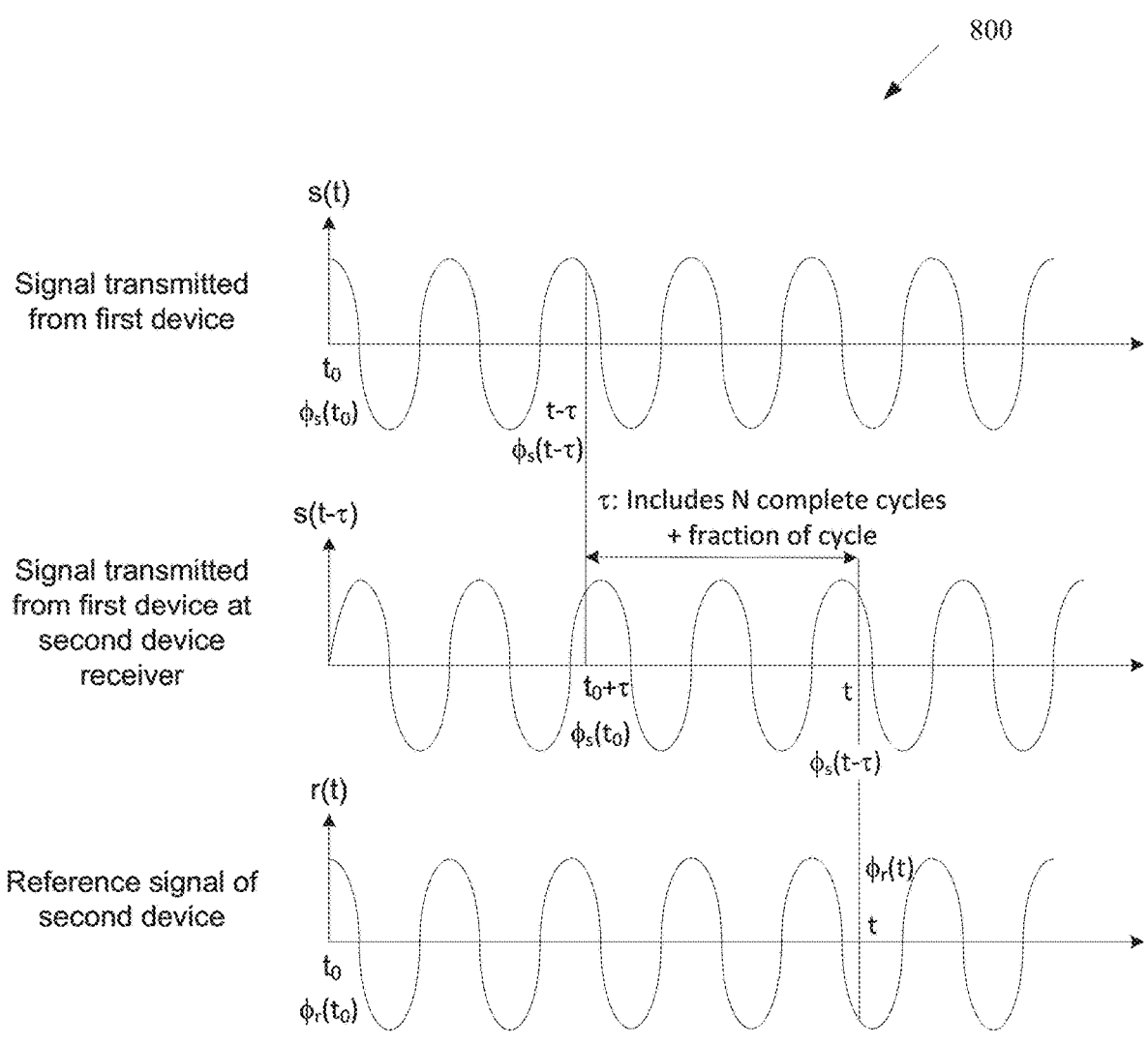
FIG. 8 illustrates an example of signal transmissions according to embodiments of the present disclosure.

FIG. 8 illustrates an example of signal transmissions 800 according to embodiments of the present disclosure. The embodiment of the signal transmissions 800 illustrated in FIG. 8 is for illustration only.

Carrier phase method can be used for positioning to provide a more accurate positioning estimate. Carrier phase (CP) positioning relies on measuring a carrier phase at the RF frequency of a signal transmitted from one device (e.g., device A) and received by another device (e.g., device B). The carrier phase measured at device B is a function of the propagation time, and consequently the propagation distance, from transmitter of device A to the receiver of device B. Device A and device B can be a gNB and a UE respectively or vice versa. In case of PC5 (sidelink) air interface device A can be a first UE and device B can be a second UE.

As illustrated in FIG. 8, signal $s(t-\tau)$ is transmitted from a first device at time $t-\tau$ and arrives at a second device at time t. A reference signal at the second device is $r(t)$. Consider a signal $s(t)=\cos \varphi_s(t)$, where $\varphi_s(t)$ is the phase of the signal at time t. The phase at time $t_0$ is given by $\varphi_s(t_0)$. $\varphi_s(t_0)$ and $\varphi_s(t)$ are related as follows:

$$\phi_s(t) = \phi_s(t_0) + 2\pi \int_{t_0}^{t} f(s)ds. \qquad \text{(equation (1))}$$

(equation (1)). Where, $f(s)$ is the frequency of signal $s(t)$ at time s. If the frequency is constant over time and equals $f_s$, the equation (1) becomes: $\varphi_s(t)=\varphi_s(t_0)+2\pi f_s(t-t_0)$ (equation (2)).

It may be assumed that $s(t)$ is the signal transmitted from a transmitter of a first device. The signal is received by a second device at time t. The propagation time from the first device to the second device is $\tau$. Therefore, to be received at time t, the signal is transmitted by the first device at time $t-\tau$. Therefore, $s(t-\tau)=\cos \varphi_s(t-\tau)$ is the signal transmitted by the first device to arrive at the second device at time t.

The second device generates a reference signal $r(t)=\cos \varphi_r(t)$. Where, assuming that the frequency of the reference signal is constant over time and equals $f_r$:$\varphi_r(t)=\varphi_r(t_0)+2\pi f_r (t-t_0)$ (equation (3)).

The receiver measures the phase difference, $\Delta\varphi(t)$, between the reference signal $\varphi_r(t)$ and the signal from the transmitter $s(t-\tau)$:$\Delta\varphi(t)=\varphi_r(t)-\varphi_r(t-\tau)-2\pi N$ (equation (4)). Where, N is an integer, N=0, ±1, ±2, . . . , to account for the fact that at the receiver of the second device the phase of the transmitted signal from the first device can only be measured as a fraction of a cycle and there is an integer number of cycles between the transmitted signal from the first device and the reference of the second device as illustrated in FIG. 8. N is known as the integer ambiguity. Equation (4) gives the phase of the signal received by the second device from the first device. Note that, $\varphi_r(t)$ is the reference of the second device when measuring the phase of the signal of the first device. $\varphi_r(t)$ may not be physically generated in the second device, it can just be a reference for measuring the phase.

It may assume perfect synchronization between the first device and the second device, i.e.: (1) frequency synchronization, i.e., $f_s=f_r=f$; and (2) timing synchronization, i.e., same time reference for both first device and second device. Therefore, from equations (2), (3), and (4), following equation is obtained: $\Delta\varphi(t)=\varphi_r(t_0)-\varphi_s(t_0)-2\pi N+2\pi f\tau$ (equation (5)).

Assuming that the first device and the second device are also phase synchronized, i.e., $\varphi_r(t_0)=\varphi_s(t_0)$, following equation is obtained: $\Delta\varphi(t)=2\pi-2\pi-N$ (equation (6)).

The propagation delay, $\tau$, can be expressed as a sum of an integer number of cycles at the carrier frequency, $N$ $T_c$, where $T_c$ is the carrier frequency period, and a fraction part of a cycle $T_f$, where $T_f<T_c$, i.e., $\tau=N$ $T_c+T_f$. Let $r(t-\tau, t)$ be the distance between the first device at time $t-\tau$ and the second device at time t. Therefore, $$\frac{\Delta\phi(t)}{2\pi} = r(t-\tau, t)\frac{f}{c} - N = \frac{r(t-\tau, t)}{\lambda} - N. \qquad \text{(equation (1))}$$

Where, c is the speed of light and $\lambda$ is the wavelength corresponding to frequency f.

The transmitter and receiver clocks are generally not synchronized or are loosely or partially synchronized, and each keeps time independently. Let, t be a time given by a common (global) reference time. The time measured by first device is given by $t_s(t)$. This time can be given by: $t_s(t)=t+\delta t_s(t)$, where $\delta t_s(t)$ is a clock bias (i.e., an offset) between the common (global) reference time and the time of the first device, this clock bias (i.e., offset), in general, can change overtime for example due to instability of the clock. The time measured by the second device is given by $t_r(t)$. This time can be given by: $t_r(t)=t+\delta t_r(t)$, where $\delta t_r(t)$ is a clock bias (i.e., an offset) between the common (global) reference time and the time of the second device, this clock bias (i.e., offset), in general, can change overtime for example due to instability of the clock. In one example, difference between the common (global) reference time and the time according to the first device is constant (does not depend on time). Therefore, $t_s(t)=t+\delta t_s$. In one example, difference between the common (global) reference time and the time according to the second device is constant (does not depend on time). Therefore, $t_r(t)=t+\delta t_r$.

If a signal is transmitted from the first device at time $t_1$, where $t_1$ is in the common (global) time reference, according to the time reference of the first device, this is at time $t_s(t_1)=t_1+\delta t_s(t_1)$. The signal arrives at the second device at time $t_2$, where $t_2$ is in the common (global) time reference, according to the time reference of the second device, this is at time $t_r(t_2)=t_2+\delta t_r(t_2)$. The transient time from the first device to the second device is $\tau=t_2-t_1$. The apparent transient time by considering the time according to the first device and the second device and is given by: $t_r(t_2)-t_s(t_1)=\tau+\delta t_r(t_2)-\delta t_s(t_1)$.

A signal is transmitted from the first device at time $t_1$ according to the common (global) reference time, which is time $t_s(t_1)=t_1+\delta t_s(t_1)$ in the time reference of the first device. Therefore, using above, with $f_s=f$ and t is the transmit time according the time reference of the first device, i.e., $t=t_s(t_1)$: $\varphi_s(t_s(t_1))=\varphi_s(t_0)+2\pi f(t_1+\delta t_s(t_1)-t_0)$ (equation (8)).

The signal arrives at the second device at time $t_2$ according to the common (global) reference time, which is time $t_r(t_2)=t_2+\delta t_r(t_2)$ in the time reference of the second device. Therefore, using equation (3), with $f_r=f$ and t is the receive time according the time reference of the second device, i.e., $t=t_r(t_2)$: $\varphi_r(t_r(t_2))=\varphi_r(t_0)+2\pi f(t_2+\delta t_r(t_2)-t_0)$ (equation (9)).

Therefore, the equation for phase difference (equation: $\Delta\varphi(t)=\varphi_r(t_r(t_2))-\varphi_s(t_s(t_1))$, taking into account the clock biases of the first (transmit) device and second (receive) device, with $\tau=t_2-t_1$, becomes: $\Delta\varphi(t_1, t_2)=2\pi f\tau+2\pi f(\delta t_r(t_2)-\delta t_s(t_1))-2\pi N$ (equation (10)). Hence, equation (7), with clock biases becomes:

$$\frac{\Delta\phi(t)}{2\pi} = \frac{r(t-\tau, t)}{\lambda} + f(\delta t_r(t_2) - \delta t_s(t_1)) - N. \qquad \text{(equation (11))}$$

To derive equation (7) and by extension equation (11), it may be assumed that $\varphi_r(t_0)=\varphi_s(t_0)$. If $\varphi_r(t_0)\neq\varphi_s(t_0)$, the phase difference at a reference time $t_0$, becomes an additional component in the phase difference measurement, hence equation (11) becomes:

(equation (12))

$$\frac{\Delta\phi(t)}{2\pi} = \frac{r(t-\tau, t)}{\lambda} + f(\delta t_r(t_2) - \delta t_s(t_1)) + (\phi_r(t_0) - \phi_s(t_0)) - N.$$

Two issues are apparent in equation (12) when measuring the carrier phase. The first is the clock biases of the devices involved in the transmission and reception of the signals used to measure the carrier phase. The second is the integer ambiguity represented by N. Methods to solve the first issue include: (1) round-trip carrier phase measurement; and (2) single difference and double difference carrier phase measurement.

To solve the integer ambiguity issue, the following methods can be considered: (1) getting an estimate of the number of full cycles using legacy positioning techniques which could be less accurate than the carrier phase method. To assist in getting a reliable estimate of the number of cycles, a virtual frequency can be considered, which is smaller than the carrier frequency, and is used for the phase measurement; and (2) slope of the carrier phase with respect to frequency, which eliminates N.

In the present disclosure, the round-trip carrier phase measurement is provided. According to equation (12) above, there are five unknowns: (1) the integer ambiguity, N; (2) the clock bias of the first (transmitter) device, $\delta t_s(t)$; (3) the clock bias of the second (receiver) device, $\delta t_r(t)$; (4) the carrier phase of the first (transmitter) device at a reference time $t_0$, i.e., $\varphi_s(t_0)$; and (5) the carrier phase of the second (receiver) device at a reference time $t_0$, i.e., $\varphi_r(t_0)$.

The accuracy of the carrier phase measurement can be in the range of 0.01 to 0.05 cycles. For a carrier frequency of 3 GHz, the wavelength is 10 cm, this corresponds to 1 mm to 5 mm, which is well within the cm-level accuracy.

In the present disclosure, the use of the carrier phase method is provided to estimate the position of a UE: (1) method and apparatus for measuring the round-trip carrier phase (the sum of the DL carrier phase and the UL carrier phase). This eliminates clock biases at the gNB and UE and unknown phase at the gNB and UE; (2) configurations and reporting of carrier phase measurements from the UE and the gNB; and (3) measurement of the carrier phase at the gNB and the UE.

3GPP Rel-16 is the first NR release to include sidelink through work item "5G V2X with NR sidelink" and RAT-based positioning through work item "NR Positioning Support." Rel-17 further enhanced accuracy and reduced the latency of NR-based positioning through work item "NR Positioning Enhancements." In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. Carrier phase method is a promising technique for estimating the positioning of a UE that provides cm-level accuracy or better. In this disclosure, methods and apparatus using the round-trip carrier phase are provided to estimate or measure distance between the UE and the gNB.

The present disclosure relates to a 5G/NR communication system. The present disclosure introduces signaling and methods for measurement of the round-trip carrier phase (the sum of the DL carrier phase and the UL carrier phase). Configurations and reporting of carrier phase measurements from the UE and the gNB. Measurement of the carrier phase at the gNB and the UE.

In one example, the DL positioning reference signal (e.g., DL PRS) in this disclosure is a reference signal designed for the carrier-phase method.

In one example, the DL positioning reference signal (e.g., DL PRS) in this disclosure is a reference signal introduced in the Rel-16 and Rel-17 3GPP specifications for positioning.

In one example, the UL positioning reference signal (e.g., positioning sounding reference signal-Pos-SRS) in this disclosure is a reference signal designed for the carrier-phase method.

In one example, the UL positioning reference signal (e.g., positioning sounding reference signal-Pos-SRS) in this disclosure is a reference signal introduced in the Rel-16 and Rel-17 3GPP specifications for positioning.

In one example, if there is a change in time advance (TA) between two instances of reference signals used for carrier phase measurements the phase continuity may not be maintained across these carrier phase measurements.

In another example, if there is a change in time advance (TA) between two instances of reference signals used for carrier phase measurements, the impact of the TA on reference time of the UE or gNB is taken into account.

Figure 9:
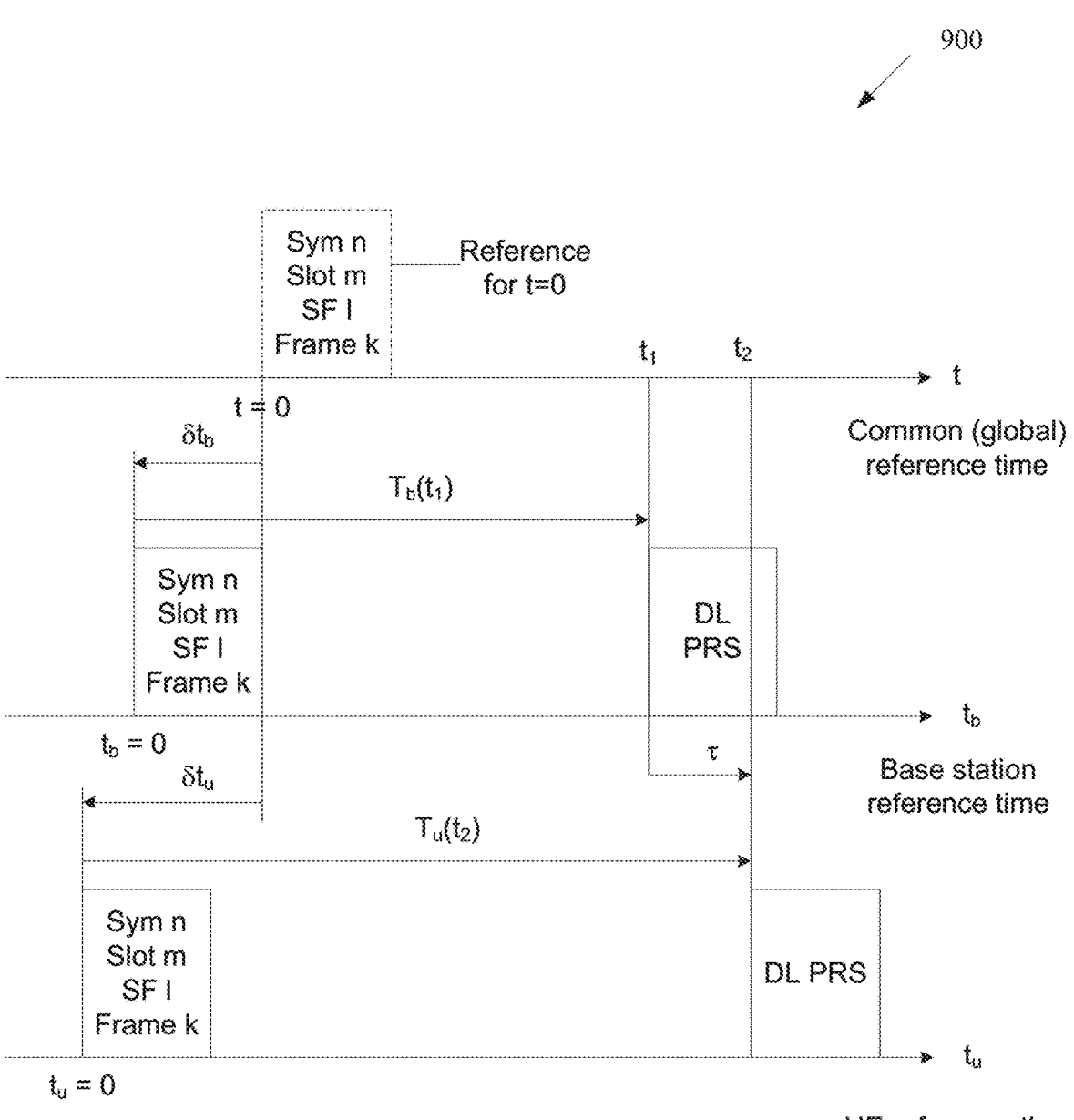
FIG. 9 illustrates an example of gNB transmitting a DL positioning reference signal to a UE according to embodiments of the present disclosure.

FIG. 9 illustrates an example of gNB transmitting a DL positioning reference signal to a UE 900 according to embodiments of the present disclosure, as may be performed by a UE (e.g., 111-116 as illustrated in FIG. 1) and a BS (e.g., 101-103 as illustrated in FIG. 1). The embodiment of the gNB transmitting a DL positioning reference signal to a UE 900 illustrated in FIG. 9 is for illustration only.

FIG. 9 illustrates an example of a gNB transmitting a DL positioning reference signal to a UE with different clock biases at the gNB and the UE.

In one example, the gNB transmits a DL positioning reference signal. Let $t_1$ be the start of a DL positioning reference signal. $t_1$ is according to a common (global) reference time. The time according to base station reference time is $t_b(t_1) = t_1 + \delta t_b(t_1)$, where $\delta t_b(t_1)$ is a clock bias (i.e., offset) of the base station clock. In one example, the clock bias $\delta t_b(t_1)$ is a function of time, i.e., it changes with time. In another example, the clock bias is fixed, i.e., $\delta t_b(t_1) = \delta t_b$.

In one example, $t_b(t_1)$ is time of the start of the DL positioning reference signal from the start of a DL or UL symbol, for example (1) symbol n in slot m in frame k, or (2) symbol n in slot m in any frame, or (3) symbol n in any slot, or (4) symbol n in slot m in subframe l in frame k, or (5) symbol n in slot m in subframe l in any frame, or (6) symbol n in slot m in any subframe, or (7) symbol n in subframe l in frame k, or (8) symbol n in subframe l in any frame, or (9) symbol n in any subframe. For example, symbol n can be the symbol of the DL positioning reference signal, e.g., $t_b(t_1) = 0$.

In one example, $t_b(t_1)$ is time of the start of the DL positioning reference signal from the start of a DL or UL slot, for example (1) slot m in frame k, or (2) slot m in any frame, or (3) slot m in subframe l in frame k, or (4) slot m in subframe l in any frame. For example, slot m can be the slot of the DL positioning reference signal, e.g., $t_b(t_1)$ is the time between the start of the slot of the DL positioning reference symbol at the gNB and the start of the transmitted DL positioning reference symbol.

In one example, $t_b(t_1)$ is time of the start of the DL positioning reference signal from the start of a DL or UL subframe, for example (1) subframe l in frame k, or (2) subframe l in any frame. For example, subframe l can be the subframe of the DL positioning reference signal, e.g., $t_b(t_1)$ is the time between the start of the subframe of the DL positioning reference symbol at the gNB and the start of the transmitted DL positioning reference symbol.

In one example, $t_b(t_1)$ is time of the start of the DL positioning reference signal from the start of a DL or UL frame, for example frame k. For example, frame k can be the frame of the DL positioning reference signal, e.g., $t_b(t_1)$ is the time between the start of the frame of the DL positioning reference symbol at the gNB and the start of the transmitted DL positioning reference symbol.

In one example, $t_b(t_1)$ is time of the start of the DL positioning reference signal from the DL or UL SFN roll-over (e.g., SFN=0).

In one example, $t_b(t_1)$ is time of the start of the DL positioning reference signal from a reference time in the gNB.

In one example, the common (global) reference time is the time of the gNB. i.e., $t_b(t_1)=t_1$ and $\delta t_b(t_1)=0$.

In one example, phase of the carrier at the reference time (e.g., $t_b=0$) is $\varphi_{b01}$. Phase continuity is assumed between time $t_b=0$ and $t_b(t_1)$ both times are according to the base station reference time. Alternatively, the corresponding times according to the common (global) reference time can be used. The phase of the carrier at time $t_b(t_1)$ is given by: $\varphi_b(t_b(t_1))=\varphi_{b01}+2\pi f t_b(t_1)=\varphi_{b01}+2\pi f(t_1+\delta t_b(t_1))$ (equation (13)).

In one example, the phase of the carrier is zero at the start of or after CP of each symbol transmitted by the gNB.

In one example, the phase of the carrier is zero at the start of or after CP of a first PRS symbol (or first symbol) in a slot transmitted by the gNB, phase continuity is assumed for the remaining PRS symbols of the slot.

In one example, the phase of the carrier is zero at the start of or after CP of a first PRS symbol (or first symbol) in a subframe transmitted by the gNB, phase continuity is assumed for the remaining PRS symbols of the subframe.

In one example, the phase of the carrier is zero at the start of or after CP of a first PRS symbol (or first symbol) in a frame transmitted by the gNB, phase continuity is assumed for the remaining PRS symbols of the frame.

In one example, the phase of the carrier is zero at the start of or after CP of a first PRS symbol (or first symbol) in a frame with SFN=0 transmitted by the gNB, phase continuity is assumed for the remaining PRS symbols until the next SFN=0.

In one example, the DL positioning reference signal transmitted by the gNB arrives at a UE at time $t_2=t_1+t_2$, where $\tau(t_1, t_2)$ is the propagation delay from the gNB at time $t_1$ to the UE at time $t_2$. If the distance between the gNB and UE does not change with time, e.g., the UE and the gNB are stationary, $\tau$ is independent of $t_1$ and $t_2$, i.e., $\tau=\tau(t_1, t_2)$. $t_2$ is the start of the DL positioning reference signal received at the UE. $t_2$ is according to a common (global) reference time. The time according to UE reference time is $t_u(t_2)=t_2+(\delta t_u(t_2))$, where $\delta t_u(t_2)$ is a clock bias (i.e., offset) of the UE clock. In one example, the clock bias $\delta t_u(t_2)$ is a function of time, i.e., it changes with time.

In another example, the clock bias is fixed, i.e., $\delta t_u(t_2)=\delta t_u$. In one example, $t_u(t_2)$ is time of the start of the received DL positioning reference signal from the start of a DL or UL symbol, for example (1) symbol n in slot m in frame k, or (2) symbol n in slot m in any frame, or (3) symbol n in any slot, or (4) symbol n in slot m in subframe l in frame k, or (5) symbol n in slot m in subframe l in any frame, or (6) symbol n in slot m in any subframe, or (7) symbol n in subframe l in frame k, or (8) symbol n in subframe l in any frame, or (9) symbol n in any subframe. For example, symbol n can be the symbol of the DL positioning reference signal, e.g., $t_u(t_2)$ is the time between the start of the DL or UL positioning reference symbol at the UE and the start of the received DL positioning reference symbol.

In one example, $t_u(t_2)$ is time of the start of the received DL positioning reference signal from the start of a DL or UL slot, for example (1) slot m in frame k, or (2) slot m in any frame, or (3) slot m in subframe l in frame k, or (4) slot m in subframe l in any frame. For example, slot m can be the slot of the DL positioning reference signal, e.g., $t_u(t_2)$ is the time between the start of the slot of the DL or UL positioning reference symbol at the UE and the start of the received DL positioning reference symbol.

In one example, $t_u(t_2)$ is time of the start of the received DL positioning reference signal from the start of a DL or UL subframe, for example (1) subframe l in frame k, or (2) subframe l in any frame. For example, subframe l can be the subframe of the DL positioning reference signal, e.g., $t_u(t_2)$ is the time between the start of the subframe of the DL or UL positioning reference symbol at the UE and the start of the received DL positioning reference symbol.

In one example, $t_u(t_2)$ is time of the start of the received DL positioning reference signal from the start of a DL or UL frame, for example frame k. For example, frame k can be the frame of the DL positioning reference signal, e.g., $t_u(t_2)$ is the time between the start of the frame of the DL or UL positioning reference symbol at the UE and the start of the received DL positioning reference symbol.

In one example, $t_u(t_2)$ is time of the start of the received DL positioning reference signal from the DL or UL SFN roll-over (e.g., SFN=0).

In one example, $t_u(t_2)$ is time of the start of the received DL positioning reference signal from a reference time in the UE.

In one example, the common (global) reference time is the time of the UE. i.e., $t_u(t_2)=t_2$ and $\delta t_u(t_2)=0$.

In one example, n, m, l and/or k for the reference time of the gNB (in examples disclosed in the present disclosure) and n, m, l and/or k for the reference time of the UE (in example disclosed in the present disclosure) are the same. This is the example shown in FIG. 9.

In one example, n, m, l and/or k for the reference time of the gNB (in example disclosed in the present disclosure) and n, m, l and/or k for the reference time of the UE (in example disclosed in the present disclosure) can be different.

In one example, phase of the UE's reference signal (or reference phase) at the reference time (e.g., $t_u=0$) is $\varphi_{u01}$. Phase continuity is assumed between time $t_u=0$ and $t_u(t_2)$ both times are according to the UE reference time. For example, there is no slip in the phase locked loop providing the reference signal (or reference phase) of the UE. Alternatively, the corresponding times according to the common (global) reference time can be used. The phase of the UE's reference signal (or reference phase) at time $t_u(t_2)$ is given by: $\varphi_u(t_u(t_2))=\varphi_{u01}+2\pi f t_u(t_2)=\delta_{u01}+2\pi f(t_2+\delta t_u(t_2))$ (equation (14)).

Where, $t_2$ is the time of arrival of the DL positioning reference signal at the UE. Where, $t_2=t_1+\tau(t_1, t_2)$. If the UE and the gNB are stationary (e.g., fixed positions) $t_2=t_1+\tau$, i.e., $\tau$ does not depend on $t_1$ and $t_2$.

Therefore, the phase difference between the UE's reference signal (or reference phase) and the carrier of the DL positioning reference signal received at the UE is given by:

$$\frac{\Delta\phi(t_1, t_2)}{2\pi} = \frac{\phi_u(t_u(t_2)) - \phi_b(t_b(t_1))}{2\pi} - N_1 \qquad \text{(equation (15))}$$

(equation 15)), (equation (16))

$$\frac{\Delta\phi(t_1, t_2)}{2\pi} = \frac{\phi_{u01} - \phi_{b01}}{2\pi} + f(\tau(t_1, t_2) + \delta t_u(t_2) - \delta t_b(t_1)) - N_1,$$

(equation (16)), and (equation (17))

$$\frac{\Delta\phi(t_1, t_2)}{2\pi} = \frac{\phi_{u01} - \phi_{b01}}{2\pi} + \frac{r(t_1, t_2)}{\lambda} + f(\delta t_u(t_2) - \delta t_b(t_1)) - N_1.$$

(equation (17)).

In one example, the UE measures the carrier phase of the DL positioning reference signal transmitted by the gNB. For example, the carrier phase measured by the UE can be for $\varphi_b(t_b(t_1))$. This is the carrier phase of the signal transmitted from the gNB at time $t_b(t_1)$ and arriving at the UE at time $t_u(t_2)$.

In one example, the UE measures the carrier phase of the DL positioning reference signal transmitted by the gNB relative to UE's reference phase, i.e., the UE measures $\varphi_u(t_u(t_2)) - \varphi_b(t_b(t_1))$ or measures $\varphi_b(t_b(t_1)) - \varphi_u(t_u(t_2))$, wherein the signal is transmitted by the gNB at time $t_b(t_1)$ and arrives at the UE at time $t_u(t_2)$.

In one example, the UE reports the measured carrier phase, as aforementioned, to the network e.g., gNB or LMF for location determination.

In one example, the UE uses the measured carrier phase, as aforementioned, for location determination.

Figure 10:
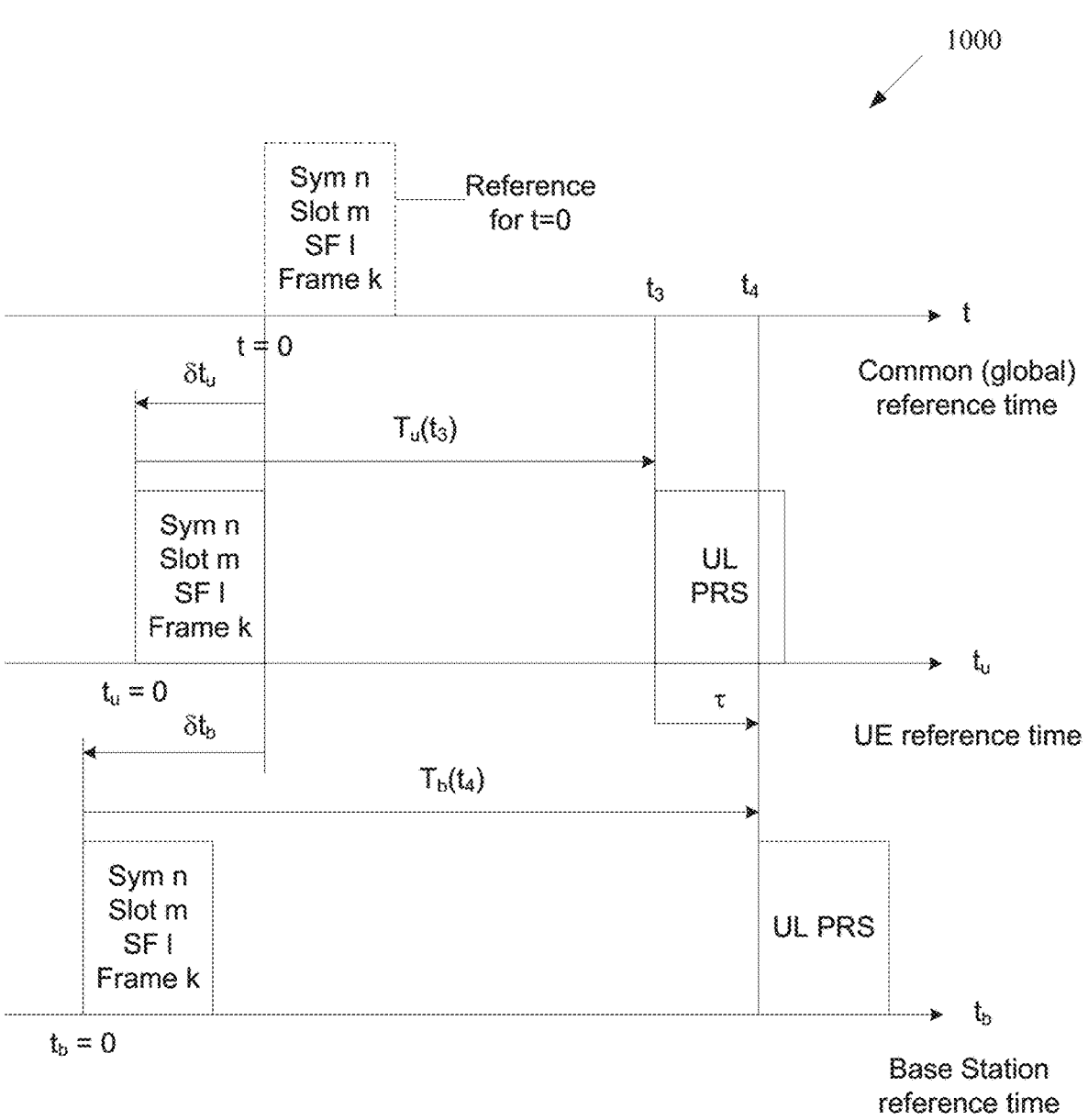
FIG. 10 illustrates an example of a UE transmitting an UL positioning reference signal to a gNB according to embodiments of the present disclosure.

FIG. 10 illustrates an example of a UE transmitting an UL positioning reference signal to a gNB 1000 according to embodiments of the present disclosure, as may be performed by a UE (e.g., 111-116 as illustrated in FIG. 1) and a BS (e.g., 101-103 as illustrated in FIG. 1). The embodiment of the UE transmitting an UL positioning reference signal to a gNB 1000 illustrated in FIG. 10 is for illustration only.

FIG. 10 illustrates an example of a UE transmitting an UL positioning reference signal (e.g., positioning sounding reference signal—positioning SRS) to a gNB with different clock biases at the gNB and the UE.

In one example, the UE transmits an UL positioning reference signal (e.g., positioning sounding reference signal—positioning SRS). Let $t_3$ be the start of an UL positioning reference signal (e.g., positioning sounding reference signal—positioning SRS). $t_3$ is according to a common (global) reference time. The time according to UE's reference time is $t_u(t_3) = t_3 + (\delta t_u(t_3)$, where $\delta t_u(t_3)$ is a clock bias (i.e., offset) of the UE clock. In one example, the clock bias $\delta t_u(t_3)$ is a function of time, i.e., it changes with time. In another example, the clock bias is fixed, i.e., $\delta t_u(t_3) = (\delta t_u$. In one example, the same sub-carrier frequencies are configured for the UL positioning reference signal (e.g., positioning sounding reference signal—positioning SRS) as configured for DL positioning reference signal.

In one example, $t_u(t_3)$ is time of the start of the UL positioning reference signal (e.g., positioning sounding reference signal—positioning SRS) from the start of an UL or DL symbol, for example (1) symbol n in slot m in frame k, or (2) symbol n in slot m in any frame, or (3) symbol n in any slot, or (4) symbol n in slot m in subframe l in frame k, or (5) symbol n in slot m in subframe l in any frame, or (6) symbol n in slot m in any subframe, or (7) symbol n in subframe l in frame k, or (8) symbol n in subframe l in any frame, or (9) symbol n in any subframe. For example, symbol n can be the symbol of the UL positioning reference signal (e.g., positioning sounding reference signal—positioning SRS), e.g., $t_u(t_3)=0$.

In one example, $t_u(t_3)$ is time of the start of the UL positioning reference signal (e.g., positioning sounding reference signal—positioning SRS) from the start of an UL or DL slot, for example (1) slot m in frame k, or (2) slot m in any frame, or (3) slot m in subframe l in frame k, or (4) slot m in subframe l in any frame. For example, slot m can be the slot of the UL positioning reference signal (e.g., positioning sounding reference signal—positioning SRS), e.g., $t_u(t_3)$ is the time between the start of the slot of the UL positioning reference symbol at the UE and the start of the transmitted UL positioning reference symbol.

In one example, $t_u(t_3)$ is time of the start of the UL positioning reference signal (e.g., positioning sounding reference signal—positioning SRS) from the start of an UL or DL subframe, for example (1) subframe l in frame k, or (2) subframe l in any frame. For example, subframe l can be the subframe of the UL positioning reference signal (e.g., positioning sounding reference signal—positioning SRS), e.g., $t_u(t_3)$ is the time between the start of the subframe of the UL positioning reference symbol at the UE and the start of the transmitted UL positioning reference symbol.

In one example, $t_u(t_3)$ is time of the start of the UL positioning reference signal (e.g., positioning sounding reference signal—positioning SRS) from the start of an UL or DL frame, for example frame k. For example, frame k can be the frame of the UL positioning reference signal (e.g., positioning sounding reference signal—positioning SRS), e.g., $t_u(t_3)$ is the time between the start of the frame of the UL positioning reference symbol at the UE and the start of the transmitted UL positioning reference symbol.

In one example, $t_u(t_3)$ is time of the start of the UL positioning reference signal (e.g., positioning sounding reference signal—positioning SRS) from the UL or DL SFN roll-over (e.g., SFN=0).

In one example, $t_u(t_3)$ is time of the start of the UL positioning reference signal (e.g., positioning sounding reference signal—positioning SRS) from a reference time in the gNB.

In one example, the common (global) reference time is the time of the UE. i.e., $t_u(t_3)=t_3$ and $\delta t_u(t_3)=0$.

In one example, phase of the carrier at the reference time (e.g., $t_u=0$) is $\varphi_{u02}$. Phase continuity is assumed between time $t_u=0$ and $t_u(t_3)$ both times are according to the UE reference time. Alternatively, the corresponding times according to the common (global) reference time can be used. The phase of the carrier at time $t_u(t_3)$ is given by: $\varphi_u(t_u(t_3))=\varphi_{u02}+2\pi f t_u(t_3)=\varphi_{u02}+2\pi f(t_3+\delta t_u(t_3))$ (equation (18)).

In one example, the phase of the carrier is zero at the start of or after CP of each symbol transmitted by the UE.

In one example, the phase of the carrier is zero at the start of or after CP of a first PRS (or positioning SRS) symbol (or first symbol) in a slot transmitted by the UE, phase continuity is assumed for the remaining PRS (or positioning SRS) symbols of the slot.

In one example, the phase of the carrier is zero at the start of or after CP of a first PRS (or positioning SRS) symbol (or first symbol) in a subframe transmitted by the UE, phase continuity is assumed for the remaining PRS (or positioning SRS) symbols of the subframe.

In one example, the phase of the carrier is zero at the start of or after CP of a first PRS (or positioning SRS) symbol (or first symbol) in a frame transmitted by the UE, phase continuity is assumed for the remaining PRS (or positioning SRS) symbols of the frame.

In one example, the phase of the carrier is zero at the start of or after CP of a first PRS (or positioning SRS) symbol (or first symbol) in a frame with SFN=0 transmitted by the UE, phase continuity is assumed for the remaining PRS (or positioning SRS) symbols until the next SFN=0.

In one example, the UL positioning reference signal (e.g., positioning sounding reference signal—positioning SRS) transmitted by the UE arrives at a gNB at time $t_4=t_3+\tau(t_3, t_4)$, where $\tau(t_3, t_4)$ is the propagation delay from the UE at time $t_3$ to the gNB at time $t_4$. If the distance between the gNB and UE does not change with time, e.g., the UE and the gNB are stationary, $\tau$ is independent of $t_3$ and $t_4$, i.e., $\tau=\tau(t_3, t_4)$. $t_4$ is the start of the UL positioning reference signal (e.g., positioning sounding reference signal—positioning SRS) received at the gNB. $t_4$ is according to a common (global) reference time. The time according to base station reference time is $t_b(t_4)=t_4+\delta t_b(t_4)$, where $\delta t_b(t_4)$ is a clock bias (i.e., offset) of the base station clock. In one example, the clock bias $\delta t_b(t_4)$ is a function if time, i.e., it changes with time.

In another example, the clock bias is fixed, i.e., $\delta t_b(t_4)=\delta t_b$.

In one example, $t_b(t_4)$ is time of the start of the received UL positioning reference signal (e.g., positioning sounding reference signal—positioning SRS) from the start of an UL or DL symbol, for example (1) symbol n in slot m in frame k, or (2) symbol n in slot m in any frame, or (3) symbol n in any slot, or (4) symbol n in slot m in subframe l in frame k, or (5) symbol n in slot m in subframe l in any frame, or (6) symbol n in slot m in any subframe, or (7) symbol n in subframe l in frame k, or (8) symbol n in subframe l in any frame, or (9) symbol n in any subframe. For example, symbol n can be the symbol of the UL positioning reference signal (e.g., positioning sounding reference signal—positioning SRS), e.g., $t_b(t_4)$ is the time between the start of the UL or DL positioning reference symbol at the gNB and the start of the received UL positioning reference symbol.

In one example, $t_b(t_4)$ is time of the start of the received UL positioning reference signal (e.g., positioning sounding reference signal—positioning SRS) from the start of an UL or DL slot, for example (1) slot m in frame k, or (2) slot m in any frame, or (3) slot m in subframe l in frame k, or (4) slot m in subframe l in any frame. For example, slot m can be the slot of the UL positioning reference signal (e.g., positioning sounding reference signal—positioning SRS), e.g., $t_b(t_4)$ is the time between the start of the slot of the UL or DL positioning reference symbol at the gNB and the start of the received UL positioning reference symbol.

In one example, $t_b(t_4)$ is time of the start of the received UL positioning reference signal (e.g., positioning sounding reference signal—positioning SRS) from the start of an UL or DL subframe, for example (1) subframe l in frame k, or (2) subframe l in any frame. For example, subframe l can be the subframe of the UL positioning reference signal (e.g., positioning sounding reference signal—positioning SRS), e.g., $t_b(t_4)$ is the time between the start of the subframe of the UL or DL positioning reference symbol at the gNB and the start of the received UL positioning reference symbol.

In one example, $t_b(t_4)$ is time of the start of the received UL positioning reference signal (e.g., positioning sounding reference signal—positioning SRS) from the start of an UL or DL frame, for example frame k. For example, frame k can be the frame of the UL positioning reference signal (e.g., positioning sounding reference signal—positioning SRS), e.g., $t_b(t_4)$ is the time between the start of the frame of the UL or DL positioning reference symbol at the gNB and the start of the received UL positioning reference symbol.

In one example, $t_b(t_4)$ is time of the start of the received UL positioning reference signal (e.g., positioning sounding reference signal—positioning SRS) from the UL or DL SFN roll-over (e.g., SFN=0).

In one example, $t_b(t_4)$ is time of the start of the received UL positioning reference signal (e.g., positioning sounding reference signal—positioning SRS) from a reference time in the gNB.

In one example, the common (global) reference time is the time of the gNB. i.e., $t_b(t_4)=t_4$ and $\delta t_b(t_4)=0$.

In one example, n, m, l and/or k for the reference time of the UE (in example disclosed in the present disclosure) and n, m, l and/or k for the reference time of the gNB are the same. This is the example shown in FIG. 10.

In one example, n, m, l and/or k for the reference time of the UE (in example disclosed in the present disclosure) and n, m, l and/or k for the reference time of the gNB can be different.

In one example, phase of the gNB's reference signal (or reference phase) at the reference time (e.g., $t_b=0$) is $\varphi_{b02}$. Phase continuity is assumed between time $t_b=0$ and $t_b(t_4)$ both times are according to the gNB reference time. For example, there is no slip in the phase locked loop providing the reference signal (reference phase) of the gNB. Alternatively, the corresponding times according to the common (global) reference time can be used. The phase of the gNB's reference signal (or reference phase) at time $t_b(t_4)$ is given by: $\varphi_b(t_b(t_4))=\varphi_{b02}+2\pi f t_b(t_4)=\varphi_{b02}+2\pi f(t_4+\delta t_4(t_4))$ (equation (19)).

Where, $t_4$ is the time of arrival of the UL positioning reference signal (e.g., positioning sounding reference signal—positioning SRS) at the gNB. Where, $t_4=t_3+\tau(t_3, t_4)$. If the UE and the gNB are stationary (e.g., fixed positions) $t_4=t_3+\tau$, i.e., $\tau$ does not depend on $t_3$ and $t_4$. Therefore, the phase difference between the gNB's reference signal (or reference phase) and the carrier of the UL positioning reference signal (e.g., positioning sounding reference signal—positioning SRS) received at the gNB is given by:

$$\frac{\Delta\phi(t_3, t_4)}{2\pi} = \frac{(\phi_b(t_b(t_4)) - \phi_u(t_u(t_3)))}{(2\pi)} - N_2, \qquad \text{(equation (20))}$$

$$\text{(equation (21))}$$

$$\frac{\Delta\phi(t_3, t_4)}{2\pi} = \frac{\phi_{b02} - \phi_{u02}}{2\pi} + f(\tau(t_3, t_4) + \delta t_b(t_4) - \delta t_u(t_3)) - N_2,$$

and $$\frac{\Delta\phi(t_3, t_4)}{2\pi} = \qquad \text{(equation (22))}$$

$$\frac{\phi_{b02} - \phi_{u02}}{2\pi} + \frac{r(t_3, t_4)}{\lambda} + f(\delta t_b(t_4) - \delta t_u(t_3)) - N_2.$$

In one example, the gNB measures the carrier phase of the UL positioning reference signal (e.g., positioning SRS) transmitted by the UE. For example, the carrier phase measured by the gNB can be for $\varphi_u(t_u(t_3))$. This is the carrier phase of the signal transmitted from the UE at time $t_u(t_3)$ and arriving at the gNB at time $t_b(t_4)$.

In one example, the gNB measures the carrier phase of the UL positioning reference signal (e.g., positioning SRS) transmitted by the UE relative to gNB's reference phase, i.e., the gNB measures $\varphi_b(t_b(t_4))-\varphi_u(t_u(t_3))$ or measures $\varphi_u(t_u(t_3))-\varphi_b(t_b(t_4))$, wherein the signal is transmitted by the UE at time $t_u(t_3)$ and arrives at the gNB at time $t_b(t_3)$.

In one example, the gNB reports the measured carrier phase, as aforementioned, to other network entities e.g., LMF for location determination.

In one example, the gNB uses the measured carrier phase, as aforementioned, for location determination.

In one example, the gNB reports the measured carrier phase, as aforementioned, to the UE for location determination.

In one example, the clock bias at the gNB and the clock bias at the UE are time independent. The clock bias at the gNB at time $t_1$ and $t_4$ are the same, i.e., $\delta t_b(t_1)=\delta t_b(t_4)=\delta t_b$, and the clock bias at the UE at time $t_2$ and $t_3$ are the same $(\delta t_u(t_2)=\delta t_u(t_3)=\delta t_u$. In one example, there is no time advance (TA) command transmitted by the gNB that can be effective or received at the UE between $t_2$ and $t_3$. Using equations (16) and (17), and assuming constant clock bias, following equation is obtained:

$$\frac{\Delta\phi(t_1, t_2)}{2\pi} + \frac{\Delta\phi(t_3, t_4)}{2\pi} = \tag{equation (23)}$$

$$\frac{\phi_{u01} - \phi_{b01}}{2\pi} + \frac{\phi_{b02} - \phi_{u02}}{2\pi} + f(\tau(t_1, t_2) + \tau(t_3, t_4)) - N.$$

(equation (23)). Where N is an integer that replaces $N_1+N_2$.

In one example, the UE and the gNB are stationary (e.g., fixed positions), i.e., $$\tau(t_1, t_2) = \tau(t_3, t_4) = \tau. \tag{equation (24)}$$

Therefore, $\dfrac{\Delta\phi(t_1, t_2)}{2\pi} + \dfrac{\Delta\phi(t_3, t_4)}{2\pi} = \dfrac{\phi_{u01} - \phi_{b01}}{2\pi} + \dfrac{\phi_{b02} - \phi_{u02}}{2\pi} + 2f\tau - N.$ (equation (24)).

In one example, the reference point for phase measurement for DL positioning reference signal and UL positioning reference signal (e.g., positioning sounding reference signal—positioning SRS) is the same at the gNB and at the UE, i.e., (1) $\varphi_{b01}=\varphi_{b02}=\varphi_{b0}$, e.g., the gNB can maintain phase continuity between time of transmitting a DL PRS used for carrier phase measurement at the UE and the time of receiving UL positioning reference signal (e.g., positioning SRS) and measuring the carrier phase; and (2) $\varphi_{u01}=\varphi_{u02}=\varphi_{u0}$, e.g., the UE can maintain phase continuity between time of transmitting UL positioning reference signal (e.g., positioning SRS) used for carrier phase measurement at the gNB and the time of receiving DL PRS and measuring the carrier phase. Therefore, $$\frac{\Delta\phi(t_1, t_2)}{2\pi} + \frac{\Delta\phi(t_3, t_4)}{2\pi} = f(\tau(t_1, t_2) + \tau(t_3, t_4)) - N. \tag{equation (25)}$$

(equation (25)).

In one example, the UE and the gNB are stationary (e.g., fixed positions), i.e., $\tau(t_1, t_2)=\tau(t_3, t_4)=\tau$. Furthermore, the reference point for phase measurement for DL positioning reference signal and UL positioning reference signal (e.g., positioning sounding reference signal—positioning SRS) is the same at the gNB and at the UE, i.e., $\varphi_{b01}=\varphi_{b02}=\varphi_{b0}$ and $\varphi_{u01}=\varphi_{u02}=\varphi_{u0}$. Therefore, $$\frac{\Delta\phi(t_1, t_2)}{2\pi} + \frac{\Delta\phi(t_3, t_4)}{2\pi} = 2f\tau - N. \tag{equation (26)}$$

(equation (26)). Therefore, the propagation delay $\tau$ can be given by $$\tau = \frac{\Delta\phi(t_1, t_2) + \Delta\phi(t_3, t_4)}{4\pi f} - \frac{N}{2}. \tag{equation (27)}$$

(equation (27)).

N can be positive or negative and is to be determined. Therefore, the polarity of N is changed from equation (26) to equation (27).

Similarly, assuming constant clock bias, following equation is obtained:

$$\frac{\Delta\phi(t_1, t_2)}{2\pi} + \frac{\Delta\phi(t_3, t_4)}{2\pi} = \tag{equation (28)}$$

$$\frac{\phi_{u01} - \phi_{b01}}{2\pi} + \frac{\phi_{b02} - \phi_{u02}}{2\pi} + \frac{r(t_1, t_2) + r(t_3, t_4)}{\lambda} - N.$$

(equation (28)).

In one example, the UE and the gNB are stationary (e.g., fixed positions), i.e., $$r(t_1, t_2) = r(t_3, t_4) = r. \tag{equation (29)}$$

Therefore, $\dfrac{\Delta\phi(t_1, t_2)}{2\pi} + \dfrac{\Delta\phi(t_3, t_4)}{2\pi} = \dfrac{\phi_{u01} - \phi_{b01}}{2\pi} + \dfrac{\phi_{b02} - \phi_{u02}}{2\pi} + \dfrac{2r}{\lambda} - N.$ (equation (29)).

In one example, the reference point for phase measurement for DL positioning reference signal and UL positioning reference signal (e.g., positioning sounding reference signal—positioning SRS) is the same at the gNB and at the UE, i.e.: (1) $\varphi_{b01}=\varphi_{b02}=\varphi_{b0}$, e.g., the gNB can maintain phase continuity between time of transmitting a DL PRS used for carrier phase measurement at the UE and the time of receiving UL positioning reference signal (e.g., positioning SRS) and measuring the carrier phase; and (2) $\varphi_{u01}=\varphi_{u02}=\varphi_{u0}$, e.g., the UE can maintain phase continuity between time of transmitting UL positioning reference signal (e.g., positioning SRS) used for carrier phase measurement at the gNB and the time of receiving DL PRS and measuring the carrier phase.

Therefore, $$\frac{\Delta\phi(t_1, t_2)}{2\pi} + \frac{\Delta\phi(t_3, t_4)}{2\pi} = \frac{r(t_1, t_2) + r(t_3, t_4)}{\lambda} - N. \tag{equation (30)}$$

(equation (30)).

In one example, the UE and the gNB are stationary (e.g., fixed positions), i.e., $r(t_1, t_2)=r(t_3, t_4)=r$. Furthermore, the reference point for phase measurement for DL positioning reference signal and UL positioning reference signal (e.g., positioning sounding reference signal—positioning SRS) is the same at the gNB and at the UE, i.e., $\varphi_{b01}=\varphi_{b02}=\varphi_{b0}$ and $\varphi_{u01}=\varphi_{u02}=\varphi_{u0}$. Therefore, $$\frac{\Delta\phi(t_1, t_2)}{2\pi} + \frac{\Delta\phi(t_3, t_4)}{2\pi} = \frac{2r}{\lambda} - N. \qquad \text{(equation (31))}$$

(equation (31)).

In one example, the propagation delay between the gNB and the UE, $\tau$, is estimated to within an accuracy of $$\pm\frac{1}{4f}.$$

This allows for the estimation of the integer component N of equation (27). The phase measurement provides a further refinement of the propagation delay.

The UE's position can be estimated using Rel-16/17 positioning techniques, which can provide a coarse accuracy of the UE's position (e.g., an accuracy in the range of 1 to 3 meters). If the carrier has a frequency $f_c$ and a periodicity $$T_c = \frac{1}{f_c}.$$

The propagation time from device A to device B as measured using legacy positioning methods can be expressed as: $T_{p-mlegacy}=N.\ T_c+T_f+e_1$.

Wherein, N is the number of complete cycles the signal traversed when travelling from the transmitter to the receiver, in case of round-trip carrier phase N is the number of complete cycles the signal traversed when travelling from the first device to the second device and back to the first device, N can't be measured directly by the carrier phase measurement due to the integer ambiguity. $T_f$ corresponds to a time of a partial cycle $T_f<T_c$ and $e_1$ is the time of positioning measurement error by legacy-based positioning methods, if accuracy of the positioning measurement is 1 to 3 meters, e 1=3.3–10 ns. When using the carrier-phase method, the number of cycles could be estimated from the legacy-based positioning measurement, the carrier-phase method can more accurately estimate $T_f$. Using the carrier-phase method the time of arrival has a refined accuracy of $T_{p-mCP}=N.\ P+T_f+e_2$. Hence, the carrier phase measurement and a legacy Rel-16/Rel-17 time-based measurement (e.g., DL RSTD, UL RTOA, UE Rx-Tx time difference or gNB Rx-Tx time difference) can be in a same measurement report.

Where, $e_2<<e_1$, thanks to higher accuracy of the carrier phase measurement—as mentioned earlier, the carrier phase measurement can have an accuracy of 0.01 to 0.05 carrier cycles. For this method to work, $e_1$ may be less than $$\frac{T_c}{2} \text{ or } \frac{T_c}{4},$$

this would imply a carrier frequency of 50 MHz or less. This is well below the carrier frequencies used in cellular systems. In other words, if the coarse estimate of $T_p$ is accurate enough to resolve the integer ambiguity the carrier phase method can be further used to improve the accuracy of $T_p$.

Now consider using two carriers for the carrier phase measurement. For the first carrier at frequency $f_{c1}$, the measured carrier phase is with integer ambiguity $N_1$, and propagation delay $T_p$ is: $\varphi_1=2\pi f_{c1}T_p-2\pi N_1$.

For the second carrier at frequency $f_{c2}$, the measured carrier phase is with integer ambiguity $N_2$, and propagation delay $T_p$ is: $\varphi_2=2\pi f_{c2}T_p-2\pi N_2$.

Subtracting $\varphi_2$ from $\varphi_1$, following equation is obtained: $\varphi_1-\varphi_2=2\pi(f_{c1}-f_{c2})T_p-2\pi(N_1-N_2)$.

This creates a virtual carrier frequency with frequency $f_{cv}=f_{c1}-f_{c2}$ and virtual phase $\varphi_v=\varphi_1-\varphi_2$. If $f_{c1}$ and $f_{c2}$ are close in value, $f_{cv}<<f_{c1}$ and $f_{cv}<<f_{c2}$. Hence, the tolerance (error) of the legacy-based positioning methods can be less than half or quarter the period of the virtual carrier allowing the traditional positioning method to estimate the number of cycles for the virtual carrier. The virtual carrier then provides a more accurate estimate.

Figure 11:
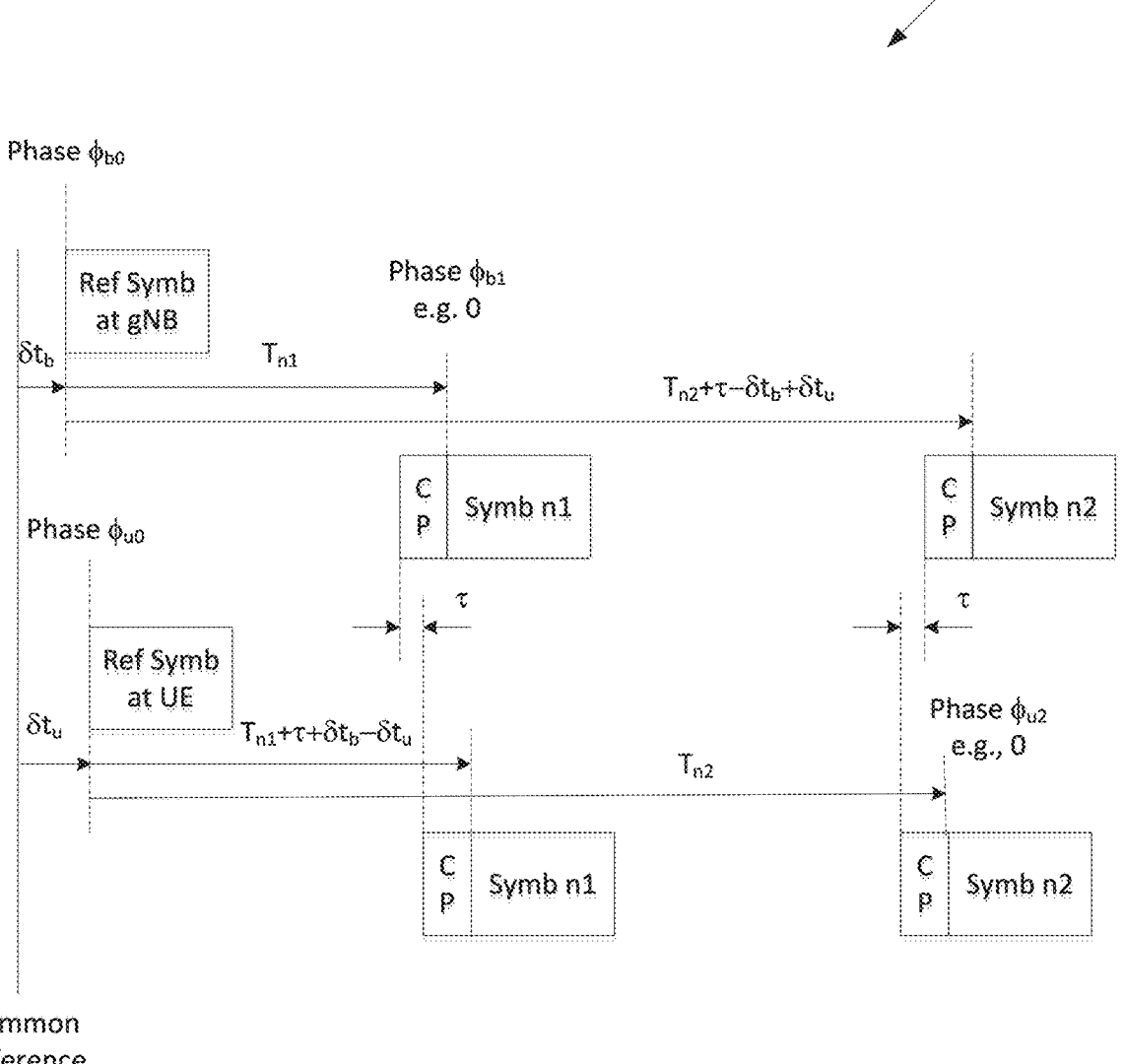
FIG. 11 illustrates an example of a carrier phase operation according to embodiments of the present disclosure.

FIG. 11 illustrates an example of a carrier phase operation 1100 according to embodiments of the present disclosure. The embodiment of the carrier phase operation 1100 illustrated in FIG. 11 is for illustration only.

FIG. 11 is an alternative illustration of the carrier phase method. The gNB has a bias in its clock relative to a common (global) reference time of $\delta t_b$. The UE has a bias in its clock relative to the common (global) reference time of $\delta t_u$. A reference symbol is determined at the gNB and the UE. For example, this can be symbol 0 (i.e., starting symbol) of a slot, a subframe, a frame or a frame with SFN 0. In an alternative example, this can be a DL PRS symbol. In an alternative example, this can be an UL PRS (or positioning SRS) symbol. In one example, the reference time of the reference signal can be the time of the transmission of the reference signal from the corresponding device. In another example, the reference time of the reference signal can be the time of the reception of the reference signal from the corresponding device.

The phase of the reference signal (or reference phase) at the gNB's reference time ($t_b=0$) is $\varphi_{b0}$. The phase of the reference signal (or reference phase) at the UE's reference time ($t_u=0$) is $\varphi_{u0}$. In one example, $\varphi_{u0}=0$. In one example, $\varphi_{b0}=0$.

The gNB transmits DL PRS n1, the DL PRS is transmitted after time $T_{n1}$ from the gNB's reference time. $T_{n1}$ can be deterministically determined, by knowing the reference symbol and the symbol of the PRS. In one example, $T_{n1}$ includes the CP of symbol n1 (DL PRS symbol). In another example, $T_{n1}$ is to the start of symbol n1 (DL PRS symbol). In one example, the phase of symbol n1 (DL PRS symbol) is $\varphi_{b1}$. In one example, $\varphi_{b1}=0$. In one example, $\varphi_{b1}$ is after the CP of symbol n1 (DL PRS symbol). In one example, $\varphi_{b1}$ is at the start of symbol n1 (DL PRS symbol).

The UE receives symbol n1 (DL PRS symbol) after a propagation delay of $\tau$. As illustrated in FIG. 11, symbol n1 (DL PRS symbol) is received after time $T_{n1}+\tau+\delta t_b-\delta t_u$ from the UE's reference time. In FIG. 11, the receive time is after the CP of symbol n1 (DL PRS symbol). In an alternative example, the receive time is at the start of symbol n1 (DL PRS symbol). The UE can measure the phase difference between the UE's reference signal (or reference phase) and the received signal.

This phase difference is: $\Delta\phi_{ue}=(\varphi_{u0}+(T_{n1}+\tau+\delta t_b-\delta t_u)2\pi f_c-\varphi_{b1})$ mod $2\pi$. In one example, $\varphi_{u0}=0$, wherein $\Delta\phi_{ue}$ or $-\Delta\phi_{ue}$ is the phase of the signal (e.g., DL positioning reference signal) transmitted from the gNB received at the UE relative to a reference time at the UE.

The UE transmits UL PRS (e.g., positioning SRS) n2, the UL PRS (e.g., positioning SRS) is transmitted after time $T_{n2}$ from the UE's reference time. $T_{n2}$ can be deterministically determined, by knowing the reference symbol and the symbol of the UL PRS (positioning SRS) and the time advance at the UE (e.g., the difference in between the start of UL slot or subframe or frame and a corresponding DL slot or subframe or frame respectively). In one example, $T_{n2}$ includes the CP of symbol n2 (UL PRS symbol or positioning SRS symbol). In another example, $T_{n2}$ is to the start of symbol n2 (UL PRS symbol or positioning SRS symbol). In one example, the phase of symbol n2 (UL PRS symbol or positioning SRS symbol) is $\varphi_{u2}$. In one example, $\varphi_{u2}=0$. In one example, $\varphi_{u2}$ is after the CP of symbol n2 (UL PRS symbol or positioning SRS symbol). In one example, $\varphi_{u2}$ is at the start of symbol n2 (UL PRS symbol or positioning SRS symbol).

The gNB receives symbol n2 (UL PRS symbol or positioning SRS symbol) after a propagation delay of $\tau$. As illustrated in FIG. 11, symbol n2 (UL PRS symbol or positioning SRS symbol) is received after time $T_{n2}+\tau-\delta t_b+\delta t_u$ from the gNB's reference time. In FIG. 11, the receive time is after the CP of symbol n2 (UL PRS symbol or positioning SRS symbol). In an alternative example, the receive time is at the start of symbol n2 (UL PRS symbol or positioning SRS symbol). The gNB can measure the phase difference between the gNB's reference signal (e.g., reference phase) and the received signal.

This phase difference is: $\Delta\phi_{bs}=(\varphi_{b0}+(T_{n2}+\tau-\delta t_b+\delta t_u)2\pi f_c-\varphi_{u2})$ mod $2\pi$. In one example, $\varphi_{b0}=0$, wherein $\Delta\phi_{bs}$ or $-\Delta\phi_{bs}$ is the phase of the signal (e.g., UL positioning reference signal) transmitted from the UE received at the gNB relative to a reference time at the UE.

By adding $\Delta\phi_{ue}$ and $\Delta\phi_{bs}$, the clock biases of the UE and gNB are eliminated. $\Delta\phi_{ue}+\Delta\phi_{bs}=(\varphi_{u0}+\varphi_{b0}+(T_{n1}+T_{n2}+2\tau)2\pi f_c-\varphi_{b1}-\varphi_{u2})$ mod $2\pi$.

In a variant example, the measured phase at the UE can remove the phase effect of $T_{n1}$, i.e.: $\Delta\varphi_{ue}=\Delta\phi_{ue}-T_{n1}2\pi f_c=(\varphi_{u0}+(\tau+\delta t_b-\delta t_u)2\pi f_c-\varphi_{b1})$ mod $2\pi$.

Similarly, the measured phase at the gNB can remove the phase effect of $T_{n2}$, i.e., $\Delta\varphi_{bs}=\Delta\phi_{bs}-T_{n2}2\pi f_c=(\varphi_{b0}+(\tau-\delta t_b+\delta t_u)2\pi f_c-\varphi_{u2})$ mod $2\pi$.

Adding, $\Delta\varphi_{ue}$ and $\Delta\varphi_{bs}$, following equation is obtained: $\Delta\varphi_{ue}+\Delta\varphi_{bs}=(\varphi_{u0}+(2\tau)2\pi f_c-\varphi_{b1}-\varphi_{u2})$ mod $2\pi$.

$T_{n1}$ and $T_{n2}$ can be determined by knowing the reference symbols and symbols of DL PRS and UL PRS (or positioning SRS) and the time advance at the UE (e.g., the difference in between the start of UL slot or subframe or frame and a corresponding DL slot or subframe or frame respectively). $\varphi_{b1}$ and $\varphi_{u2}$ can be specified in the system specification and/or configured or updated by RRC signaling and/or MAC CE signaling and/or L1 control signaling. Alternatively, $\varphi_{b1}$ and $\varphi_{u2}$ can be reported by the gNB and UE respectively. $\varphi_{b0}$ and $\varphi_{u0}$ can be reported by the gNB and UE respectively as separate parameters or can be included in the corresponding phase measurement or can have a value of 0. Hence knowing $\Delta\phi_{ue}$ and $\Delta\phi_{bs}$ the propagation delay $\tau$ and corresponding the distance can be determined. While the clock biases have been eliminated by adding $\Delta\phi_{ue}$ and $\Delta\phi_{bs}$, the integer ambiguity is still there.

FIG. 11 illustrates that symbol n1, e.g., DL PRS symbol, is transmitted before symbol n2, e.g., UL PRS (or positioning SRS) symbol. In an alternative example, UL PRS (or positioning SRS) symbol is transmitted before DL PRS symbol.

A gNB or TRP or base station is configured to transmit a positioning reference signal in the downlink direction, e.g., the positioning reference signal is a DL positioning reference signal (PRS).

A UE is configured to receive a positioning reference signal in the downlink direction, e.g., the positioning reference signal is a DL positioning reference signal (PRS).

The configuration of the downlink PRS can include: (1) time domain resources, e.g., number of symbols and starting position within a slot of DL PRS; (2) time domain behavior, whether transmission is aperiodic, semi-persistent or periodic transmission, including periodicity and/or offset for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., neither, group Hopping or sequence Hopping).

Some of the aforementioned parameters can be common across the multiple TRPs, e.g., configured with a common configuration, and some can be distinct, e.g., specific for each TRP.

In one example, the reception of the DL PRS at the UE is Omni-directional, e.g., a same spatial receive filter can receive transmissions from multiple TRPs.

In one example, the reception of the DL PRS at the UE from different TRPs is on separate beams wherein a reception on a beam is from one or more TRPs.

In one example, the gNB reports (e.g., to UE or to LMF) the reference symbol (e.g., corresponding to a reference time in the gNB). The start of the reference symbol can be used for determining the reference phase $\varphi_{b01}$. In one example, $\varphi_{b01}=0$. The reference symbol can be reported as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; (15) symbol 0 of frame (SFN) 0; (16) the symbol of the DL PRS; and (17) the first DL PRS symbol in the slot in which DL PRS is transmitted.

In one example, the gNB is configured the reference symbol (e.g., corresponding to a reference time in the gNB). The start of the reference symbol can be used for determining the reference phase $\varphi_{b01}$. In one example, $\varphi_{b01}=0$. The configuration can be by RRC signaling and/or MAC CE signaling and/or L1 control (e.g., DCI) signaling. The reference symbol can be configured as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame; (13) most recent Symbol 0 within subframe l; (14) symbol 0 within frame k; (15) symbol 0 of frame (SFN) 0; (16) the symbol of the DL PRS; and (17) the first DL PRS symbol in the slot in which DL PRS is transmitted.

In one example, the reference symbol (e.g., corresponding to a reference time in the gNB) can be specified in the system specification. In one example, the default value is specified in the system specifications and is used if no other value is configured by RRC signaling and/or MAC CE signaling and/or L1 control (e.g., DCI) signaling. e.g., reference time can be start of DL or UL symbol 0 of SFN 0, or the symbol of the DL PRS, or the first DL PRS symbol in the slot in which DL PRS is transmitted.

In one example, the gNB reports (e.g., to UE or to LMF) the phase at the start of the reference symbol, i.e., $\varphi_{b01}$. In one example, $\varphi_{b01}=0$.

In one example, the gNB reports (e.g., to UE or to LMF) the phase at the start of the reference symbol, i.e., $\varphi_{b01}$ for one subcarrier. In one example, the sub-carrier is at the middle (or center) of the DL positioning reference signal allocation. In one example, the sub-carrier is at the start of the DL positioning reference signal allocation. In one example, the sub-carrier is at the end of the DL positioning reference signal allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the gNB reports (e.g., to UE or to LMF) the phase at the start of the reference symbol, i.e., $\varphi_{b01}$ for all sub-carriers of the DL positioning reference signal. In one example, the phase at the start of the reference symbol, i.e., $\varphi_{b01}$, is the same for all sub-carriers.

In one example, $\varphi b_{01}=0$.

In one example, the gNB reports (e.g., to UE or to LMF) the phase at the start of the reference symbol, i.e., $\varphi_{b01}$ for each (or some) PRB of the DL positioning reference signal. In one example, the reported carrier phase corresponds to common resource block 0. In one example, $\varphi_{b01}=0$. In one example, the reported carrier phase corresponds to a PRB at the start of the DL positioning reference signal allocation. In one example, the reported carrier phase corresponds to a PRB at the end of the DL positioning reference signal allocation. In one example, the reported carrier phase corresponds to a PRB at the center of the DL positioning reference signal allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the reference symbol is the symbol of the DL positioning reference signal. The gNB can report the phase at the start of that reference signal according to examples in the present disclosure.

In one example, the gNB reports an indication (e.g., to UE or to LMF) if phase continuity has been maintained between the reference time (e.g., most recent reference time) and the transmission of the corresponding DL positioning reference signal.

In one example, the gNB reports an indication (e.g., to UE or to LMF) if phase continuity is not maintained between the reference time (e.g., most recent reference time) and the transmission of the corresponding DL positioning reference signal.

In one example, the gNB reports an indication (e.g., to UE or to LMF) if phase continuity is maintained between the reference time (e.g., most recent reference time) and the transmission of the corresponding DL positioning reference signal.

In one example, the gNB reports an indication (e.g., to UE or to LMF) if phase continuity is maintained or is not maintained between the reference time (e.g., most recent reference time) and the transmission of the corresponding DL positioning reference signal.

In one example, the gNB transmits the DL PRS if phase continuity is maintained between the start of the DL PRS transmissions and corresponding reference time.

In one example, the gNB transmits the DL PRS regardless of whether or not phase continuity is maintained between the start of the DL PRS transmissions and corresponding reference time.

In one example, the gNB reports an indication (e.g., to UE or to LMF), if phase continuity is maintained between a slot in which the DL PRS is transmitted and the most recent previous slot in which a second DL PRS has been transmitted.

In one example, the gNB reports an indication (e.g., to UE or to LMF), if phase continuity is not maintained between a slot in which the DL PRS is transmitted and the most recent previous slot in which a second DL PRS has been transmitted.

In one example, the gNB reports an indication (e.g., to UE or to LMF), whether or not phase continuity is maintained between a slot in which the DL PRS is transmitted and the most recent previous slot in which a second DL PRS has been transmitted.

In one example, the gNB reports an indication (e.g., to UE or to LMF), if phase continuity is maintained between a symbol in which the DL PRS is transmitted and the most recent previous symbol in which a second DL PRS has been transmitted.

In one example, the gNB reports an indication (e.g., to UE or to LMF), if phase continuity is not maintained between a symbol in which the DL PRS is transmitted and the most recent previous symbol in which a second DL PRS has been transmitted.

In one example, the gNB reports an indication (e.g., to UE or to LMF), whether or not phase continuity is maintained between a symbol in which the DL PRS is transmitted and the most recent previous symbol in which a second DL PRS has been transmitted.

In one example, for the aforementioned examples, the second DL PRS transmission has same DL PRS resource ID as that of the DL PRS transmitted in the slot or the symbol.

In one example, for the aforementioned examples, the second DL PRS transmission has same DL PRS resource set ID as that of the DL PRS transmitted in the slot or the symbol.

In one example, for the aforementioned examples, the second DL PRS transmission has same DL PRS ID as that of the DL PRS transmitted in the slot or the symbol.

In one example, for the aforementioned examples, the second DL PRS transmission has same quasi-co-location source RS or TCI state as that of the DL PRS transmitted in the slot or the symbol.

In one example, for the aforementioned examples, the second DL PRS is transmitted to UE U. In one example, the TRP can be configured with U by RRC signaling and/or MAC CE singling and or L1 control (e.g., DCI) signaling. In another example, U is the same as that of the DL PRS transmitted in the slot or the symbol.

In one example, the gNB reports an indication (e.g., to UE or to LMF), if phase continuity is maintained between DL PRS symbols transmitted in a slot.

In one example, the gNB reports an indication (e.g., to UE or to LMF), if phase continuity is not maintained between DL PRS symbols transmitted in a slot.

In one example, the gNB reports an indication (e.g., to UE or to LMF), whether or not phase continuity is maintained between DL PRS symbols transmitted in a slot.

In one example, phase continuity between a symbol transmitted at time $T_{n1}$ and a symbol transmitted at time $T_{n2}$ is maintained if the phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. In one example, the carrier phase can be the phase at the antenna port. In one example, the carrier phase can be the phase at the output of the antenna. In one example, the carrier phase can be the phase at the start of the symbol. In one example the carrier phase can be the phase after the CP of the symbol.

In one example, one or more of the following can lead to the carrier phase continuity not being maintained: (1) a change in the RF chain; (2) a change in quasi-co-location; (3) a change in the transmission spatial filter; (4) a time advance or time retard between symbols; or (5) the phase lock loop getting out of sync or slipping.

In one example, the UE reports (e.g., to gNB or to LMF) the reference symbol (e.g., corresponding to a reference time in the UE). The start of the reference symbol can be used for determining the reference phase $\varphi_{u01}$. In one example, $\varphi_{u01}=0$. The reference symbol can be reported as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; and (15) symbol 0 of frame (SFN) 0.

In one example, the UE is configured the reference symbol (e.g., corresponding to a reference time in the UE). The start of the reference symbol can be used for determining the reference phase $\varphi_{u01}$. In one example, $\varphi_{u01}=0$. The configuration can be by RRC signaling and/or MAC CE signaling and/or L1 control (e.g., DCI) signaling. The reference symbol can be configured as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (11) most recent Symbol 0 within slot m; (12) symbol 0 within slot m within frame k; (13) symbol 0 within subframe l within frame k; (14) most recent Symbol 0 within subframe l; (15) symbol 0 within frame k; (16) symbol 0 of frame (SFN) 0; (17) the symbol of the DL PRS. This can be based on the UE's time reference; and (18) the first DL PRS symbol in the slot in which DL PRS is received. This can be based on the UE's time reference.

In one example, the reference symbol (e.g., corresponding to a reference time in the UE) can be specified in the system specification. In one example, the default value is specified in the system specifications and is used if no other value is configured by RRC signaling and/or MAC CE signaling and/or L1 control (e.g., DCI) signaling. e.g., reference time can be start of DL or UL symbol 0 of SFN 0, or the symbol of the DL PRS (e.g., based on the UE's time reference), or the first DL PRS symbol in the slot in which DL PRS is received (e.g., based on the UE's time reference).

In one example, the UE reports (e.g., to gNB or to LMF) the phase at the start of the reference symbol, i.e., $\varphi_{u01}$. In one example, $\varphi_{u01}=0$.

In one example, the UE reports (e.g., to gNB or to LMF) the phase at the start of the reference symbol, i.e., $\varphi_{u01}$ for one subcarrier. In one example, the sub-carrier is at the middle (or center) of the DL positioning reference signal allocation. In one example, the sub-carrier is at the start of the DL positioning reference signal allocation. In one example, the sub-carrier is at the end of the DL positioning reference signal allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the UE reports (e.g., to gNB or to LMF) the phase at the start of the reference symbol, i.e., $\varphi_{u01}$ for all sub-carriers of the DL positioning reference signal. In one example, the phase at the start of the reference symbol, i.e., $\varphi_{u01}$, is the same for all sub-carriers. In one example, $\varphi_{u01}=0$.

In one example, the UE reports (e.g., to gNB or to LMF) the phase at the start of the reference symbol, i.e., $\varphi_{u01}$ for each (or some) PRB of the DL positioning reference signal. In one example, the reported carrier phase corresponds to common resource block 0. In one example, $\varphi_{u0i}=0$. In one example, the reported carrier phase corresponds to a PRB at the start of the DL positioning reference signal allocation. In one example, the reported carrier phase corresponds to a PRB at the end of the DL positioning reference signal allocation. In one example, the reported carrier phase corresponds to a PRB at the center of the DL positioning reference signal allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the reference symbol is the symbol of the DL positioning reference signal. The UE can report the phase at the start of that reference signal according to examples in the present disclosure.

In one example, the UE reports an indication (e.g., to gNB or to LMF) if phase continuity has been maintained between the reference time (e.g., most recent reference time) and the reception of the corresponding DL positioning reference signal.

In one example, the UE reports an indication (e.g., to gNB or to LMF) if phase continuity is not maintained between the reference time (e.g., most recent reference time) and the reception of the corresponding DL positioning reference signal.

In one example, the UE reports an indication (e.g., to gNB or to LMF) if phase continuity is maintained between the reference time (e.g., most recent reference time) and the reception of the corresponding DL positioning reference signal.

In one example, the UE reports an indication (e.g., to gNB or to LMF) if phase continuity is maintained or is not maintained between the reference time (e.g., most recent reference time) and the reception of the corresponding DL positioning reference signal.

In one example, the UE reports an indication (e.g., to gNB or to LMF), if phase continuity is maintained between a slot in which the DL PRS is received and the most recent previous slot in which a second DL PRS has been received.

In one example, the UE reports an indication (e.g., to gNB or to LMF), if phase continuity is not maintained between a slot in which the DL PRS is received and the most recent previous slot in which a second DL PRS has been received.

In one example, the UE reports an indication (e.g., to gNB or to LMF), whether or not phase continuity is maintained between a slot in which the DL PRS is received and the most recent previous slot in which a second DL PRS has been received.

In one example, the UE reports an indication (e.g., to gNB or to LMF), if phase continuity is maintained between a symbol in which the DL PRS is received and the most recent previous symbol in which a second DL PRS has been received.

In one example, the UE reports an indication (e.g., to gNB or to LMF), if phase continuity is not maintained between a symbol in which the DL PRS is received and the most recent previous symbol in which a second DL PRS has been received.

In one example, the UE reports an indication (e.g., to gNB or to LMF), whether or not phase continuity is maintained between a symbol in which the DL PRS is received and the most recent previous symbol in which a second DL PRS has been received.

In one example, for the aforementioned examples, the second DL PRS reception has same DL PRS resource ID as that of the DL PRS received in the slot or the symbol.

In one example, for the aforementioned examples, the second DL PRS reception has same DL PRS resource set ID as that of the DL PRS received in the slot or the symbol.

In one example, for the aforementioned examples, the second DL PRS reception has same DL PRS ID as that of the DL PRS received in the slot or the symbol.

In one example, for the aforementioned examples, the second DL PRS reception has same quasi-co-location source RS or TCI state as that of the DL PRS received in the slot or the symbol.

In one example, for the aforementioned examples, the second DL PRS is received from cell C or TRP T or gNB G. In one example, the UE can be configured with C or T or G by RRC signaling and/or MAC CE singling and or L1 control (e.g., DCI) signaling. In another example, C or T or G are the same as that of the DL PRS transmitted in the slot or the symbol.

In one example, the UE reports an indication (e.g., to gNB or to LMF), if phase continuity is maintained for DL PRS symbols received in a slot.

In one example, the UE reports an indication (e.g., to gNB or to LMF), if phase continuity is not maintained for DL PRS symbols received in a slot.

In one example, the UE reports an indication (e.g., to gNB or to LMF), whether or not phase continuity is maintained for DL PRS symbols received in a slot.

In one example, phase continuity between a reference phase for a symbol received at time $T_{n1}$ and a reference phase for a symbol received at time $T_{n2}$ is maintained if the reference phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, the UE measures the phase between reference signal (e.g., reference phase) and corresponding received DL PRS symbol, e.g., the UE measures the carrier phase of the received DL PRS, for example, this measurement can be relative to the reference phase of the UE.

The reference signal generated at the UE is given by (in complex domain). $A_r e^{j2\pi f t_u + j\varphi_{u01}}$.

In the real domain, the signal is given by: $A_r \cos(2\pi f t_u + \varphi_{u01})$ Where: (1) $A_r$ is the amplitude of the reference signal; (2) $f$ is the carrier frequency; (3) $t_u$ is the time relative to the UE's reference time using the UE's clock. $t_u$ can be given by $t_u = t + \delta t_u$, where t is according to the common (global) time reference and $\delta t_u$ is the bias in the UE's clock; and (4) $\varphi_{u01}$ is the phase of the reference signal at the UE's reference time. In one example, $\varphi_{u01}=0$, for example the phase difference between the received DL positioning reference signal and a reference signal of the UE is the phase of the received DL positioning reference signal.

The received DL PRS at the UE, which corresponds to the DL PRS transmitted time $\tau$ earlier is given by (in complex domain): $A_s e^{j2\pi f(t_b - \tau) + j\varphi_{b01}}$.

In the real domain, the signal is given by: $A_s \cos(2\pi f(t_b - \tau) + \varphi_{b01})$ where: (1) $A_s$ is the amplitude of the DL positioning reference signal; (2) $f$ is the carrier frequency; (3) $\tau$ is the propagation delay from the gNB to the UE; (4) $t_b$ is the time relative to the gNB's reference time using the gNB's clock. $t_b$ can be given by $t_b = t + \delta t_b$, where t is according to the common (global) time reference and $\delta t_b$ is the bias in the gNB's clock; and (5) $\varphi_{b01}$ is the phase of the reference signal at the gNB's reference time. In one example, $\varphi_{b01}=0$.

In one example, to measure the phase difference at the UE can multiply the reference signal (e.g., corresponding to the reference phase) by the complex conjugate of the received DL positioning reference signal at the UE. i.e., $A_r e^{j2\pi f t_u + j\varphi_{u01}} A_s e^{-j2\pi f(t_b - \tau) - j\varphi_{b01}} = A_r A_s e^{j2\pi f(t_u - t_b + \tau) + j\varphi_{u01} - j\varphi_{b01}}$.

Therefore, the phase difference is: $2\pi f(t_u - t_b + \tau) + \varphi_{u01} - \varphi_{b01}$, which equals $2\pi f(\delta t_u - \delta t_b + \tau) + \varphi_{u01} - \varphi_{b01}$.

In on example, a similar result can be found if the signals are multiplied in the real domain and passed through a low pass filter to eliminate the double carrier frequency component. The results is $$\frac{A_r A_s}{2} \cos(2\pi f(t_u - t_b + \tau) + \phi_{u01} - \phi_{b01}).$$

Giving the same phase difference as before, which is: $2\pi f(t_u - t_b + \tau) + \varphi_{u01} - \varphi_{b01}$.

In one example, if $\varphi_{u01} = \varphi_{b01}$, the phase difference is $2\pi f(t_u - t_b + \tau)$.

In one example, if $\varphi_{u01} = \varphi_{b01} = 0$, the phase difference is $2\pi f(t_u - t_b + \tau)$.

In one example, the UE reports (e.g., to gNB or to LMF) the measured phase difference between the reference signal (e.g., reference phase) and the corresponding received DL positioning reference signal of a TRP or gNB e.g., the UE measures the carrier phase of the received DL PRS from a TRP or gNB, for example, this measurement can be relative to the reference phase of the UE.

In one example, the phase difference (e.g., carrier phase of received DL PRS in a PRS occasion) is reported if DL PRS is detected and measured.

In one example, the phase difference (e.g., carrier phase of received DL PRS in a PRS occasion) is reported if phase continuity is maintained between the corresponding reference time (e.g., most recent) and time of reception of the DL positioning reference signal.

In one example, the phase difference (e.g., carrier phase of received DL PRS in a PRS occasion) is reported regardless of maintaining phase continuity between the corresponding reference time (e.g., most recent) and time of reception of the DL positioning reference signal. In a further example, an indication; is included within the measurement report or in a separate message, that indicates whether or not phase continuity is maintained between the corresponding reference time (e.g., most recent) and time of reception of the DL positioning reference signal corresponding to the phase difference (e.g., carrier phase of received DL PRS) measurement.

In one example, the phase difference (e.g., carrier phase of received DL PRS in a PRS occasion) is reported if phase continuity is maintained between the DL positioning reference signal occasion corresponding to most recent (previous) phase difference (e.g., carrier phase of received DL PRS) measurement and the DL positioning reference signal occasion corresponding to current phase difference (e.g., carrier phase of received DL PRS) measurement.

In one example, the phase difference (e.g., carrier phase of received DL PRS in a PRS occasion) is reported regardless of maintaining phase continuity between the DL positioning reference signal occasion corresponding to most recent (previous) phase difference (e.g., carrier phase of received DL PRS) measurement and the DL positioning reference signal occasion corresponding to current phase difference (e.g., carrier phase of received DL PRS) measurement. In a further example, an indication; is included within the measurement report or in a separate message, that indicates whether or not phase continuity is maintained between the DL positioning reference signal occasion corresponding to most recent (previous) phase difference (e.g., carrier phase of received DL PRS) measurement and the DL positioning reference signal occasion corresponding to current phase difference (e.g., carrier phase of received DL PRS) measurement.

In one example, the phase difference (e.g., carrier phase of received DL PRS in a PRS occasion) is reported if phase continuity is maintained within the DL positioning reference signal occasion corresponding to current phase difference (e.g., carrier phase of received DL PRS) measurement.

In one example, the phase difference (e.g., carrier phase of received DL PRS in a PRS occasion) is reported whether or not phase continuity is maintained within the DL positioning reference signal occasion corresponding to current phase difference (e.g., carrier phase of received DL PRS) measurement. In a further example, an indication; is included within the measurement report or in a separate message, that indicates whether or not phase continuity is maintained within the DL positioning reference signal occasion corresponding to current phase difference (e.g., carrier phase of received DL PRS) measurement.

In one example, the UE reports the phase difference (e.g., carrier phase of received DL PRS in a PRS occasion) for one subcarrier (or frequency). In one example, the sub-carrier is at the middle (or center) of the DL positioning reference signal allocation. In one example, the sub-carrier is at the start of the DL positioning reference signal allocation. In one example, the sub-carrier is at the end of the DL positioning reference signal allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the UE reports (e.g., to gNB or to LMF) the phase difference (e.g., carrier phase of received DL PRS in a PRS occasion) for all (e.g., each) sub-carriers of the DL positioning reference signal.

In one example, the UE reports (e.g., to gNB or to LMF) the phase difference (e.g., carrier phase of received DL PRS in a PRS occasion) for N sub-carriers of the DL positioning reference signal. Wherein, N can be specified in the system specifications and/or configured or updated by higher layer RRC signaling and/or MAC CE signaling and/or L1 control (e.g., DCI) signaling.

In one example, the UE reports (e.g., to gNB or to LMF) the phase difference (e.g., carrier phase of received DL PRS in a PRS occasion) for some sub-carriers of the DL positioning reference signal. Wherein, the frequency between sub-carriers is P and the offset of the first sub-carrier (e.g., relative to the start of the PRS allocation or to the start of a BWP or to point-A) is 0. Wherein, P or O can be specified in the system specifications and/or configured or updated by higher layer RRC signaling and/or MAC CE signaling and/or L1 control (e.g., DCI) signaling.

In one example, the UE reports (e.g., to gNB or to LMF) the phase difference (e.g., carrier phase of received DL PRS in a PRS occasion) for the carrier frequency. For example, this can be an average or a composite value computed for all sub-carriers.

In one example, the UE reports (e.g., to gNB or to LMF) the phase difference (e.g., carrier phase of received DL PRS in a PRS occasion) for each (or some) PRB of the DL positioning reference signal. In one example, the reported carrier phase corresponds to common resource block 0. In one example, the reported carrier phase corresponds to a PRB at the start of the DL positioning reference signal allocation. In one example, the reported carrier phase corresponds to a PRB at the end of the DL positioning reference signal allocation. In one example, the reported carrier phase corresponds to a PRB at the center of the DL positioning reference signal allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, UE reports the phase difference (e.g., carrier phase of received DL PRS in a PRS occasion) of the first (earliest) multi-path component (e.g., first detected multi-path component). In a further example, the UE may report for the first (earliest) multi-path along with the carrier phase, the RSRPP or ratio between the power of the first (earliest) multi-path to the total power (or the power of the remaining multi-path).

In one example, a UE is provided a threshold, wherein the threshold can be specified in the system specifications and/or configured or updated by higher layer RRC signaling and/or MAC CE signaling and/or L1 control (e.g., DCI) signaling. UE measures/reports the phase difference (e.g., carrier phase of received DL PRS in a PRS occasion) of the first (earliest) multi-path component (e.g., first detected multi-path component) if the RSRPP exceeds the threshold, or in an alternative example if the ratio between the power of the first (earliest) multi-path to the total power (or the power of the remaining multi-path) exceeds the threshold. In a further example, the UE may report for the first (earliest) multi-path along with the carrier phase, the RSRPP or ratio between the power of the first (earliest) multi-path to the total power (or the power of the remaining multi-path).

In one example, UE reports the phase difference (e.g., carrier phase of received DL PRS in a PRS occasion) of each multi-path component (e.g., each detected multi-path component). In a further example, the UE may report for each multi-path, along with the carrier phase, the RSRPP and/or delay (e.g., relative to the first (earliest) multi-path) of the multi-path.

In one example, a UE is provided a threshold, wherein the threshold can be specified in the system specifications and/or configured or updated by higher layer RRC signaling and/or MAC CE signaling and/or L1 control (e.g., DCI) signaling. In one example, the threshold can be a relative threshold between power of a multi-path component to the total power. In one example, the threshold can be a relative threshold between power of a multi-path component to the power of the first (earliest) multi-path component. UE reports the phase difference (e.g., carrier phase of received DL PRS in a PRS occasion) of each multi-path component with RSRPP that exceeds the threshold (e.g., each detected multi-path component with RSRPP that exceeds the threshold). In a further example, the UE may report for each multi-path, along with the carrier phase, the RSRPP and/or delay (e.g., relative to the first (earliest) multi-path) of the multi-path.

In one example, for the aforementioned examples, a PRS occasion can be one PRS symbol.

In one example, for the aforementioned examples, a PRS occasion can be all PRS symbols of a slot.

In one example, for the aforementioned examples, a PRS occasion can be a subset of PRS symbols of a slot.

In one example, for the aforementioned examples, phase continuity between a reference phase for a symbol received at time $T_{n1}$ and a reference phase for a symbol received at time $T_{n2}$ is maintained if the reference phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, the UE reports (e.g., to gNB or to LMF) the measured phase difference between a first received DL positioning reference signal of a first TRP or first gNB and a second received DL positioning reference signal of a second TRP or second gNB.

In one example, the phase difference is measured/reported if DL PRS is detected and measured from each TRP.

In one example, a UE is provided a threshold (or time window), wherein the threshold can be specified in the system specifications and/or configured or updated by higher layer RRC signaling and/or MAC CE signaling and/or L1 control (e.g., DCI) signaling. The phase difference is measured/reported if time gap (or time window) between DL PRS of first TRP/gNB and DL PRS of second TRP/gNB does not exceed the threshold. In one example, the threshold can be in units of symbols. In one example, the threshold can be in units of slots. In one example, the threshold can be in units of subframes. In one example, the threshold can be in units of frames.

In one example, the phase difference is reported if phase continuity is maintained between the first PRS occasion of the first TRP/gNB and the second PRS occasion of the second TRP/gNB corresponding to the phase difference measurement.

In one example, the phase difference is reported regardless of maintaining phase continuity between the first PRS occasion of the first TRP/gNB and the second PRS occasion of the second TRP/gNB corresponding to the phase difference measurement. In a further example, an indication; is included within the measurement report or in a separate message, that indicates whether or not phase continuity is maintained between the first PRS occasion of the first TRP/gNB and the second PRS occasion of the second TRP/gNB corresponding to the phase difference measurement.

In one example, the phase difference is reported if phase continuity is maintained within the DL positioning reference signal occasion, of the first TRP/gNB and the second TRP/gNB, corresponding to current phase difference (e.g., carrier phase of received DL PRS) measurement.

In one example, the phase difference is reported whether or not phase continuity is maintained within the DL positioning reference signal occasion, of the first TRP/gNB and the second TRP/gNB, corresponding to current phase difference (e.g., carrier phase of received DL PRS) measurement. In a further example, an indication; is included within the measurement report or in a separate message, that indicates whether or not phase continuity is maintained within the DL positioning reference signal occasion, of the first TRP/gNB and/or the second TRP/gNB corresponding to current phase difference (e.g., carrier phase of received DL PRS) measurement.

In one example, the PRS allocation of the first TRP/gNB and the second TRP/gNB are the same.

In one example, the PRS allocation of the first TRP/gNB and the second TRP/gNB can be different, but within a certain frequency gap.

In one example, the UE reports the phase difference for one subcarrier. In one example, the sub-carrier is at the middle (or center) of the DL positioning reference signal allocation. In one example, the sub-carrier is at the start of the DL positioning reference signal allocation. In one example, the sub-carrier is at the end of the DL positioning reference signal allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; or (3) the sub-carrier with the lower frequency of the two middle sub-carriers.

In one example, the UE reports (e.g., to gNB or to LMF) the phase difference for all (e.g., each) sub-carriers of the DL positioning reference signal.

In one example, the UE reports (e.g., to gNB or to LMF) the phase difference for N sub-carriers of the DL positioning reference signal. Wherein, N can be specified in the system specifications and/or configured or updated by higher layer RRC signaling and/or MAC CE signaling and/or L1 control (e.g., DCI) signaling.

In one example, the UE reports (e.g., to gNB or to LMF) the phase difference for some sub-carriers of the DL positioning reference signal. Wherein, the frequency between sub-carriers is P and the offset of the first sub-carrier (e.g., relative to the start of the PRS allocation or to the start of a BWP or to point-A) is O. Wherein, P or O can be specified in the system specifications and/or configured or updated by higher layer RRC signaling and/or MAC CE signaling and/or L1 control (e.g., DCI) signaling.

In one example, the UE reports (e.g., to gNB or to LMF) the phase difference for the carrier frequency. For example, this can be an average or a composite value computed for all sub-carriers.

In one example, the UE reports (e.g., to gNB or to LMF) the phase difference for each (or some) PRB of the DL positioning reference signal. In one example, the reported carrier phase corresponds to common resource block 0. In one example, the reported carrier phase corresponds to a PRB at the start of the DL positioning reference signal allocation. In one example, the reported carrier phase corresponds to a PRB at the end of the DL positioning reference signal allocation. In one example, the reported carrier phase corresponds to a PRB at the center of the DL positioning reference signal allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; or (3) the sub-carrier with the lower frequency of the two middle sub-carriers.

In one example, UE reports the phase difference based on the first (earliest) multi-path component (e.g., first detected multi-path component) of each TRP. In a further example, the UE may report for the first (earliest) multi-path of each TRP along with the carrier phase, the RSRPP or ratio between the power of the first (earliest) multi-path to the total power (or the power of the remaining multi-path).

In one example, a UE is provided a threshold, wherein the threshold can be specified in the system specifications and/or configured or updated by higher layer RRC signaling and/or MAC CE signaling and/or L1 control (e.g., DCI) signaling. UE reports the phase difference based on the first (earliest) multi-path component of each TRP (e.g., first detected multi-path component) if the RSRPP exceeds the threshold, or in an alternative example if the ratio between the power of the first (earliest) multi-path to the total power (or the power of the remaining multi-path) exceeds the threshold. In a further example, the UE may report for the first (earliest) multi-path of each TRP along with the carrier phase, the RSRPP or ratio between the power of the first (earliest) multi-path to the total power (or the power of the remaining multi-path).

In one example, UE reports the phase difference (e.g., carrier phase of received DL PRS in a PRS occasion) based on each multi-path component for each TRP (e.g., each detected multi-path component). In a further example, the UE may report for each multi-path for each, along with the carrier phase, the RSRPP and/or delay (e.g., relative to the first (earliest) multi-path) of the multi-path.

In one example, a UE is provided a threshold, wherein the threshold can be specified in the system specifications and/or configured or updated by higher layer RRC signaling and/or MAC CE signaling and/or L1 control (e.g., DCI) signaling. In one example, the threshold can be a relative threshold between power of a multi-path component to the total power. In one example, the threshold can be a relative threshold between power of a multi-path component to the power of the first (earliest) multi-path component. UE reports the phase difference (e.g., carrier phase of received DL PRS in a PRS occasion) based on each multi-path component for each TRP with RSRPP that exceeds the threshold (e.g., each detected multi-path component with RSRPP that exceeds the threshold). In a further example, the UE may report for each multi-path for each TRP, along with the carrier phase, the RSRPP and/or delay (e.g., relative to the first (earliest) multi-path) of the multi-path.

In one example, for the aforementioned examples, a PRS occasion can be one PRS symbol.

In one example, for the aforementioned examples, a PRS occasion can be all PRS symbols of a slot.

In one example, for the aforementioned examples, a PRS occasion can be a subset of PRS symbols of a slot.

In one example, for the aforementioned examples, phase continuity between a reference phase for a symbol received at time $T_{n1}$ (e.g., from a first TRP/gNB) and a reference phase for a symbol received at time $T_{n2}$ (e.g., from a second TRP/gNB) is maintained if the reference phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, a first TRP transmits DL PRS at symbol n1 at time $T_{n1}$, e.g., $T_{n1}$ is the time of the start of symbol n1 or the time after the CP of symbol n1. The phase of the received signal from the first TRP in symbol n1 is $\varphi_1(T_{n1})$. A second TRP transmits DL PRS at symbol n2 at time $T_{n2}$, e.g., $T_{n2}$ is the time of the start of symbol n2 or the time after the CP of symbol n2. The phase of the received signal from the first TRP in symbol n2 is $\varphi_2$ $(T_{n2})$. The following examples can be further considered.

In one example, n1=n2.

In one example, n1 is the closest DL PRS symbol transmitted by the first TRP to a DL PRS symbol n2 transmitted by the second TRP.

In one example, n2 is the closest DL PRS symbol transmitted by the second TRP to a DL PRS symbol n1 transmitted by the first TRP.

In one example, the UE reports (e.g., to LMF and/or gNB) the phase difference between phase of the DL PRS signal from first TRP at time $T_{n1}$, and the phase of the DL PRS signal from second TRP at time $T_{n2}$. For example, the UE reports $\varphi_1(T_{n1})-\varphi_2(T_{n2})$ or the UE reports $\varphi_2(T_{n2})-\varphi_1(T_{n1})$.

In one example, the UE reports (e.g., to LMF and/or gNB) the phase difference between phase of the DL PRS signal from first TRP at time $T_{n1}$, and the phase of the DL PRS signal from second TRP at time $T_{n1}$. For example, the UE reports $\varphi_1(T_{n1})-\varphi_2(T_{n1})$ or the UE reports $\varphi_2(T_{n1})-\varphi_1(T_{n1})$. For example, the UE can determine the phase of the second TRP at time $T_{n1}$ as $\varphi_2(T_{n1})=\varphi_2(T_{n2})+2\pi f(T_{n1}-T_{n2})$, wherein f is the frequency at which the carrier phase is calculated. Alternatively, $\varphi_2(T_{n1})=\varphi_2(T_{n2})+2\pi f(T_{n2}-T_{n1})$.

In one example, the UE reports (e.g., to LMF and/or gNB) the phase difference between phase of the DL PRS signal from first TRP at time $T_{n2}$, and the phase of the DL PRS signal from second TRP at time $T_{n2}$. For example, the UE reports $\varphi_1(T_{n2})-\varphi_2(T_{n2})$ or the UE reports $\varphi_2(T_{n2})-\varphi_1(T_{n2})$. For example, the UE can determine the phase of the first TRP at time $T_{n2}$ as $\varphi_1(T_{n2})=\varphi_1(T_{n1})+2\pi f(T_{n2}-T_{n1})$, wherein f is the frequency at which the carrier phase is calculated. Alternatively, $\varphi_1(T_{n2})=\varphi_1(T_{n1})+2\pi f(T_{n1}-T_{n2})$.

A UE is configured to transmit a positioning reference signal in the uplink direction, e.g., the positioning reference signal is a UL positioning reference signal (PRS) or positioning SRS.

A gNB or TRP or base station is configured to receive a positioning reference signal in the uplink direction, e.g., the positioning reference signal is a UL positioning reference signal (PRS) or positioning SRS.

The configuration of the uplink PRS or positioning SRS can include: (1) time domain resources, e.g., number of symbols and starting position within a slot of UL PRS or positioning SRS; (2) time domain behavior, whether transmission is aperiodic, semi-persistent or periodic transmission, including periodicity and/or offset for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., neither, groupHopping nor sequenceHopping).

Some of the aforementioned parameters can be common across the multiple TRPs, e.g., configured with a common configuration, and some can be distinct, e.g., specific for each TRP receiving the UL PRS or positioning SRS.

In one example, the transmission of the UL PRS or positioning SRS at the UE is Omni-directional, e.g., a same spatial receive filter can transmit to multiple TRPs.

In one example, the transmission of the UL PRS or positioning SRS at the UE to different TRPs is on separate beams wherein a transmission on a beam is to one or more TRPs.

In one example, the UE reports (e.g., to gNB or to LMF) the reference symbol (e.g., corresponding to a reference time in the UE). The start of the reference symbol can be used for determining the reference phase $\varphi_{u02}$. In one example, $\varphi_{u02}=0$.

The reference symbol can be reported as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; (15) symbol 0 of frame (SFN) 0; (16) the symbol of the UL PRS (e.g., positioning SRS); and (17) the first UL PRS (e.g., positioning SRS) symbol in the slot in which UL PRS (e.g., positioning SRS) is transmitted.

In one example, the UE is configured the reference symbol (e.g., corresponding to a reference time in the UE). The start of the reference symbol can be used for determining the reference phase $\varphi_{u02}$. In one example, $\varphi_{u02}=0$.

The configuration can be by RRC signaling and/or MAC CE signaling and/or L1 control (e.g., DCI) signaling. The reference symbol can be configured as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; (15) symbol 0 of frame (SFN) 0; (16) the symbol of the UL PRS (e.g., positioning SRS); and (17) the first UL PRS (e.g., positioning SRS) symbol in the slot in which UL PRS (e.g., positioning SRS) is transmitted.

In one example, the reference symbol (e.g., corresponding to a reference time in the UE) can be specified in the system specification. In one example, the default value is specified in the system specifications and is used if no other value is configured by RRC signaling and/or MAC CE signaling and/or L1 control (e.g., DCI) signaling. e.g., reference time can be start of DL or UL symbol 0 of SFN 0, or the symbol of the UL PRS (e.g., positioning SRS), or the first DL PRS symbol in the slot in which UL PRS (e.g., positioning SRS) is transmitted.

In one example, the UE reports (e.g., to gNB or to LMF) the phase at the start of the reference symbol, i.e., $\varphi_{u02}$. In one example, $\varphi_{u02}=0$.

In one example, the UE reports (e.g., to gNB or to LMF) the phase at the start of the reference symbol, i.e., $\varphi_{u02}$ for one subcarrier. In one example, the sub-carrier is at the middle (or center) of the UL positioning reference signal or positioning SRS allocation. In one example, the sub-carrier is at the start of the UL positioning reference signal or positioning SRS allocation. In one example, the sub-carrier is at the end of the UL positioning reference signal or positioning SRS allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the UE reports (e.g., to gNB or to LMF) the phase at the start of the reference symbol, i.e., $\varphi_{u02}$ for all sub-carriers of the UL positioning reference signal or positioning SRS. In one example, the phase at the start of the reference symbol, i.e., $\varphi_{u02}$, is the same for all sub-carriers. In one example, $\varphi_{u02}=0$.

In one example, the UE reports (e.g., to gNB or to LMF) the phase at the start of the reference symbol, i.e., $\varphi_{u02}$ for each (or some) PRB of the UL positioning reference signal or positioning SRS. In one example, the reported carrier phase corresponds to common resource block 0. In one example, $\varphi_{u02}=0$. In one example, the reported carrier phase corresponds to a PRB at the start of the UL positioning reference signal or positioning SRS allocation. In one example, the reported carrier phase corresponds to a PRB at the end of the DL positioning reference signal or positioning SRS allocation. In one example, the reported carrier phase corresponds to a PRB at the center of the DL positioning reference signal or positioning SRS allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; or (3) the sub-carrier with the lower frequency of the two middle sub-carriers.

In one example, the reference symbol is the symbol of the UL positioning reference signal or positioning SRS. The UE can report the phase at the start of that reference signal according to examples disclosed in the present disclosure.

In one example, the UE reports an indication (e.g., to gNB or to LMF) if phase continuity has been maintained between the reference time (e.g., most recent reference time) and the corresponding transmission of the UL positioning reference signal or positioning SRS.

In one example, the UE reports an indication (e.g., to gNB or to LMF) if phase continuity is not maintained between the reference time (e.g., most recent reference time) and the corresponding transmission of the UL positioning reference signal or positioning SRS.

In one example, the UE reports an indication (e.g., to gNB or to LMF) if phase continuity is maintained between the reference time (e.g., most recent reference time) and the corresponding transmission of the UL positioning reference signal or positioning SRS.

In one example, the UE reports an indication (e.g., to gNB or to LMF) if phase continuity is maintained or is not maintained between the reference time (e.g., most recent reference time) and the corresponding transmission of the UL positioning reference signal or positioning SRS.

In one example, the UE transmits the UL PRS if phase continuity is maintained between the start of the UL PRS or positioning SRS transmissions and corresponding reference time.

In one example, the UE transmits the UL PRS regardless of whether or not phase continuity is maintained between the start of the UL PRS or positioning SRS transmissions and corresponding reference time.

In one example, the UE reports an indication (e.g., to gNB or to LMF), if phase continuity is maintained between a slot in which the UL PRS or positioning SRS is transmitted and the most recent previous slot in which a second UL PRS or positioning SRS has been transmitted.

In one example, the UE reports an indication (e.g., to gNB or to LMF), if phase continuity is not maintained between a slot in which the UL PRS or positioning SRS is transmitted and the most recent previous slot in which a second UL PRS or positioning SRS has been transmitted.

In one example, the UE reports an indication (e.g., to gNB or to LMF), whether or not phase continuity is maintained between a slot in which the UL PRS or positioning SRS is transmitted and the most recent previous slot in which a second UL PRS or positioning SRS has been transmitted.

In one example, the UE reports an indication (e.g., to gNB or to LMF), if phase continuity is maintained between a symbol in which the UL PRS or positioning SRS is transmitted and the most recent previous symbol in which a second UL PRS or positioning SRS has been transmitted.

In one example, the UE reports an indication (e.g., to gNB or to LMF), if phase continuity is not maintained between a symbol in which the UL PRS or positioning SRS is transmitted and the most recent previous symbol in which a UL PRS or positioning SRS has been transmitted.

In one example, the UE reports an indication (e.g., to gNB or to LMF), whether or not phase continuity is maintained between a symbol in which the UL PRS or positioning SRS is transmitted and the most recent previous symbol in which a second UL PRS or positioning SRS has been transmitted.

In one example, for the aforementioned examples, the second UL PRS or positioning SRS transmission has same positioning SRS resource ID as that of the UL PRS or positioning SRS transmitted in the slot or the symbol.

In one example, for the aforementioned examples, the second UL PRS or positioning SRS transmission has same positioning SRS resource set ID as that of the UL PRS or positioning SRS transmitted in the slot or the symbol.

In one example, for the aforementioned examples, the second UL PRS or positioning SRS transmission has same quasi-co-location source RS or TCI state as that of the UL PRS or positioning SRS transmitted in the slot or the symbol.

In one example, for the aforementioned examples, the second UL PRS or positioning SRS is transmitted to cell C or TRP T or gNB G. In one example, the UE can be configured with C or T or G by RRC signaling and/or MAC CE singling and or L1 control (e.g., DCI) signaling. In another example, C or T or G are the same as those of the UL PRS or positioning SRS transmitted in the slot or the symbol.

In one example, the UE reports an indication (e.g., to gNB or to LMF), if phase continuity is maintained between UL PRS or positioning SRS symbols transmitted in a slot.

In one example, the UE reports an indication (e.g., to gNB or to LMF), if phase continuity is not maintained between UL PRS or positioning SRS symbols transmitted in a slot.

In one example, the UE reports an indication (e.g., to gNB or to LMF), whether or not phase continuity is maintained between UL PRS or positioning SRS symbols transmitted in a slot.

In one example, phase continuity between a symbol transmitted at time $T_{n1}$ and a symbol transmitted at time $T_{n2}$ is maintained if the phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. In one example, the carrier phase can be the phase at the antenna port. In one example, the carrier phase can be the phase at the output of the antenna. In one example, the carrier phase can be the phase at the start of the symbol. In one example the carrier phase can be the phase after the CP of the symbol.

In one example, one or more of the following can lead to the carrier phase continuity not being maintained: (1) a change in the RF chain; (2) a change in quasi-co-location; (3) a change in the transmission spatial filter; (4) a time advance or time retard between symbols; or (5) the phase lock loop getting out of sync or slipping.

In one example, the gNB reports (e.g., to UE or to LMF) the reference symbol (e.g., corresponding to a reference time in the gNB). The start of the reference symbol can be used for determining the reference phase $\varphi_{b02}$.

In one example, $\varphi_{b02}=0$. The reference symbol can be reported as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; and (15) symbol of frame (SFN) 0.

In one example, the gNB is configured the reference symbol (e.g., corresponding to a reference time in the gNB). The start of the reference symbol can be used for determining the reference phase $\varphi_{b02}$. In one example, $\varphi_{b02}=0$. The configuration can be by RRC signaling and/or MAC CE signaling and/or L1 control (e.g., DCI) signaling.

The reference symbol can be configured as: (1) symbol n within slot m within subframe l within frame k; (2) most recent Symbol n within slot m within subframe l; (3) most recent Symbol n within slot m; (4) symbol n within subframe l within frame k; (5) most recent Symbol n within subframe l; (6) symbol n within slot m within frame k; (7) symbol n within frame k; (8) symbol 0 within slot m within subframe l within frame k; (9) most recent Symbol 0 within slot m within subframe l; (10) most recent Symbol 0 within slot m; (11) symbol 0 within slot m within frame k; (12) symbol 0 within subframe l within frame k; (13) most recent Symbol 0 within subframe l; (14) symbol 0 within frame k; (15) symbol 0 of frame (SFN) 0; (16) the symbol of the UL PRS or positioning SRS. This can be based on the TRP's/gNB's time reference; and (17) the first UL PRS or positioning SRS symbol in the slot in which UL PRS or positioning SRS is received. This can be based on the TRP's/gNB's time reference.

In one example, the reference symbol (e.g., corresponding to a reference time in the gNB) can be specified in the system specification. In one example, the default value is specified in the system specifications and is used if no other value is configured by RRC signaling and/or MAC CE signaling and/or L1 control (e.g., DCI) signaling. e.g., reference time can be start of DL or UL symbol 0 of SFN 0 or the symbol of the UL PRS or positioning SRS (e.g., based on the TRP's/gNB's time reference), or the first UL PRS or positioning SRS symbol in the slot in which UL PRS or positioning SRS is received (e.g., based on the TRP's/gNB's time reference).

In one example, the gNB reports (e.g., to UE or to LMF) the phase at the start of the reference symbol, i.e., $\varphi_{b02}$. In one example, $\varphi_{b02}=0$.

In one example, the gNB reports (e.g., to UE or to LMF) the phase at the start of the reference symbol, i.e., $\varphi_{b02}$ for one subcarrier. In one example, the sub-carrier is at the middle (or center) of the UL positioning reference signal or positioning SRS allocation. In one example, the sub-carrier is at the start of the UL positioning reference signal or positioning SRS allocation. In one example, the sub-carrier is at the end of the UL positioning reference signal or positioning SRS allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the gNB reports (e.g., to UE or to LMF) the phase at the start of the reference symbol, i.e., $\varphi_{b02}$ for all sub-carriers of the UL positioning reference signal or positioning SRS. In one example, the phase at the start of the reference symbol, i.e., $\varphi_{b02}$, is the same for all sub-carriers. In one example, $\varphi_{b02}=0$.

In one example, the gNB reports (e.g., to UE or to LMF) the phase at the start of the reference symbol, i.e., $\varphi_{b02}$ for each (or some) PRB of the UL positioning reference signal or positioning SRS. In one example, the reported carrier phase corresponds to common resource block 0. In one example, $\varphi_{b02}=0$. In one example, the reported carrier phase corresponds to a PRB at the start of the UL positioning reference signal or positioning SRS allocation. In one example, the reported carrier phase corresponds to a PRB at the end of the UL positioning reference signal or positioning SRS allocation. In one example, the reported carrier phase corresponds to a PRB at the center of the UL positioning reference signal or positioning SRS allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the reference symbol is the symbol of the UL positioning reference signal or positioning SRS. The UE can report the phase at the start of that reference signal according to examples disclosed in the present disclosure.

In one example, the gNB reports an indication (e.g., to UE or to LMF) if phase continuity has been maintained between the reference time (e.g., most recent reference time) and the corresponding reception of the UL positioning reference signal or positioning SRS.

In one example, the gNB reports an indication (e.g., to UE or to LMF) if phase continuity is not maintained between the reference time (e.g., most recent reference time) and the corresponding reception of the UL positioning reference signal or positioning SRS.

In one example, the gNB reports an indication (e.g., to UE or to LMF) if phase continuity is maintained between the reference time (e.g., most recent reference time) and the corresponding reception of the UL positioning reference signal or positioning SRS.

In one example, the gNB reports an indication (e.g., to UE or to LMF) if phase continuity is maintained or is not maintained between the reference time (e.g., most recent reference time) and the corresponding reception of the UL positioning reference signal or positioning SRS.

In one example, the gNB reports an indication (e.g., to UE or to LMF), if phase continuity is maintained between a slot in which the UL PRS or positioning SRS is received and the most recent previous slot in which a second UL PRS or positioning SRS has been received.

In one example, the gNB reports an indication (e.g., to UE or to LMF), if phase continuity is not maintained between a slot in which the UL PRS or positioning SRS is received and the most recent previous slot in which a second UL PRS or positioning SRS has been received.

In one example, the gNB reports an indication (e.g., to UE or to LMF), whether or not phase continuity is maintained between a slot in which the UL PRS or positioning SRS is received and the most recent previous slot in which a second UL PRS or positioning SRS has been received.

In one example, the gNB reports an indication (e.g., to UE or to LMF), if phase continuity is maintained between a symbol in which the UL PRS or positioning SRS is received and the most recent previous symbol in which a second UL PRS or positioning SRS has been received.

In one example, the gNB reports an indication (e.g., to UE or to LMF), if phase continuity is not maintained between a symbol in which the UL PRS or positioning SRS is received and the most recent previous symbol in which a second UL PRS or positioning SRS has been received.

In one example, the gNB reports an indication (e.g., to UE or to LMF), whether or not phase continuity is maintained between a symbol in which the UL PRS or positioning SRS is received and the most recent previous symbol in which a second UL PRS or positioning SRS has been received.

In one example, for the aforementioned examples, the second UL PRS or positioning SRS reception has same positioning SRS resource ID as that of the UL PRS or positioning SRS received in the slot or the symbol.

In one example, for the aforementioned examples, the second UL PRS or positioning SRS reception has same positioning resource set ID as that of the UL PRS or positioning SRS received in the slot or the symbol.

In one example, for the aforementioned examples, the second UL PRS or positioning SRS reception has same quasi-co-location source RS or TCI state as that of the UL PRS or positioning SRS received in the slot or the symbol.

In one example, for the aforementioned examples, the second UL PRS or positioning SRS is received from UE U. In one example, the TRP can be configured with U by RRC signaling and/or MAC CE singling and or L1 control (e.g., DCI) signaling. In another example, U is the same as that of the UL PRS or positioning SRS transmitted in the slot or the symbol.

In one example, the gNB reports an indication (e.g., to UE or to LMF), if phase continuity is maintained for UL PRS or positioning SRS symbols received in a slot.

In one example, the gNB reports an indication (e.g., to UE or to LMF), if phase continuity is not maintained for UL PRS or positioning SRS symbols received in a slot.

In one example, the gNB reports an indication (e.g., to UE or to LMF), whether or not phase continuity is maintained for UL PRS or positioning SRS symbols received in a slot.

In one example, phase continuity between a reference phase for a symbol received at time $T_{n1}$ and a reference phase for a symbol received at time $T_{n2}$ is maintained if the reference phase at symbol $T_{n1}$, i.e., $\varphi(T_{n1})$ and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, the TRP/gNB measures the phase between reference signal (e.g., reference phase) and corresponding received UL PRS or positioning SRS symbol, e.g., the TRP/gNB measures the carrier phase of the received UL PRS or positioning SRS, for example, this measurement can be relative to the reference phase of the TRP/gNB.

The reference signal generated at the gNB is given by (in complex domain): $A_r e^{j2\pi f t_b + j\varphi_{b02}}$.

In the real domain, the signal is given by: $A_r \cos(2\pi f t_b + \varphi_{b02})$ where: (1) $A_r$ is the amplitude of the reference signal; (2) f is the carrier frequency; (3) $t_b$ is the time relative to the gNB's reference time using the gNB's clock. $t_b$ can be given by $t_b=t+\delta t_b$, where t is according to the common (global) time reference and $\delta t_b$ is the bias in the gNB's clock; and (4) $\varphi_{b02}$ is the phase of the reference signal at the gNB's reference time. In one example, $\varphi_{b02}=0$, for example the phase difference between the received UL positioning reference signal and a reference signal of the gNB is the phase of the received UL positioning reference signal.

The received UL PRS or positioning SRS at the gNB, which corresponds to the UL PRS transmitted time $\tau$ earlier is given by (in complex domain): $A_s e^{j2\pi f(t_u-\tau)+j\varphi_{u02}}$.

In the real domain, the signal is given by: $A_s \cos(2\pi f(t_u-\tau)+\varphi_{b02})$ where: (1) $A_s$ is the amplitude of the UL positioning reference signal or positioning SRS positioning reference signal; (2) f is the carrier frequency; (3) $\tau$ is the propagation delay from the UE to the gNB; (4) $t_u$ is the time relative to the UE's reference time using the UE's clock. $t_u$ can be given by $t_u=t+(\delta t_{u02})$, where t is according to the common (global) time reference and $\delta t_u$ is the bias in the UE's clock; and (5) $\varphi_{b02}$ is the phase of the reference signal at the UE's reference time. In one example, $\varphi_{b02}=0$.

In one example, to measure the phase difference at the gNB, the reference signal (e.g., corresponding to the reference phase) is multiplied by the complex conjugate of the received UL positioning reference signal or positioning SRS at the gNB. i.e., $A_r\ e^{j2\pi f t_b+j\varphi_{b02}}A_s e^{-j2\pi f(t_u-\tau)-j\varphi_{u02}}=A_r A_s e^{j2\pi f(t_b-t_u+\tau)+j\varphi_{b02}-j\varphi_{u02}}$. Therefore, the phase difference is: $2\pi f(t_b-t_u+\tau)+\varphi_{b02}-\varphi_{u02}$, which equals $2\pi f(\delta t_b-\delta t_u+\tau)+\varphi_{b02}-\varphi_{u02}$.

In one example, a similar result can be found if the signals is multiplied in the real domain and passed through a low pass filter to eliminate the double carrier frequency component. The results is $$\frac{A_r A_s}{2}\cos(2\pi f(t_b-t_u+\tau)+\phi_{b02}-\phi_{u02}).$$

Giving the same phase difference as before, which is: $2\pi f(t_b-t_u+\tau)+\varphi_{b02}-\varphi_{u02}$.

In one example, the TRP/gNB reports (e.g., to UE or to LMF) the measured phase difference between the reference signal (e.g., reference phase) and the corresponding received UL positioning reference signal or positioning SRS of a UE e.g., the TRP/gNB measures the carrier phase of the received UL PRS or positioning SRS from a UE, for example, this measurement can be relative to the reference phase of the TRP/gNB.

In one example, the phase difference (e.g., carrier phase of received UL PRS or positioning SRS in a PRS occasion) is reported if UL PRS or positioning SRS is detected and measured.

In one example, the phase difference (e.g., carrier phase of received UL PRS or positioning SRS in a PRS occasion) is reported if phase continuity is maintained between the corresponding reference time (e.g., most recent) and time of reception of the UL positioning reference signal or positioning SRS.

In one example, the phase difference (e.g., carrier phase of received UL PRS or positioning SRS in a PRS occasion) is reported regardless of maintaining phase continuity between the corresponding reference time (e.g., most recent) and time of reception of the UL positioning reference signal or positioning SRS. In a further example, an indication; is included within the measurement report or in a separate message, that indicates whether or not phase continuity is maintained between the corresponding reference time (e.g., most recent) and time of reception of the UL positioning reference signal or positioning SRS corresponding to the phase difference (e.g., carrier phase of received DL PRS) measurement.

In one example, the phase difference (e.g., carrier phase of received UL PRS or positioning SRS in a PRS occasion) is reported if phase continuity is maintained between the UL positioning reference signal occasion corresponding to most recent (previous) phase difference (e.g., carrier phase of received UL PRS or positioning SRS) measurement and the UL positioning reference signal occasion corresponding to current phase difference (e.g., carrier phase of received UL PRS or positioning SRS) measurement.

In one example, the phase difference (e.g., carrier phase of received UL PRS or positioning SRS in a PRS occasion) is reported regardless of maintaining phase continuity between the UL positioning reference signal occasion corresponding to most recent (previous) phase difference (e.g., carrier phase of received UL PRS or positioning SRS) measurement and the UL positioning reference signal occasion corresponding to current phase difference (e.g., carrier phase of received UL PRS or positioning SRS) measurement. In a further example, an indication; is included within the measurement report or in a separate message, that indicates whether or not phase continuity is maintained between the UL positioning reference signal occasion corresponding to most recent (previous) phase difference (e.g., carrier phase of received UL PRS or positioning SRS) measurement and the UL positioning reference signal occasion corresponding to current phase difference (e.g., carrier phase of received UL PRS or positioning SRS) measurement.

In one example, the phase difference (e.g., carrier phase of received UL PRS or positioning SRS in a PRS occasion) is reported if phase continuity is maintained within the UL positioning reference signal occasion corresponding to current phase difference (e.g., carrier phase of received UL PRS or positioning SRS) measurement.

In one example, the phase difference (e.g., carrier phase of received UL PRS or positioning SRS in a PRS occasion) is reported whether or not phase continuity is maintained within the UL positioning reference signal occasion corresponding to current phase difference (e.g., carrier phase of received UL PRS or positioning SRS) measurement. In a further example, an indication; is included within the measurement report or in a separate message, that indicates whether or not phase continuity is maintained within the UL positioning reference signal occasion corresponding to current phase difference (e.g., carrier phase of received UL PRS or positioning SRS) measurement.

In one example, the gNB reports the phase difference (e.g., carrier phase of received UL PRS or positioning SRS in a PRS occasion) for one subcarrier. In one example, the sub-carrier is at the middle (or center) of the UL positioning reference signal or positioning SRS allocation. In one example, the sub-carrier is at the start of the UL positioning reference signal or positioning SRS allocation. In one example, the sub-carrier is at the end of the UL positioning reference signal or positioning SRS allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the gNB reports (e.g., to UE or to LMF) the phase difference (e.g., carrier phase of received UL PRS or positioning SRS in a PRS occasion) for all (e.g., each) sub-carriers of the UL positioning reference signal or positioning SRS.

In one example, the TRP/gNB reports (e.g., to UE or to LMF) the phase difference (e.g., carrier phase of received UL PRS or positioning SRS in a PRS occasion) for N sub-carriers of the UL positioning reference signal. Wherein, N can be specified in the system specifications and/or configured or updated by higher layer RRC signaling and/or MAC CE signaling and/or L1 control (e.g., DCI) signaling.

In one example, the TRP/gNB reports (e.g., to UE or to LMF) the phase difference (e.g., carrier phase of received UL PRS or positioning SRS in a PRS occasion) for some sub-carriers of the UL positioning reference signal. Wherein, the frequency between sub-carriers is P and the offset of the first sub-carrier (e.g., relative to the start of the PRS allocation or to the start of a BWP or to point-A) is O. Wherein, P or O can be specified in the system specifications and/or configured or updated by higher layer RRC signaling and/or MAC CE signaling and/or L1 control (e.g., DCI) signaling.

In one example, the TRP/gNB reports (e.g., to UE or to LMF) the phase difference (e.g., carrier phase of received UL PRS or positioning SRS in a PRS occasion) for the carrier frequency. For example, this can be an average or a composite value computed for all sub-carriers.

In one example, the TRP/gNB reports (e.g., to UE or to LMF) the phase difference (e.g., carrier phase of received UL PRS or positioning SRS in a PRS occasion) for each (or some) PRB of the UL positioning reference signal or positioning SRS. In one example, the reported carrier phase corresponds to common resource block 0. In one example, the reported carrier phase corresponds to a PRB at the start of the UL positioning reference signal or positioning SRS allocation. In one example, the reported carrier phase corresponds to a PRB at the end of the UL positioning reference signal or positioning SRS allocation. In one example, the reported carrier phase corresponds to a PRB at the center of the UL positioning reference signal or positioning SRS allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, TRP/gNB reports the phase difference (e.g., carrier phase of received UL PRS or positioning SRS in a PRS occasion) of the first (earliest) multi-path component (e.g., first detected multi-path component). In a further example, the TRP/gNB may report for the first (earliest) multi-path along with the carrier phase, the RSRPP or ratio between the power of the first (earliest) multi-path to the total power (or the power of the remaining multi-path).

In one example, a TRP/gNB is provided a threshold, wherein the threshold can be specified in the system specifications and/or configured or updated by higher layer RRC signaling and/or MAC CE signaling and/or L1 control (e.g., DCI) signaling. gNB/TRP measures/reports the phase difference (e.g., carrier phase of received UL PRS or positioning SRS in a PRS occasion) of the first (earliest) multi-path component (e.g., first detected multi-path component) if the RSRPP exceeds the threshold, or in an alternative example if the ratio between the power of the first (earliest) multi-path to the total power (or the power of the remaining multi-path) exceeds the threshold. In a further example, the TRP/gNB may report for the first (earliest) multi-path along with the carrier phase, the RSRPP or ratio between the power of the first (earliest) multi-path to the total power (or the power of the remaining multi-path).

In one example, TRP/gNB reports the phase difference (e.g., carrier phase of received UL PRS or positioning SRS in a PRS occasion) of each multi-path component (e.g., each detected multi-path component). In a further example, the TRP/gNB may report for each multi-path, along with the carrier phase, the RSRPP and/or delay (e.g., relative to the first (earliest) multi-path) of the multi-path.

In one example, a TRP/gNB is provided a threshold, wherein the threshold can be specified in the system specifications and/or configured or updated by higher layer RRC signaling and/or MAC CE signaling and/or L1 control (e.g., DCI) signaling. In one example, the threshold can be a relative threshold between power of a multi-path component to the total power. In one example, the threshold can be a relative threshold between power of a multi-path component to the power of the first (earliest) multi-path component. TRP/gNB reports the phase difference (e.g., carrier phase of received UL PRS or positioning SRS in a PRS occasion) of each multi-path component with RSRPP that exceeds the threshold (e.g., each detected multi-path component with RSRPP that exceeds the threshold). In a further example, the TRP/gNB may report for each multi-path, along with the carrier phase, the RSRPP and/or delay (e.g., relative to the first (earliest) multi-path) of the multi-path.

In one example, for the aforementioned examples, a PRS occasion can be one PRS or positioning SRS symbol.

In one example, for the aforementioned examples, a PRS occasion can be all PRS or positioning SRS symbols of a slot.

In one example, for the aforementioned examples, a PRS occasion can be a subset of PRS or positioning SRS symbols of a slot.

In one example, for the aforementioned examples, phase continuity between a reference phase for a symbol received at time $T_{n1}$ and a reference phase for a symbol received at time $T_{n2}$ is maintained if the reference phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein, $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, the TRP/gNB reports (e.g., to UE or to LMF) the measured phase difference between a first received UL positioning reference signal or positioning SRS of a first UE and a second received UL positioning reference signal or positioning SRS of a second UE. In one example, one of the first UE or the second UE can be a positioning reference unit (PRU), wherein the PRU can have a known location.

In one example, the phase difference is measured/reported if UL PRS or positioning SRS is detected and measured from each UE.

In one example, a TRP/gNB is provided a threshold (or time window), wherein the threshold can be specified in the system specifications and/or configured or updated by higher layer RRC signaling and/or MAC CE signaling and/or L1 control (e.g., DCI) signaling. The phase difference is measured/reported if time gap (time window) between UL PRS or positioning SRS of first UE and UL PRS or positioning SRS of second UE does not exceed the threshold. In one example, the threshold can be in units of symbols. In one example, the threshold can be in units of slots. In one example, the threshold can be in units of subframes. In one example, the threshold can be in units of frames.

In one example, the phase difference is reported if phase continuity is maintained between the first UL PRS or positioning SRS occasion of the first UE and the second UL PRS or positioning SRS occasion of the second UE corresponding to the phase difference measurement.

In one example, the phase difference is reported regardless of maintaining phase continuity between the first UL PRS or positioning SRS occasion of the first UE and the second UL PRS or positioning SRS occasion of the second UE corresponding to the phase difference measurement. In a further example, an indication; is included within the measurement report or in a separate message, that indicates whether or not phase continuity is maintained between the first UL PRS or positioning SRS occasion of the first UE and the second UL PRS or positioning SRS occasion of the second UE corresponding to the phase difference measurement.

In one example, the phase difference is reported if phase continuity is maintained within the UL positioning reference signal occasion, of the first UE and the second UE, corresponding to current phase difference (e.g., carrier phase of received UL PRS or positioning SRS) measurement.

In one example, the phase difference is reported whether or not phase continuity is maintained within the UL positioning reference signal occasion, of the first UE and the second UE, corresponding to current phase difference (e.g., carrier phase of received UL PRS or positioning SRS) measurement. In a further example, an indication; is included within the measurement report or in a separate message, that indicates whether or not phase continuity is maintained within the UL positioning reference signal occasion, of the first UE and/or the second UE corresponding to current phase difference (e.g., carrier phase of received UL PRS or positioning SRS) measurement.

In one example, the UL PRS or positioning SRS allocation of the first UE and the second UE are the same.

In one example, the UL PRS or positioning SRS allocation of the first UE and the second UE can be different, but within a certain frequency gap.

In one example, the TRP/gNB reports the phase difference for one subcarrier. In one example, the sub-carrier is at the middle (or center) of the UL positioning reference signal or positioning SRS allocation. In one example, the sub-carrier is at the start of the UL positioning reference signal or positioning SRS allocation. In one example, the sub-carrier is at the end of the UL positioning reference signal or positioning SRS allocation. In one example, the reported carrier phase corresponds to point-A. In one example, the reported carrier phase corresponds to the RF-carrier frequency. In one example, the reported carrier phase corresponds to the absolute radio-frequency channel number (ARFCN).

In one example, if the number of sub-carriers in the allocation is even, the middle (or center) sub-carrier can be one of: (1) the average phase (or frequency) of the two middle sub-carriers; (2) the sub-carrier with the higher frequency of the two middle sub-carriers; and (3) the sub-carrier with the lower frequency of the two middle sub-carriers.

In one example, the TRP/gNB reports (e.g., to UE or to LMF) the phase difference for all (e.g., each) sub-carriers of the UL positioning reference signal or positioning SRS.

In one example, the TRP/gNB reports (e.g., to UE or to LMF) the phase difference for N sub-carriers of the UL positioning reference signal or positioning SRS. Wherein, N can be specified in the system specifications and/or configured or updated by higher layer RRC signaling and/or MAC CE signaling and/or L1 control (e.g., DCI) signaling.

In one example, the TRP/gNB reports (e.g., to UE or to LMF) the phase difference for some sub-carriers of the UL positioning reference signal or positioning SRS. Wherein, the frequency between sub-carriers is P and the offset of the first sub-carrier (e.g., relative to the start of the UL PRS or positioning SRS allocation or to the start of a BWP or to point-A) is O. Wherein, P or O can be specified in the system specifications and/or configured or updated by higher layer RRC signaling and/or MAC CE signaling and/or L1 control (e.g., DCI) signaling.

In one example, the gNB/TRP reports (e.g., to UE or to LMF) the phase difference for the carrier frequency. For example, this can be an average or a composite value computed for all sub-carriers.

In one example, the gNB/TRP reports (e.g., to UE or to LMF) the phase difference for each (or some) PRB of the UL positioning reference signal or positioning. In one example, the reported carrier phase corresponds to common resource block 0. In one example, the reported carrier phase corresponds to a PRB at the start of the UL positioning reference signal or positioning SRS allocation. In one example, the reported carrier phase corresponds to a PRB at the end of the UL positioning reference signal or positioning SRS allocation. In one example, the reported carrier phase corresponds to a PRB at the center of the UL positioning reference signal or positioning SRS allocation. In one example, the phase can be reported for the middle sub-carrier of the PRB (or center of PRB). In one example, the phase can be reported for the first sub-carrier of the PRB. In one example, the phase can be reported for the last sub-carrier of the PRB.

In one example, the number of sub-carriers per PRB is even (e.g., 12), the middle (or center) sub-carrier can be one of: (1) the average phase (or frequency) of the two middle sub-carriers; (2) the sub-carrier with the higher frequency of the two middle sub-carriers; or (3) the sub-carrier with the lower frequency of the two middle sub-carriers.

In one example, TRP/gNB reports the phase difference based on the first (earliest) multi-path component (e.g., first detected multi-path component) of each UE. In a further example, the TRP/gNB may report for the first (earliest) multi-path of each UE along with the carrier phase, the RSRPP or ratio between the power of the first (earliest) multi-path to the total power (or the power of the remaining multi-path).

In one example, a TRP/gNB is provided a threshold, wherein the threshold can be specified in the system specifications and/or configured or updated by higher layer RRC signaling and/or MAC CE signaling and/or L1 control (e.g., DCI) signaling. TRP/gNB reports the phase difference based on the first (earliest) multi-path component of each UE (e.g., first detected multi-path component) if the RSRPP exceeds the threshold, or in an alternative example if the ratio between the power of the first (earliest) multi-path to the total power (or the power of the remaining multi-path) exceeds the threshold. In a further example, the TRP/gNB may report for the first (earliest) multi-path of each UE along with the carrier phase, the RSRPP or ratio between the power of the first (earliest) multi-path to the total power (or the power of the remaining multi-path).

In one example, TRP/gNB reports the phase difference (e.g., carrier phase of received UL PRS or positioning SRS in a PRS occasion) based on each multi-path component for each UE (e.g., each detected multi-path component). In a further example, the TRP/gNB may report for each multi-path for each, along with the carrier phase, the RSRPP and/or delay (e.g., relative to the first (earliest) multi-path) of the multi-path.

In one example, a TRP/gNB is provided a threshold, wherein the threshold can be specified in the system specifications and/or configured or updated by higher layer RRC signaling and/or MAC CE signaling and/or L1 control (e.g., DCI) signaling. In one example, the threshold can be a relative threshold between power of a multi-path component to the total power. In one example, the threshold can be a relative threshold between power of a multi-path component to the power of the first (earliest) multi-path component. TRP/gNB reports the phase difference (e.g., carrier phase of received UL PRS or positioning SRS in a PRS occasion) based on each multi-path component for each UE with RSRPP that exceeds the threshold (e.g., each detected multi-path component with RSRPP that exceeds the threshold). In a further example, the TRP/gNB may report for each multi-path for each TRP, along with the carrier phase, the RSRPP and/or delay (e.g., relative to the first (earliest) multi-path) of the multi-path.

In one example, for the aforementioned examples, a PRS occasion can be one UL PRS or positioning SRS symbol.

In one example, for the aforementioned examples, a PRS occasion can be all UL PRS or positioning SRS symbols of a slot.

In one example, for the aforementioned examples, a PRS occasion can be a subset of UL PRS or positioning SRS symbols of a slot.

In one example, for the aforementioned examples, phase continuity between a reference phase for a symbol received at time $T_{n1}$ e.g., from a first UE) and a reference phase for a symbol received at time $T_{n2}$ (e.g., from a second UE) is maintained if the reference phase at symbol $T_{n1}$, i.e., $\varphi(T_{n1})$, and the phase at symbol $T_{n2}$, i.e., $\varphi(T_{n2})$ is related by $\varphi(T_{n2})=\varphi(T_{n1})+2\pi f_c(T_{n2}-T_{n1})$, wherein $f_c$ is the frequency of the carrier or sub-carrier. The phase shift through the RF circuitry or the front-end of the receiver is the same at $T_{n1}$ and $T_{n2}$, i.e., phase coherency is maintained through the RF circuitry or the front-end of the receiver for phase continuity. In one example, the phase reference can be the phase at the start of the symbol. In one example the phase reference can be the phase after the CP of the symbol.

In one example, one or more of the following can lead to the phase reference continuity not being maintained: (1) a change in the RF chain; (2) a change in quasi-co-location; (3) a change in the reception spatial filter; (4) a time advance or time retard between symbols; or (5) the phase lock loop getting out of sync or slipping.

In one example, a first UE transmits UL PRS at symbol n1 at time $T_{n1}$, e.g., $T_{n1}$ is the time of the start of symbol n1 or the time after the CP of symbol n1. The phase of the received signal from the first UE in symbol n1 is $\varphi_1(T_{n1})$. A second UE transmits UL PRS at symbol n2 at time $T_{n2}$, e.g., $T_{n2}$ is the time of the start of symbol n2 or the time after the CP of symbol n2. The phase of the received signal from the first UE in symbol n2 is $\varphi_2(T_{n2})$. The following examples can be further considered.

In one example, n1=n2.

In one example, n1 is the closest UL PRS symbol transmitted by the first UE to a UL PRS symbol n2 transmitted by the second UE.

In one example, n2 is the closest UL PRS symbol transmitted by the second UE to a UL PRS symbol n1 transmitted by the first UE.

In one example, the gNB (or TRP) reports (e.g., to LMF and/or UE) the phase difference between phase of the UL PRS signal from first UE at time $T_{n1}$, and the phase of the UL PRS signal from second UE at time $T_{n2}$. For example, the gNB reports $\varphi_1(T_{n1})-\varphi_2(T_{n2})$ or the gNB reports $\varphi_2(T_{n2})-\varphi_1(T_{n1})$.

In one example, the gNB (or TRP) reports (e.g., to LMF and/or UE) the phase difference between phase of the UL PRS signal from first UE at time $T_{n1}$, and the phase of the UL PRS signal from second UE at time $T_{n1}$. For example, the gNB reports $\varphi_1(T_{n1})-\varphi_2(T_{n1})$ or the gNB reports $\varphi_2(T_{n1})-\varphi_1(T_{n1})$. For example, the gNB can determine the phase of the second UE at time $T_{n1}$ as $\varphi_2(T_{n1})=\varphi_2(T_{n2})$ $2\pi f(T_{n1}-T_{n2})$, wherein f is the frequency at which the carrier phase is calculated. Alternatively, $\varphi_2(T_{n1})=\varphi_2(T_{n2})+2\pi f(T_{n2}-T_{n1})$.

In one example, the gNB reports (e.g., to LMF and/or UE) the phase difference between phase of the UL PRS signal from first UE at time $T_{n2}$, and the phase of the UL PRS signal from second UE at time $T_{n2}$. For example, the gNB reports $\varphi_1(T_{n2})-\varphi_2(T_{n2})$ or the gNB reports $\varphi_2(T_{n2})-\varphi_1(T_{n2})$. For example, the gNB can determine the phase of the first UE at time $T_{n2}$ as $\varphi_1(T_{n2})=\varphi_1(T_{n1})2\pi f(T_{n2}-T_{n1})$, wherein f is the frequency at which the carrier phase is calculated. Alternatively, $\varphi_1(T_{n2})=\varphi_1(T_{n2})+2\pi f(T_{n1}-T_{n2})$.

In one example, one or more of the measurements or configurations described in herein are received by UE and/or gNB and/or LMF.

Using the RTT method, the UE and/or gNB and/or LMF can estimate a coarse value of the propagation delay. Using this coarse value, the value of N in equations mentioned in the present disclosure can be determined.

The UE and/or gNB and/or LMF can use the phase difference measurement (or phase measurements) of DL PRS and UL PRS or positioning SRS to determine the propagation delay as given by equations disclosed in the present disclosure.

By multiplying the propagation delay by the speed of light, the distance between the gNB and the UE can be determined.

In one example, the phase difference measurement (or phase measurement) of DL PRS and UL PRS or positioning SRS is used if phase continuity is maintained between DL PRS and corresponding UL PRS or positioning SRS in the gNB and the UE.

In one example, the phase difference measurement (or phase measurement) of DL PRS and UL PRS or positioning SRS is used if phase continuity is maintained between reference time and corresponding DL PRS and corresponding UL PRS or positioning SRS in the gNB and the UE.

In one example, a TRP/gNB can report to the LMF or UE when or if DL carrier phase continuity for DL PRS has not been maintained following the examples of this disclosure. A TRP/gNB can report to the LMF or UE when or if DL carrier phase continuity for DL PRS has been maintained following the examples of this disclosure.

In one example, a TRP/gNB can report to the LMF or UE a measurement report that includes UL carrier phase measurement. In one example, the measurement report can be a standalone measurement report for carrier phase measurement. In one example, the measurement report can be included with other positioning measurements (e.g., relative time of arrival (RTOA) or gNB Rx-Tx time difference or angle of arrival measurements or UL SRS-RSRP or UL SRS-RSRPP).

The measurement report can include one or more of the following examples.

In one example, reference signal ID used to measure the carrier phase (e.g., positioning SRS resource ID and/or positioning SRS resource set ID). If the carrier phase difference is the difference between the carrier phase of a first UL PRS or positioning SRS from a first UE and a second UL PRS or positioning SRS from a second UE, the measurement report can include a first reference signal ID for the first UE (e.g., first positioning SRS resource ID and/or first positioning SRS resource set ID) and a second reference signal ID for the second UE (e.g., second positioning SRS resource ID and/or second positioning SRS resource set ID).

In one instance, a TRP/gNB can be configured the UL PRS or positioning SRS resource to use for carrier phase or carrier phase difference measurement.

In another instance, a TRP/gNB can select the UL PRS or positioning SRS resource to use for carrier phase or carrier phase difference measurement. For example, the selection can be based on LOS conditions, selecting the UL PRS or positioning SRS resource with the best LOS condition (strongest relative power of first (earliest) multi-path or strongest multi-path, or largest RSRPP of first (earliest) multi-path or strongest multi-path). In another example, the selection can be based on RSRP of UL PRS or positioning SRS. In another example, the selection can be based on RSRPP of first (earliest) multi-path or strongest multi-path of UL PRS or positioning SRS. In another example, the selection can be based on RSRP of LOS component of UL PRS or positioning SRS. In another example, the selection can be based on one or more of the previously mentioned examples.

In another example, the frequency or frequency index used for measuring and calculating the carrier phase.

In one instance, the carrier phase measurement is for multiple frequencies. The number of frequencies for which the carrier phase measurement is reported is configured. In one example, the TRP/gNB determines the frequencies. In one example, the frequencies are evenly spread through the frequency allocation (e.g., BW) of the UL PRS or SRS for positioning. In one example, the frequency or frequency index is not included in the measurement report but is determined implicitly (e.g., evenly spread through the frequency allocation (e.g., BW) of the UL PRS or SRS for positioning).

In yet another example, the antenna port or receive antenna or receive RF chain or antenna connector of the signal used for carrier phase measurement. The impact of the antenna port or receive antenna or receive RF chain or antenna connector on the carrier phase measurement is later described in this disclosure. In one example, gNB/TRP reports the antenna reference point (position) (ARP) for the antenna port or antenna connector or antenna or receive RF chain used for the carrier phase measurement.

In yet another example, a time stamp. Wherein the time stamp can include a frame number/ID/index and/or a sub-frame number/ID/index and/or a slot number/ID/index and/or symbol number/ID/index and/or an UL PRS or positioning SRS occasion number/ID/index.

In yet another example, the carrier phase measurement as described herein in this disclosure.

In one instance, the carrier phase of UL PRS or positioning SRS of a single UE. This can be, for example, relative to the reference phase of the TRP/gNB.

In another instance, the carrier phase difference of UL PRS or positioning SRS of a first UE and a second UE.

In one instance, the carrier phase or carrier phase difference can be reported for one sub-carrier or a group of sub-carriers or all sub-carriers of the UL PRS or positioning SRS allocation, or for one PRB or a group of PRBs or all PRBs of the UL PRS or positioning SRS allocation. The carrier phase or carrier phase difference can be measured using one sub-carrier or a group of sub-carriers, wherein the group of sub-carriers can provide one or multiple carrier phase or carrier phase difference measurements.

In one instance, the one carrier phase or carrier phase difference is reported for one UL PRS or positioning SRS symbol. For example, the first UL PRS or positioning SRS symbol of a slot or any UL PRS or positioning SRS symbol, and the symbol index is reported. In one example, the symbol index is in the time stamp.

In one instance, multiple carrier phase or carrier phase difference are reported for multiple UL PRS or positioning SRS symbols. For example, all UL PRS or positioning SRS symbol of a slot or a subset of UL PRS or positioning SRS symbols. In one example, the symbol indices are included in the report. In another example, the symbol indices to be reported are configured or pre-determined.

In one instance, one carrier phase is reported, or carrier phase difference is reported based on the combining of carrier phase or carrier phase difference, respectively, of multiple UL PRS or positioning SRS symbols. In one example, there is no reporting of symbol index used to get the carrier phase or carrier phase difference, just the slot index is reported. In one example, all UL PRS or positioning SRS symbols of a slot or a subset of UL PRS or positioning SRS symbols are used to determine the carrier phase or carrier phase difference respectively. In one example, the symbol indices are included in the report. In another example, the symbol indices to be used for the measurement reporting are configured or pre-determined.

In one example, a quality indicator is included in a measurement report. This can be hard decision (e.g., 1-bit with 0 signaling low/bad quality and 1 signaling high/good quality, or vice versa 1 signaling low/bad quality and 0 signaling high/good quality), or a soft decision with n-bits. In one example the quality indicator can be based on LOS/NLOS indicator. In another example the quality indicator can be based on the RSRPP of the first (earliest) multi-path or of the strongest multi-path, or the ratio between the power (e.g., RSRPP) of the first (earliest) multi-path or the strongest multi-path and the total power (or the power of the remaining multi-path).

In one example, a phase continuity indicator as described in this disclosure. The phase continuity is from a reference time to the time of the UL PRS or positioning SRS being measured. In one example, the reference time can be a time determined by or configured in the TRP/gNB. In another example, the reference time can be a time of pervious UL PRS or positioning SRS reception of a pervious measurement. In another example, the reference time can be a time of pervious DL PRS transmission.

In one example, a TRP/gNB transmitting a downlink positioning reference signal (DL PRS), can report the antenna port or transmit antenna or transmit RF chain or antenna connector of the DL PRS, e.g., used for carrier phase measurement. The impact of the antenna port or transmit antenna or transmit RF chain or antenna connector on the carrier phase measurement is later described in this disclosure. In one example, gNB/TRP reports the antenna reference point (position) (ARP) for the antenna port or antenna connector or antenna or transmit RF chain of the DL PRS, e.g., used for the carrier phase measurement.

In one example, a UE can report to the LMF or TRP/gNB when or if UL carrier phase continuity for UL PRS or positioning SRS has not been maintained following the examples of this disclosure. A UE can report to the LMF or TRP/gNB when or if UL carrier phase continuity for UL PRS or positioning SRS has been maintained following the examples of this disclosure.

In one example, a UE can report to the LMF or TRP/gNB a measurement report that includes DL carrier phase measurement. In one example, the measurement report can be a standalone measurement report for carrier phase measurement. In one example, the measurement report can be included with other positioning measurements (e.g., DL reference signal time difference (RSTD) or UE Rx-Tx time difference or DL PRS-RSRP or DL PRS RSRPP).

The measurement report can include one or more of the following examples.

In one example, reference signal ID used to measure the carrier phase (e.g., DL PRS resource ID and/or DL PRS resource set ID and/or DL PRS ID). If the carrier phase difference is the difference between the carrier phase of a first DL PRS from a first TRP/gNB and a second UL PRS or positioning SRS from a second TRP/gNB, the measurement report can include a first reference signal ID for the first TRP/gNB (e.g., first DL PRS resource ID and/or first DL PRS resource set ID and/or first DL PRS ID) and a second reference signal ID for the second TRP/gNB (e.g., second DL PRS resource ID and/or second DL PRS resource set ID and/or second DL PRS ID).

In one instance, a UE can be configured the DL PRS resource to use for carrier phase or carrier phase difference measurement.

In another instance, a UE can select the DL PRS resource to use for carrier phase or carrier phase difference measurement. For example, the selection can be based on LOS conditions, selecting the DL PRS resource with the best LOS condition (strongest relative power of first (earliest) multi-path or strongest multi-path, or largest RSRPP of first (earliest) multi-path or strongest multi-path). In another example, the selection can be based on RSRP of DL PRS. In another example, the selection can be based on RSRPP of first (earliest) multi-path or strongest multi-path of DL PRS. In another example, the selection can be based on RSRP of LOS component of DL PRS. In another example, the selection can be based on one or more of the previously mentioned examples.

In another example, a time stamp. Wherein the time stamp can include a frame number/ID/index and/or a subframe number/ID/index and/or a slot number/ID/index and/or symbol number/ID/index and/or an UL PRS or positioning SRS occasion number/ID/index.

In yet another example, the frequency or frequency index used for measuring and calculating the carrier phase.

In one instance, the carrier phase measurement is for multiple frequencies. The number of frequencies for which the carrier phase measurement is reported is configured. In one example, the UE determines the frequencies. In one example, the frequencies are evenly spread through the frequency allocation (e.g., BW) of the DL PRS or DL positioning frequency layer (PFL). In one example, the frequency or frequency index is not included in the measurement report but is determined implicitly (e.g., evenly spread through the frequency allocation (e.g., BW) of the DL PRS or DL PFL).

In yet another example, the antenna port or receive antenna or receive RF chain or antenna connector of the signal used for carrier phase measurement. The impact of the antenna port or receive antenna or receive RF chain or antenna connector on the carrier phase measurement is later described in this disclosure. In one example, UE reports the antenna reference point (position) (ARP) for the antenna port or antenna connector or antenna or receive RF chain used for the carrier phase measurement.

In yet another example, the carrier phase measurement as described herein in this disclosure.

In one instance, the carrier phase of DL PRS of a single TRP/gNB. This can be, for example, relative to the reference phase of the UE.

In another instance, the carrier phase difference of DL PRS of a first TRP/gNB and a second TRP/gNB.

In yet another instance, the carrier phase or carrier phase difference can be reported for one sub-carrier or a group of sub-carriers or all sub-carriers of the DL PRS allocation, or for one PRB or a group of PRBs or all PRBs of the DL PRS allocation. The carrier phase or carrier phase difference can be measured using one sub-carrier or a group of sub-carriers, wherein the group of sub-carriers can provide one or multiple carrier phase or carrier phase difference measurements.

In yet another instance, the one carrier phase or carrier phase difference is reported for one DL PRS symbol. For example, the first DL PRS symbol of a slot or any DL PRS symbol, and the symbol index is reported. In one example, the symbol index is in the time stamp.

In yet another instance, multiple carrier phase or carrier phase difference are reported for multiple DL PRS symbols. For example, all DL PRS symbol of a slot or a subset of DL PRS symbols. In one example, the symbol indices are included in the report. In another example, the symbol indices to be reported are configured or pre-determined.

In yet another instance, one carrier phase is reported, or carrier phase difference is reported based on the combining of carrier phase or carrier phase difference, respectively, of multiple DL PRS symbols. In one example, there is no reporting of symbol index used to get the carrier phase or carrier phase difference, just the slot index is reported. In one example, all DL PRS symbols of a slot or a subset of DL PRS symbols are used to determine the carrier phase or carrier phase difference, respectively. In one example, the symbol indices are included in the report. In another example, the symbol indices to be used for the measurement reporting are configured or pre-determined.

In yet another example, a quality indicator is included in a measurement report. This can be hard decision (e.g., 1-bit with 0 signaling low/bad quality and 1 signaling high/good quality, or vice versa 1 signaling low/bad quality and 0 signaling high/good quality), or a soft decision with n-bits. In one example the quality indicator can be based on LOS/NLOS indicator. In another example the quality indicator can be based on the RSRPP of the first (earliest) multi-path or of the strongest multi-path, or the ratio between the power (e.g., RSRPP) of the first (earliest) multi-path or the strongest multi-path and the total power (or the power of the remaining multi-path).

In yet another example, a phase continuity indicator as described in this disclosure. The phase continuity is from a reference time to the time of the DL PRS being measured. In one example, the reference time can be a time determined by or configured in the UE. In another example, the reference time can be a time of pervious DL PRS reception of a pervious measurement. In another example, the reference time can be a time of pervious UL PRS or positioning SRS transmission.

In one example, a UE transmitting an uplink positioning reference signal (e.g., SRS for positioning), can report the antenna port or transmit antenna or transmit RF chain or antenna connector of the SRS for positioning, e.g., used for carrier phase measurement. The impact of the antenna port or transmit antenna or transmit RF chain or antenna connector on the carrier phase measurement is later described in this disclosure. In one example, UE reports the antenna reference point (position) (ARP) for the antenna port or antenna connector or antenna or transmit RF chain of the SRS for positioning, e.g., used for the carrier phase measurement.

In the following examples, a first device transmits a positioning reference signal to a second device according to one of the following embodiments.

In one embodiment, the first device is a first TRP or first gNB, and the second device is a UE. The PRS is a downlink (DL) positioning reference signal.

In another embodiment, the first device is a first UE, and the second device is a gNB or TRP. The PRS is an uplink (UL) positioning reference signal SRS used for positioning (e.g., position SRS or SRS for positioning).

Figure 12:
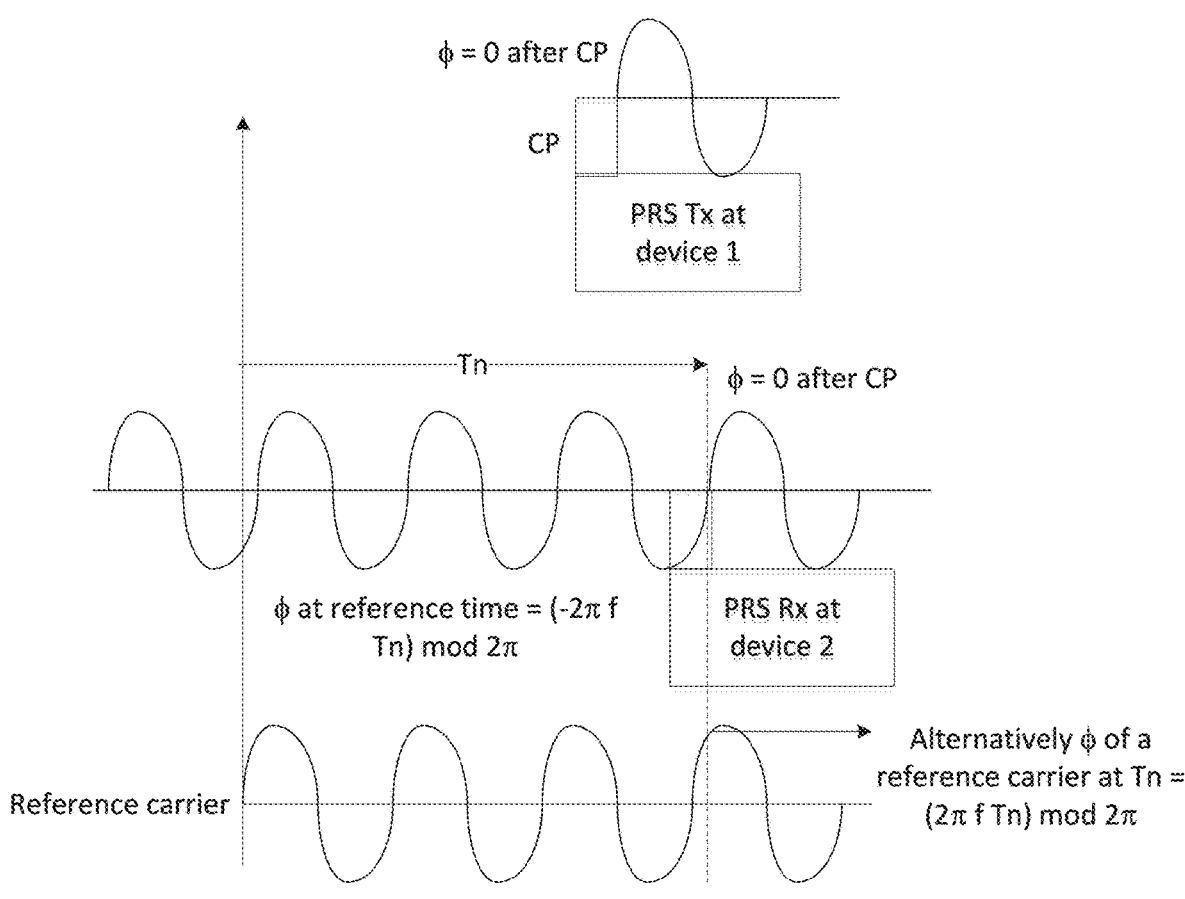
FIG. 12 illustrates an example of signal transmissions according to embodiments of the present disclosure.

FIG. 12 illustrates an example of signal transmissions 1200 according to embodiments of the present disclosure. The embodiment of the signal transmissions 1200 illustrated in FIG. 12 is for illustration only.

The carrier phase depends on the time it is measured for. At different time instances, the carrier phase is different. Consider FIG. 12, the PRS is transmitted in symbol n. In the first device transmitting the PRS, if the carrier phase is zero after the cyclic prefix, the signal arrives at the second device with a zero phase after the CP at the time of arrival. If time between the reference time in the second device and time of the symbol n after the CP is $T_n$, as shown in FIG. 12, the phase at the reference time of the received signal is $(-2\pi f T_n)$ mod $2\pi$. This can be the reported carrier phase or the reported carrier phase can be derived from this value. The reference time can be chosen such that $T_n$ is independent of the symbol location. For example, the reference time can be the time of symbol n according to the time reference of the second device, $T_n$ in this case would depend on the propagation delay from the first device to the second device and any synchronization mismatch between the two devices.

Another option is to have a reference time that is common for multiple symbols (e.g., not PRS symbol dependent) for example the reference time can be at the start of a slot or a subframe or a frame that includes the PRS according to the time reference of the second device. $T_n$ would depend on the location of symbol n in addition to the propagation delay from the first device to the second device and any synchronization mismatch between the two devices. Therefore, the following options can be considered for reference time in a device as described later: (1) Option 1: The reference time depends on the PRS symbol being measured, e.g., the reference time is at the start of the PRS symbol or after the CP of the PRS symbol using the time reference of the receiving device (device receiving PRS and measuring carrier phase), and (2) Option 2: the reference time can be independent of the PRS symbol e.g., at the start of a slot subframe or frame containing the PRS, or at the SFN roll-over.

If the reported carrier phase is the average phase calculated from multiple PRS symbols, then using option 1, the carrier phase can be averaged form the individual carrier phase measurements, as the carrier phase measurement is independent of the symbol location. With option 2, the carrier phase depends on the location of the PRS, therefore before combining, the effect the symbol location on the carrier phase measurement may be removed. For example, if the reference time is at the start of slot, the phase due to the time of the nominal start of symbol n within the slot and possibly the CP duration of symbol n can be removed to get a carrier phase independent of symbol location, and that phase can be combined across multiple symbols.

In one example, a first device transmits PRS at symbol n. In one example, the phase of symbol n in the first device is $\varphi_i$. In one example $\varphi_i=0$. In one example, the phase at symbol n is the phase at the start of symbol n. In one example, the phase at symbol n is the phase at the end of the CP of symbol n. The signal is received by a second device. PRS is received at time $T_n$ relative to a reference time in the second device, e.g., $T_n$ is the time of the start of received symbol n from the reference time or the time after the CP of received symbol n from the reference time. At the reference time, the received signal has a phase $(\varphi_i-2\pi nfT_n)$ mod $2\pi$ or $\varphi_i-2\pi nfT_n$, where f is the carrier frequency.

In case $\varphi_i=0$, the phase at the reference time is $(-_2\pi nfT_n)$ mod $2\pi$ or $-2\pi nfT_n$ as illustrated in FIG. 12. The second device can report one of the aforementioned phases. Alternatively, the second device may assume a signal starting at the reference time, with zero phase and report the phase of the signal at time $T_n$ which is $(2\pi nfT_n)$ mod $2\pi$ or $2\pi nfT_n$, or report the difference in phase between the signal and the received signal which is $(2\pi nfT_n-\varphi_i)$ mod $2\pi$ or $2\pi nfT_n-\varphi_i$ as illustrated in FIG. 12.

In one example, the second device is a UE. In the UE the start of an UL slot (or subframe or frame) for UL transmission is advanced relative to the corresponding reception time of a DL slot (or subframe or frame) by $T_{TA}$ which is given as a sum of the round trip propagation delay and a TA, offset:

$$T_{TA}=(N_{TA}+N_{TA,offset})\cdot T_c.$$

Wherein, $T_c$ is a reference unit time as defined TS 38.211 and is given by $T_c=1/(\Delta f_{max}\cdot N_f)$ where $\Delta f_{max}=480$ kHz and $N_f=4096$. In one example $N_{TA,offset}=0$. In one example $N_{TA,offset}=25600$. In one example $N_{TA,offset}=39936$. In one example, $N_{TA,offset}=13792$. $N_{TA}\cdot T_c$ corresponds to the round-trip propagation delay.

In one example, when calculating the phase, the second device compensates for the nominal time difference between the reference time and symbol of the PRS. For example, if the reference time is at the start of symbol n, of slot m of frame k (or after the CP of symbol n, of slot m of frame k, the second device determines the duration between the reference time and the start of the PRS symbol (or after the CP of the PRS symbol). The phase due to this duration is removed from phase calculated according to FIG. 12. In one example, the reference time in the second device is the corresponding time of the PRS symbol in the second device (e.g., the corresponding transmit time of the PRS symbol in the second device).

In one example, for a received PRS symbol, the reference time is the start time of the PRS symbol based on the timeline of the second device (e.g., the start time of corresponding transmitted PRS symbol in the second device $$\frac{T_{TA}}{2}$$

after the start time of corresponding transmitted PRS symbol in the second device or $$\frac{N_{TA} \cdot T_C}{2}$$

after the start time of corresponding transmitted PRS symbol in the second device or $$\frac{N_{TA} \cdot T_C}{2} + N_{TA,offset} \cdot T_C$$

after the start time of corresponding transmitted PRS symbol in the second device).

In one example, for a received PRS symbol, the reference time is the time after the CP of the PRS symbol based on the timeline of the second device (e.g., the time after the CP of the corresponding transmitted PRS symbol in the second device or $$CP + \frac{T_{TA}}{2}$$

after the start time of corresponding transmitted PRS symbol in the second device or $$CP + \frac{N_{TA} \cdot T_C}{2}$$

after the start time of corresponding transmitted PRS symbol in the second device or $$CP + \frac{N_{TA} \cdot T_C}{2} + N_{TA,offset} \cdot T_c$$

aver the start time of corresponding transmitted PRS symbol in the second device).

In one example, the reference time is at a start of a PRS symbol when the received carrier phase is determined based on the start of the PRS symbol.

In one example, the reference time is at an end of a CP of a PRS symbol when the received carrier phase is determined based on the end of the CP of the PRS symbol.

In one example, the carrier phase is calculated using multiple PRS symbols, the multiple PRS symbols can be in a same slot or in different slots. In one example, when calculating the carrier phase using multiple PRS symbols, a common reference time is used for all symbols, when combining the carrier phase from multiple symbols, the effect of the PRS symbol location (or time) on the carrier phase is removed to get a carrier phase that is independent of the PRS symbol location (e.g., depends on the propagation delay from the first device to the second device and on any synchronization error between the first device and the second device). In one example, when calculating the carrier phase using multiple PRS symbols, each PRS symbol has its own reference time, e.g., the time of the corresponding symbol (start or after CP) in the second device, wherein the duration between the reference time and received PRS symbol of the second device is independent of the of the PRS symbol location—possibly with the exception of symbols that have a CP of different length (e.g., depends on the propagation delay from the first device to the second device and on any synchronization error between the first device and the second device).

In one example, the carrier phase is calculated using multiple PRS symbols, when combining the carrier phase from multiple symbols, the carrier phase of each symbol can be weight by the RSRP of the corresponding PRS symbol to get the combined carrier phase. In one example, the carrier phase is calculated using multiple PRS symbols, when combining the carrier phase from multiple symbols, the carrier phase of each symbol can be weight by the SINR of the corresponding PRS symbol to get the combined carrier phase. In one example, the carrier phase is calculated using multiple PRS symbols, when combining the carrier phase from multiple symbols, the carrier phase of each symbol is combined without applying a weight to get the combined carrier phase.

In the following examples, a first device and a second device transmit a positioning reference signal to a third device according to one of the following embodiments.

In one embodiment, the first device is a first TRP or first gNB, the second device is a second TRP or gNB, and the third device is a UE. The PRS is a downlink (DL) positioning reference signal.

In another embodiment, the first device is a first UE, and the second device is a second UE, and the third device is a gNB or TRP. The PRS is an uplink (UL) positioning reference signal SRS used for positioning.

In one example, a first device transmits PRS at symbol n1. In one example, the phase of symbol n1 in the first device is $\varphi_{i1}$. In one example $\varphi_{i1}=0$. In one example, the phase at symbol n1 is the phase at the start of symbol n1. In one example, the phase at symbol n1 is the phase at the end of the CP of symbol n1. The signal is received by a third device. PRS is received at time $T_{n1}$ relative to a first reference time in the third device, e.g., $T_{n1}$ is the time of the start of received symbol n1 or the time after the CP of received symbol n1. A second device transmits PRS at symbol n2. In one example, the phase of symbol n2 in the second device is $\varphi_{i2}$. In one example $\varphi_{i2}=0$. In one example, the phase at symbol n2 is the phase at the start of symbol n2.

Figures 13, 14, 15:
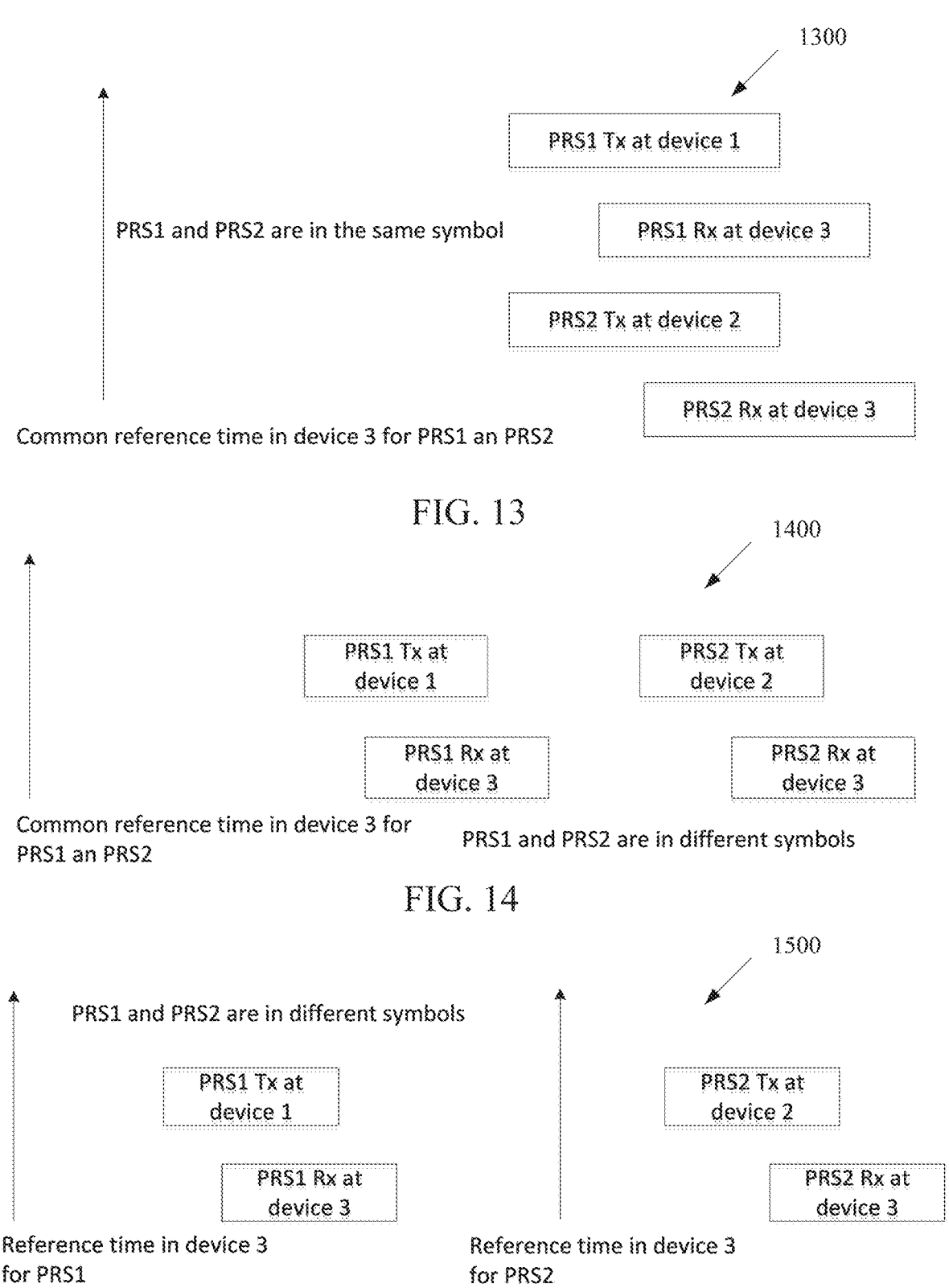
FIGS. 13 to 15 illustrate examples of PRS symbol transmission according to embodiments of the present disclosure.

FIGS. 13 to 15 illustrate examples of PRS symbol transmission 1300, 1400, and 1500 according to embodiments of the present disclosure. The embodiment of the PRS symbol transmission 1300, 1400, and 1500 illustrated in FIGS. 13 to 15 are for illustration only.

In one example, the phase at symbol n2 is the phase at the end of the CP of symbol n2. The signal is received by a third device. PRS is received at time $T_{n2}$ relative to a second reference time in the third device, e.g., $T_{n2}$ is the time of the start of received symbol n2 or the time after the CP of received symbol n2. In one example, the second reference time is the first reference time (a common reference time in the third device), this is illustrated in FIG. 13 and FIG. 14. In one example, the second reference time and the first time are distinct, this is illustrated in FIG. 15.

In one example, at the first reference time, the received signal from a first device has a phase $(\varphi_{i1}-2\pi nfT_{n1})$ mod $2\pi$ or $\varphi_{i1}-2\pi nfT_{n1}$, where f is the carrier frequency. In case $\varphi_{i1}=0$, the phase at the reference time is $(-2\pi nfT_{n1})$ mod $2\pi$ or $-2\pi nfT_{n1}$. The third device can determine one of the aforementioned phases as $\varphi_1(T_{n1})$. Alternatively, the third device may assume a signal starting at the first reference time, with zero phase and determine the phase of the signal at time $T_{n1}$, as $\varphi_1(T_{n1})$, which is $(2\pi nfT_{n1})$ mod $2\pi$ or $2\pi nfT_{n1}$, or report the difference in phase between the signal and the received signal from the first device which is $(2\pi n f T_{n1} - \varphi_{i1})$ mod $2\pi$ or $2\pi n f T_{n1} - \varphi_{i1}$.

In one example, at the second reference time, the received signal from a second device has a phase $(\varphi_{i2} - 2\pi n f T_{n2})$ mod $2\pi$ or $\varphi_{i2} - 2\pi n f T_{n2}$, where f is the carrier frequency. In case $\varphi_{i2} = 0$, the phase at the reference time is $(-2\pi n f T_{n2})$ mod $2\pi$ or $-2\pi n f T_{n2}$. The third device can determine one of the aforementioned phases as $\varphi_2(T_{n2})$. Alternatively, the third device may assume a signal starting at the first reference time, with zero phase and determine the phase of the signal at time $T_{n2}$, as $\varphi_2(T_{n2})$, which is $(2\pi n f T_{n2})$ mod $2\pi$ or $2\pi n f T_{n2}$, or report the difference in phase between the signal and the received signal from the second device which is $(2\pi n f T_{n2} - \varphi_{i2})$ mod $2\pi$ or $2\pi n f T_{n2} - \varphi_{i2}$.

The following examples can be further considered:

In one example, n1=n2. This illustrated in FIG. 13.

In one example, n1 is the closest PRS symbol transmitted by the first device to a PRS symbol n2 transmitted by the second device.

In one example, n2 is the closest PRS symbol transmitted by the second device to a PRS symbol n1 transmitted by the first device.

In one example, the third device reports (e.g., to LMF and/or first device and/or second device) the phase difference between phase of the PRS signal from first device based on time $T_{n1}$, and the phase of the PRS signal from second device based on time $T_{n2}$. For example, the third device reports $\varphi_1(T_{n1}) - \varphi_2(T_{n2})$ or the third device reports $\varphi_2(T_{n2}) - \varphi_1(T_{n1})$. In one example, the first reference signal and the second reference signal are the same.

In one example, the third device reports (e.g., to LMF and/or first device and/or second device) the phase difference between phase of the PRS signal from first device based on time $T_{n1}$, and the phase of the PRS signal from second device based on time $T_{n1}$. For example, the third device reports $\varphi_1(T_{n1}) - \varphi_2(T_{n1})$ or the third devices reports $\varphi_2(T_{n1}) - \varphi_1(T_{n1})$. For example, the third device can determine the phase of the second UE based on time $T_{n1}$ as $\varphi_2(T_{n1}) = \varphi_2(T_{n2}) + 2\pi f(T_{n1} - T_{n2})$, wherein f is the frequency at which the carrier phase is calculated. Alternatively, $\varphi_2(T_{n1}) = \varphi_2(T_{n2}) + 2\pi f(T_{n2} - T_{n1})$. In one example, the first reference signal and the second reference signal are the same. In one example, if the difference between the first reference and the second reference time is $\Delta$, $\varphi_2(T_{n1})$ is further adjusted by $\pm 2\pi f\Delta$.

In one example, the third device reports (e.g., to LMF and/or first device and/or second device) the phase difference between phase of the PRS signal from first device at time $T_{n2}$, and the phase of the PRS signal from second device at time $T_{n2}$. For example, the third device reports $\varphi_1(T_{n2}) - \varphi_2(T_{n2})$ or the third device reports $\varphi_2(T_{n2}) - \varphi_1(T_{n2})$. For example, the third device can determine the phase of the first device at time $T_{n2}$ as $\varphi_1(T_{n2}) = \varphi_1(T_{n1}) + 2\pi f(T_{n2} - T_{n1})$, wherein f is the frequency at which the carrier phase is calculated. Alternatively, $\varphi_1(T_{n2}) = \varphi_1(T_{n1}) + 2\pi f(T_{n1} - T_{n2})$. In one example, the first reference signal and the second reference signal are the same. In one example, if the difference between the first reference and the second reference time is $\Delta$, $\varphi_1(T_{n2})$ is further adjusted by $\pm 2\pi f\Delta$.

As previously described, the following options can be considered for reference time in a device: (1) Option 1: The reference time depends on the PRS symbol being measured, e.g., the reference time is at the start of the PRS symbol or after the CP of the PRS symbol using the time reference of the receiving device (device receiving PRS and measuring carrier phase), and (2) Option 2: the reference time can be independent of the PRS symbol e.g., at the start of a slot subframe or frame containing the PRS.

If for reporting the carrier phase difference between from two devices with PRS transmitted in different symbols, then using option 1, the carrier phase difference can be calculated from the individual carrier phase measurements of different PRS symbols, as the carrier phase measurement is independent of the symbol location. With option 2, the carrier phase depends on the location of the PRS, therefore before calculating the carrier phase difference the effect of the symbol location on the carrier phase measurement may be removed. For example, if the reference time is at the start of slot, the phase due to the time of the nominal start of symbol n within the slot and possibly the CP duration of symbol n can be removed to get a carrier phase independent of symbol location, and that phase can be combined across multiple symbols.

Another example for calculating the carrier phase difference is to use carrier phase measurements (in one symbol or combined across multiple symbols) with the effect of the symbol location removed.

Impact of antenna (e.g., transmit antenna or receive antenna) or antenna connector or antenna port or receive/transmit RF chain on carrier phase measurement.

Figure 16:
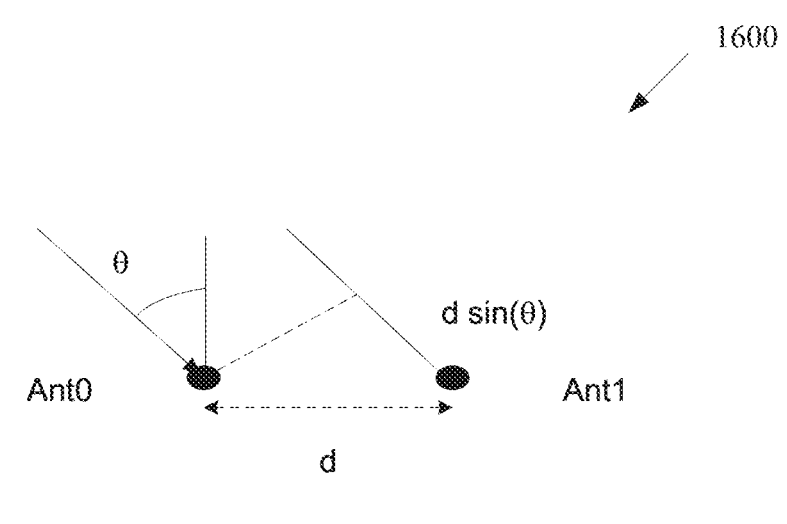
FIG. 16 illustrates an example of two elements antenna array according to embodiments of the present disclosure.

FIG. 16 illustrates an example of two elements antenna array 1600 according to embodiments of the present disclosure. The embodiment of the two elements antenna array 1600 illustrated in FIG. 16 is for illustration only.

The carrier phase measurement depends on the antenna or antenna port, or antenna connector or RF chain used for the carrier phase measurement. Consider a two-element antenna array as shown in FIG. 16. If the signal at Ant0 is A cos(w(t−τ)), with a phase −wτ, the signal at Ant1 is $$A\cos\left(w(t-\tau) - \frac{2\pi d \sin\theta}{\lambda}\right),$$

with a phase $$-w\tau - \frac{2\pi d \sin\theta}{\lambda}.$$

The phase depends on the antenna element used for the carrier phase measurement. The device (UE or gNB/TRP) can use one of the antenna elements to measure the phase, this would correspond to the carrier phase measurement at that antenna element and hence positioning based on that antenna element.

Alternatively, if the signal is combined across the antenna elements of the array, the combined signal (in complex form) is:

$$A W_0 \exp j(w(t-\tau)) + A W_1 \exp j\left(w(t-\tau) - \frac{2\pi d \sin\theta}{\lambda}\right)$$

where $W_0$ is the weight for Ant0, and $W_1$ is the weight for Ant1. It can be shown that the combined signal can be $A_c \exp j(w(t-\tau) - \alpha_c)$, where $A_c$ is the amplitude of the combined signal, which depends on A, $W_0$, $W_1$, d/$\lambda$ and $\theta$, $\alpha_c$ is the phase of the combined signal which depends on $W_0$, $W_1$, d/$\lambda$ and $\theta$. $\alpha_c$ is related to antenna reference point (ARP) of the antenna area. Hence, the calculated carrier phase at an antenna port of antenna array reflects the phase of the antenna reference point (ARP).

In one example, for DL reference signal carrier phase (DL RSCP), the reference point can be defined as (same as the reference point of RSTD): (1) in FR1: The antenna connector of the UE; and (2) in FR2: The antenna of the UE.

In one example, for UL reference signal carrier phase (UL RSCP), the reference point can be defined as (same as the reference point of RTOA): (1) Type 1-C base station: The Rx antenna connector; (2) Type 1-O or 2-O base station: The Rx antenna (i.e., the center location of the radiating region of the Rx antenna); and (3) Type 1-H base station: The Rx Transceiver Array Boundary connector.

The device (e.g., UE or gNB/TRP) measuring the carrier phase, can be configured with the antenna port or antenna connector or receive antenna or receive RF chain to measure the carrier phase on. Alternatively, the device can determine the antenna port or antenna connector or receive antenna or receive RF chain based on its own implementation. In one example, the device can report the antenna port or antenna connector or receive antenna or receive RF chain used for the carrier phase measurement.

The device (e.g., UE or gNB/TRP) transmitting a PRS (e.g., DL PRS or UL-PRS or SRS for positioning), can be configured the antenna port or antenna connector or transmit antenna or transmit RF chain or ARP to use for the PRS. Alternatively, the device can determine the antenna port or antenna connector or transmit antenna or transmit RF chain or ARP based on its own implementation. In one example, the device can report the antenna port or antenna connector or transmit antenna or transmit RF chain or ARP used for PRS transmission.

In one example, if a TRP is configured to transmit a first DL PRS, and a second DL PRS, the TRP can be configured to use the same antenna port or the same antenna connector or the same transmit antenna or the same transmit RF chain or the same ARP to transmit the first DL PRS and the second DL PRS. In one example, TRP is configured the antenna port or antenna connector or transmit antenna or transmit RF chain or ARP to use for the first DL PRS and the second DL PRS. In one example, it is up to the TRP to determine the antenna port or antenna connector or transmit antenna or transmit RF chain or ARP to use for the first DL PRS and the second DL PRS. In one example, if a TRP is configured to transmit a first DL PRS, and a second DL PRS, the TRP can be configured to use antenna ports or antenna connectors or transmit antennas or transmit RF chains or ARPs to transmit the first DL PRS and the second DL PRS that are synchronized to the same clock or source.

In one example, if a TRP is configured to receive a first UL PRS or SRS used for positioning, and a second UL PRS or SRS used for positioning, the TRP can be configured to use the same antenna port or the same antenna connector or the same receive antenna or the same receive RF chain or the same ARP to receive the first UL PRS or SRS used for positioning and the second UL PRS or SRS used for positioning. In one example, TRP is configured the antenna port or antenna connector or receive antenna or receive RF chain or ARP to use for the first UL PRS or SRS used for positioning and the second UL PRS or SRS used for positioning.

In one example, it is up to the TRP to determine the antenna port or antenna connector or receive antenna or receive RF chain or ARP to use for the first UL PRS or SRS used for positioning and the second UL PRS or SRS used for positioning. In one example, if a TRP is configured to receive a first UL PRS or SRS used for positioning, and a second UL PRS or SRS used for positioning, the TRP can be configured to use antenna ports or antenna connectors or receive antennas or receive RF chains or ARPs to receive the first UL PRS or SRS used for positioning and the second UL PRS or SRS used for positioning that are synchronized to the same clock or source.

In one example, if a UE is configured to transmit a first UL PRS or SRS used for positioning, and a second UL PRS or SRS used for positioning, the UE can be configured to use the same antenna port or the same antenna connector or the same transmit antenna or the same transmit RF chain or the same ARP to transmit the first UL PRS or SRS used for positioning and the second UL PRS or SRS used for positioning. In one example, UE is configured the antenna port or antenna connector or transmit antenna or transmit RF chain or ARP to use for the first UL PRS or SRS used for positioning and the second UL PRS or SRS used for positioning.

In one example, it is up to the UE to determine the antenna port or antenna connector or transmit antenna or transmit RF chain or ARP to use for the first UL PRS or SRS used for positioning and the second UL PRS or SRS used for positioning. In one example, if a UE is configured to transmit a first UL PRS or SRS used for positioning, and a second UL PRS or SRS used for positioning, the UE can be configured to use antenna ports or antenna connectors or transmit antennas or transmit RF chains or ARPs to transmit the first UL PRS or SRS used for positioning and the second UL PRS or SRS used for positioning that are synchronized to the same clock or source.

In one example, if a UE is configured to receive a first DL PRS, and a second DL PRS, the UE can be configured to use the same antenna port or the same antenna connector or the same receive antenna or the same receive RF chain or the same ARP to receive the first DL PRS and the second DL PRS. In one example, UE is configured the antenna port or antenna connector or receive antenna or receive RF chain or ARP to use for the first DL PRS and the second DL PRS. In one example, it is up to the UE to determine the antenna port or antenna connector or receive antenna or receive RF chain or ARP to use for DL PRS and the second DL PRS. In one example, if a UE is configured to receive a first DL PRS, and a second DL PRS, the UE can be configured to use antenna ports or antenna connectors or receive antennas or receive RF chains or ARPs to receive the first DL PRS and the second DL PRS that are synchronized to the same clock or source.

The positioning solutions are provided for release 16 targeting the following commercial requirements for commercial applications as shown in TABLE 4.

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL time difference of arrival (DL-TDOA), using positioning reference signals (PRS) for time of arrival measurements. NR also supports UL time difference of arrival (UL-TDOA), using sounding reference signals (SRS) for time of arrival measurements.

NR also supports round-trip time (RTT) with one or more neighboring gNBs or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, terrestrial beacon system (TBS), as well as sensors within the UE such as accelerometers, gyroscopes, magnetometers, etc. Some of the UE sensors are also known as Inertial Measurement Unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (see TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases. The study focused on identifying positioning use cases and requirements for V2X and public safety as well as identifying potential deployment and operation scenarios. The outcome of the study item is included in TR 38.845. V2X positioning requirements depend on the service the UE operates, and are applicable to absolute and relative positioning. Use cases include indoor, outdoor and tunnel areas, within network coverage or out of network coverage; as well as positioning with GNSS-based positioning available, or not available, or not accurate enough; and positioning with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range.

The 5G system can also support determining the velocity of a UE with a speed accuracy better that m/s and a 3-Dimension direction accuracy better than 5 degrees. Public safety positioning is to be supported indoor and outdoor, with in network coverage or out of network coverage; as well as positioning with GNSS-based positioning available, or not available, or not accurate enough. Public safety positioning use case target a 1-meter horizontal accuracy and a vertical accuracy of 2 m (absolute) or 0.3 m (relative).

In terms of deployment and operation scenarios, TR 38.845 has identified the following: (1) for network coverage: In-network coverage, partial network coverage as well as out-of-network coverage. In addition to scenarios with no GNSS and no network coverage; (2) radio link. Uu interface (UL/DL interface) based solutions, PC5 interface (SL interface) based solutions and their combinations (hybrid solutions). As well as RAT-independent solutions such as GNSS and sensors; (3) positioning calculation entity: Network-based positioning when the positioning estimation is performed by the network and UE-based positioning when the positioning estimation is performed by the UE; (4) a UE Type: For V2X UEs, this can be a UE installed in a vehicle, a roadside unit (RSU), or a vulnerable road user (VRU).

Some UEs can have distributed antennas, e.g., multiple antenna patterns that can be leveraged for positioning. UEs can have different power supply limitations, for example PUEs or handheld UEs have limited energy supply compared to other UEs; and (5) spectrum: This can include licensed spectrum and unlicensed spectrum for the Uu interface and the PC5 interface; as well as ITS-dedicated spectrum for the PC5 interface.

Carrier phase method can be used for positioning to provide a more accurate positioning estimate. As illustrated in FIG. 8, signal $s(t-\tau)$ is transmitted from a first device at time $t-\tau$ and arrives at a second device at time t. A reference signal at the second device is r(t). Consider a signal $s(t)=\cos \varphi_s(t)$, where $\varphi_s(t)$ is the phase of the signal at time t. The phase at time $t_0$ is given by $\varphi_s(t_0)$. $\varphi_s(t_0)$ and $\varphi_s(t)$ are related as follows: $\varphi_s(t)=\varphi_s(t_0)+2\pi\int_{t_0}^{t}f(s)ds)$ (equation (2-1)) where, f(s) is the frequency of signal s(t) at time s. If the frequency is constant over time and equals $f_s$, the equation (2-1) becomes: $\varphi_s(t)=\varphi_s(t_0)+2\pi f_s(t-t_0)$ (equation (2-2)).

It may be assumed that s(t) is the signal transmitted from a transmitter of a first device. The signal is received by a second device at time t. The propagation time from the first device to the second device is $\tau$. Therefore, to be receive at time t, the signal is transmitted by the first device at time $t-\tau$. Therefore, $s(t-\tau)=\cos \varphi_s(t-\tau)$ is the signal transmitted by the first device to arrive at the second device at time t.

The second device generates a reference signal $r(t)=\cos \varphi_r(t)$. Where, assuming that the frequency of the reference signal is constant over time and equals $f_r$: $(t)=\varphi_r(t_0)+2\pi f_r(t-t_0)$ (equation (2-3)).

The receiver measures the phase difference, $\Delta\varphi(t)$, between the reference signal $\varphi_r(t)$ and the signal from the transmitter $s(t-\tau)$: $\Delta\varphi(t)=\varphi_r(t)-\varphi_s(t-\tau)+2\pi N$ (equation (2-4)) where, N is an integer to account for the fact that at the receiver of the second device the phase of the transmitted signal from the first device can only be measured as a fraction of a cycle and there is an integer number of cycles between the transmitted signal from the first device and the reference of the second device as illustrated in FIG. 8. N is known as the integer ambiguity.

It may assume perfect synchronization between the first device and the second device, i.e.: (1) frequency synchronization, i.e., $f_s=f_r=f$; and (2) timing synchronization, i.e., same time reference for both first device and second device.

Therefore, from equations (2-2), (2-3), and (2-4), following equation is obtained: $\Delta\varphi(t)=\varphi_r(t_0)-\varphi_s(t_0)+2\pi N+2\pi f\tau$ (equation (2-5)).

Assuming that the first device and the second device are also phase synchronized, i.e., $\varphi_r(t_0)=\varphi_s(t_0)$, following equation is obtained: $\Delta\varphi(t)=2\pi f\tau+2\pi N$ (equation (2-6)).

By taking the derivative of equations (2-5) and (2-6) with respect to frequency, it may get the following equations which eliminate the integer ambiguity and the initial phases:

$$\frac{d}{df}(\Delta\phi(t)) = 2\pi\tau \qquad \text{(equation (2-5a))}$$

(equation (2-5a)) and $$\frac{d}{df}(\Delta\phi(t)) = 2\pi\tau. \qquad \text{(equation (2-6a))}$$

(equation (2-6a)).

It may assume that r(t−τ, t) is the distance between the first device at time t−τ and the second device at time t. Therefore, $$\frac{\Delta\phi(t)}{2\pi} = r(t-\tau,\,t)\frac{f}{c} + N = \frac{r(t-\tau,\,t)}{\lambda} + N \qquad \text{(equation (2-7a))}$$

(equation (2-7a)) where, c is the speed of light and λ is the wavelength corresponding to frequency f. Taking the derivative with respect to frequency, it may get, also eliminating the integer ambiguity:

$$\frac{d}{df}\left(\frac{\Delta\phi(t)}{2\pi}\right) = \frac{r(t-\tau,\,t)}{c}.\qquad\text{(equation (2-7b))}$$

(equation (2-7b)).

The transmitter and receiver clocks are generally not synchronized or are loosely or partially synchronized, and each keeps time independently. Let, t be a time given by a common (global) reference time. The time measured by first device is given by $t_s(t)$. This time can be given by: $t_s=t+\delta t_s$ (t), where $\delta t_s(t)$ is a clock bias (i.e., an offset) between the common (global) reference time and the time of the first device, this clock bias (i.e., offset), in general, can change overtime for example due to instability of the clock. The time measured by the second device is given by $t_r(t)$. This time can be given by: $t_r(t)=t+\delta t_r(t)$, where $\delta t_r(t)$ is a clock bias (i.e., an offset) between the common (global) reference time and the time of the second device, this clock bias (i.e., offset), in general, can change overtime for example due to instability of the clock. In one example, difference between the common (global) reference time and the time according to the first device is constant (does not depend on time). Therefore, $t_s=t+\delta t_s$. In one example, difference between common (global) reference time and the time according to the second device is constant (does not depend on time). Therefore, $t_r(t)=t+\delta t_r$.

If a signal is transmitted from the first device at time $t_1$, where $t_1$ is in the common (global) time reference, according to the time reference of the first device, this is at time $t_s(t_1)=t_1+\delta t_s(t_1)$. The signal arrives at the second device at time $t_2$, where $t_2$ is in the common (global) time reference, according to the time reference of the second device, this is at time $t_r(t_2)=t_2+\delta t_r(t_2)$. The transient time from the first device to the second device is $\tau=t_2-t_1$. The apparent transient time by considering the time according to the first device and the second device and is given by: $t_r(t_2)-t_s(t_1)=\tau+\delta t_r(t_2)-\delta t_s(t_1)$.

A signal is transmitted from the first device at time $t_1$ according to the common (global) reference time, which is time $t_s(t_1)=t_1+\delta t_s(t_1)$ in the time reference of the first device. Therefore, using equation (2-2), with $f_s=f$ and t is the transmit time according the time reference of the first device, i.e., $t=t_s(t_1)$:$\varphi_s(t_s(t_1))=\varphi_s(t_0)+2\pi f(t_1+\delta t_s(t_1)-t_0)$ (equation (2-8)).

The signal arrives at the second device at time $t_2$ according to the common (global) reference time, which is time $t_r(t_2)=t_2+\delta t_r(t_2)$ in the time reference of the second device. Therefore, using equation (2-3), with $f_r=f$ and t is the receive time according the time reference of the second device, i.e., $t=t_r(t_2)$: $\varphi_r(t_r(t_2))=\varphi_r(t_0)+2\pi f(t_2+\delta t_r(t_2)-t_0)$ (equation (2-9)).

Therefore, the equation for phase difference (using the equation (2-6)) is $\Delta\varphi(t)=\varphi_r(t_r(t_2))-\varphi_s(t_s(t_1))$, taking into account the clock biases of the first (transmit) device and second (receive) device, with $\tau=t_2-t_1$, it becomes: $\Delta\varphi(t_1, t_2)=2\pi f\tau+2\pi f(\delta t_r(t_2)-\delta t_s(t_1))+2\pi N$ (equation (2-10)).

By taking the derivative of the equation (2-10) with respect to frequency, it may get the following equation which eliminates the integer ambiguity:

$$\frac{d}{df}(\Delta\phi(t_1,\,t_2)) = 2\pi\tau + 2\pi(\delta t_r(t_2) - \delta t_s(t_1))$$

(equation (2-10a)).

Hence, the equation (2-7a) and (equation (2-7b), with clock biases becomes:

$$\frac{\Delta\phi(t)}{2\pi} = \frac{r(t-\tau,\,t)}{\lambda} + f(\delta t_r(t_2) - \delta t_s(t_1)) + N$$

$$\frac{d}{df}\left(\frac{\Delta\phi(t)}{2\pi}\right) = \frac{r(t-\tau,\,t)}{c} + (\delta t_r(t_2) - \delta t_s(t_1))$$

(equation (2-11a)) and (equation (2-11b)).

To derive equation (2-7a) and by extension equation (2-11a), it may be assumed that $\varphi_r(t_0)=\varphi_s(t_0)$. If $\varphi_r(t_0)\neq\varphi_s(t_0)$, the phase difference at a reference time $t_0$, becomes an additional component in the phase difference measurement, hence the equation (2-11a) becomes:

$$\frac{\Delta\phi(t)}{2\pi} = \frac{r(t-\tau,\,t)}{\lambda} + f(\delta t_r(t_2) - \delta t_s(t_1)) + (\phi_r(t_0) - \phi_S(t_0)) + N$$

(equation (2-12a)).

If taking the derivative with respect to frequency, the phase difference cancels out:

$$\frac{d}{df}\left(\frac{\Delta\phi(t)}{2\pi}\right) = \frac{r(t-\tau,\,t)}{c} + (\delta t_r(t_2) - \delta t_S(t_1))$$

(equation (2-12b)).

According to the equation (2-12a), there are five unknowns: (1) the integers ambiguity, N; (2) the clock bias of the first (transmitter) device, $\delta t_s(t)$; (3) the clock bias of the second (receiver) device, $\delta t_r(t)$; (4) the carrier phase of the first (transmitter) device at a reference time $t_0$, i.e., $\varphi_s(t_0)$; and (5) the carrier phase of the second (receiver) device at a reference time $t_0$, i.e., $\varphi_r(t_0)$.

According to equation (2-12b), there are two unknowns: (1) the clock bias of the first (transmitter) device, $\delta t_s(t)$; and (2) the clock bias of the second (receiver) device, $\delta t_r(t)$.

The following unknowns have been eliminated in equation (2-12b) by taking the derivative with respect to frequency: (1) the integers ambiguity, N; (2) the carrier phase of the first (transmitter) device at a reference time $t_0$, i.e., $\varphi_s(t_0)$; and (3) the carrier phase of the second (receiver) device at a reference time $t_0$, i.e., $\varphi_r(t_0)$.

The accuracy of the carrier phase method is in the range of 0.01 to 0.05 cycles. For a carrier frequency of 3 GHz, the wavelength is 10 cm, this corresponds to 1 mm to 5 mm, which is well within the cm-level accuracy.

In this disclosure, the reference signal is provided used to estimate the carrier phase at a receiver: (1) in DL, the DL positioning reference signal, with adaptation is used to estimate the carrier phase; and (2) in UL, the positioning sounding reference signal, SRS, with adaptation is used to estimate the carrier phase.

3GPP Rel-16 is the first NR release to include sidelink through work item "5G V2X with NR sidelink" and RAT-based positioning through work item "NR Positioning Support." Rel-17 further enhanced accuracy and reduced the latency of NR-based positioning through work item "NR Positioning Enhancements." In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. Carrier phase method is a promising technique for estimating the positioning of a UE that provides cm-level accuracy or better. In this disclosure, the phase of the positioning reference signal is provided in contiguous symbols, and consider having continuous sub-carriers allocated to positioning reference signal across contiguous symbols.

The present disclosure relates to a 5G/NR communication system.

The present disclosure considers design aspects of reference signal used to estimate the carrier phase at a receiver: (1) continuous phase across positioning reference signal symbols; and (2) continuous sub-carriers allocated to positioning reference signal across contiguous symbols.

In one example, the DL positioning reference signal (e.g., DL PRS) in this disclosure is a reference signal designed for the carrier-phase method.

In one example, the DL positioning reference signal (e.g., DL PRS) in this disclosure is a reference signal introduced in the Rel-16 and Rel-17 3GPP specifications for positioning.

In one example, the UL positioning reference signal (e.g., positioning sounding reference signal—Pos-SRS) in this disclosure is a reference signal designed for the carrier-phase method.

In one example, the UL positioning reference signal (e.g., positioning sounding reference signal—Pos-SRS) in this disclosure is a reference signal introduced in the Rel-16 and Rel-17 3GPP specifications for positioning.

As described earlier an OFDM symbol, $$s_l^{(p,\mu)}(t)$$

is up converted to the carrier frequency according to the following equation:

$$s_l^{(p,\mu)}(t) = \mathrm{Re}\left\{ s_{l_{start}^{PRS}}^{(p,\mu)}(t) \cdot e^{j2\pi f_c\left(t - t_{start,l_{start}^{PRS}}^{\mu} - N_{CP,l}^{\mu}T_c\right)} \right\}.$$

Figure 17:
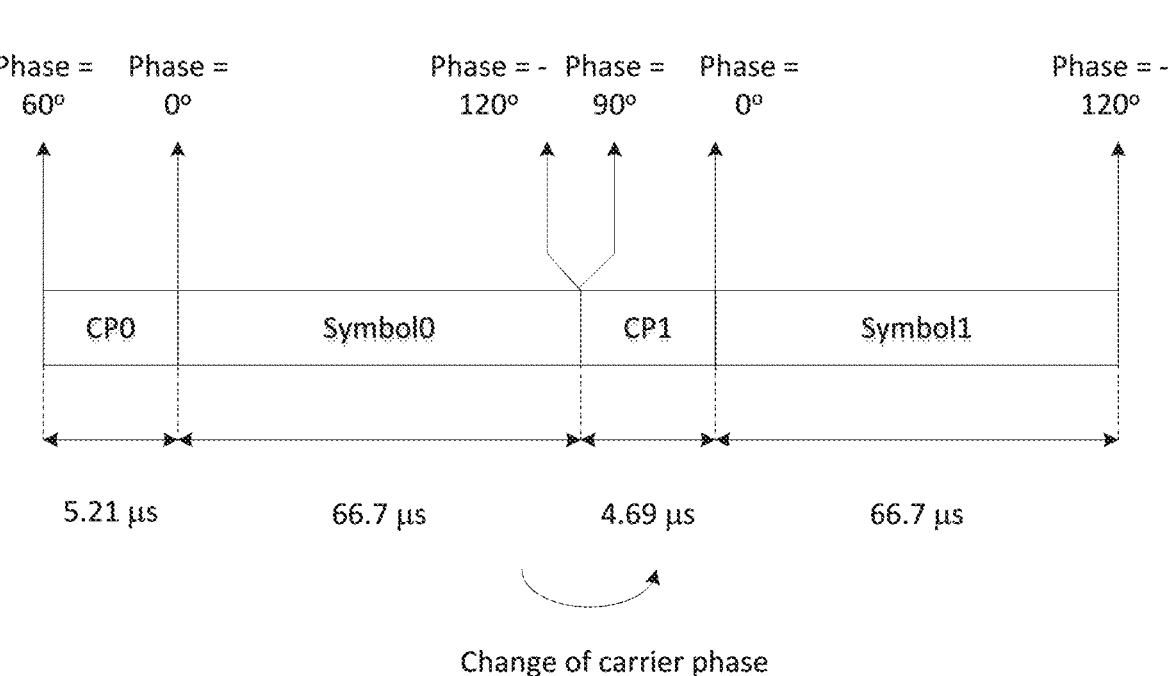
FIGS. 17 and 18 illustrate examples of phase across two consecutive symbols according to embodiments of the present disclosure.
Figure 18:
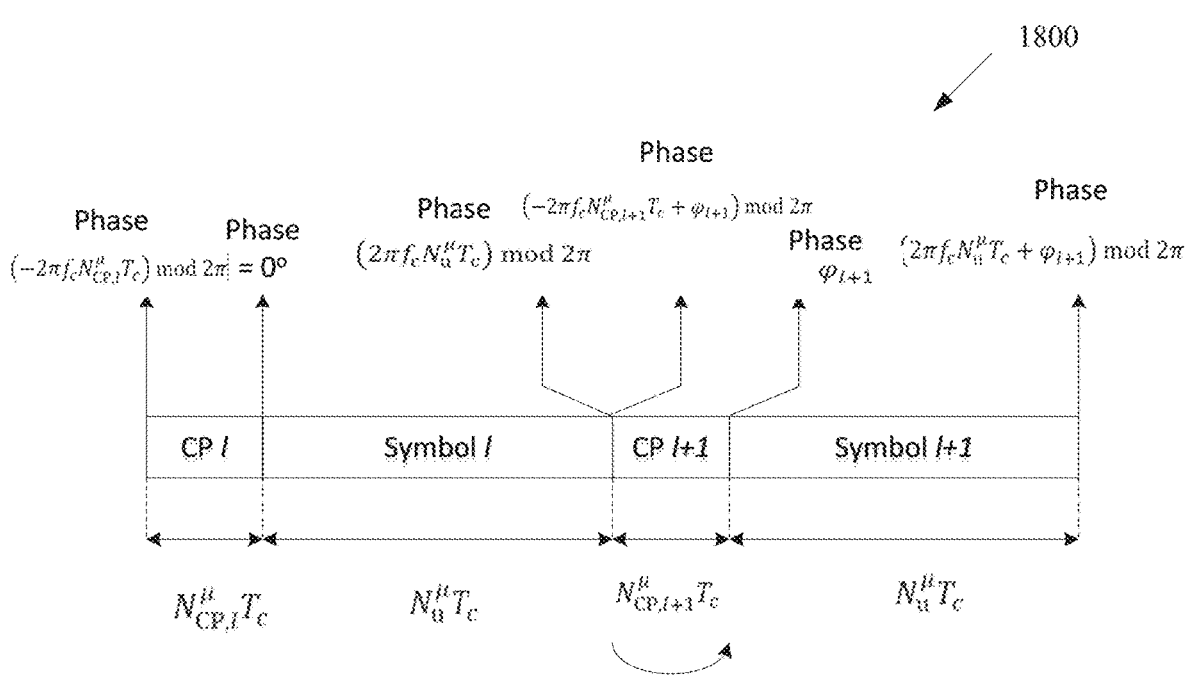

FIGS. 17 and 18 illustrate examples of phase across two consecutive symbols 1700 and 1800 according to embodiments of the present disclosure. The embodiment of the phase across two consecutive symbols 1700 and 1800 illustrated in FIGS. 17 and 18 are for illustration only.

The phase of the carrier is "0" after the CP of each OFDM symbol. FIG. 17, illustrates an example of the phase across two consecutive symbols, symbol 0 and symbol 1. In this example, the carrier frequency is 2.5 GHz and sub-carrier spacing is 15 kHz. Symbol 0, a first symbol of a subframe has a CP of duration 160 $T_s$=5.21 µs. Symbol 1, a second symbol of a subframe has a CP of duration 144 $T_s$=4.69 µs. The duration of the OFDM symbol (symbol 0 or symbol 1) excluding the CP has a duration of 2048 $T_s$=66.7 µs.

For symbol 0, the carrier phase is 0 after CP0. Therefore, the carrier phase at the start of CP0 is given by: (−5.21 µs×2.5 GHz×360) mod 360=60°. The carrier phase at the end of symbol 0 is given by: (67.7 µs×2.5 GHz×360) mod 360=240°=−120°. For symbol 1, the carrier phase is 0 after CP1. Therefore, the carrier phase at the start of CP1 is given by: (−4.69 µs×2.5 GHz×360) mod 360=90°. The carrier phase at the end of symbol 1 is given by: (67.7 µs×2.5 GHz×360) mod 360=240°=−120°. There is a jump or discontinuity at the end of symbol 0 and the start of the CP of symbol 1 in the phase, where the phase changes from −120° to 90°. To prevent this phase discontinuity, the carrier phase can be kept continuous across the symbols that carry the positioning reference signal or the positioning sounding reference signal.

In one example, the DL positioning reference signal has continuous phase across symbols in a slot. In one example, the DL positioning reference signal in a slot is transmitted across contiguous symbols. Let $$l_{start}^{PRS}$$

be the first DL PRS symbol in a slot. Let $L_{PRS}$ be the number of PRS symbols in the slot. The last DL PRS symbol of the slot is $$l_{start}^{PRS} + L_{PRS} - 1.$$

In one example, $$l_{start}^{PRS}$$

has a value in the range of {0, 1, . . . , 12}. Where the value can be configured or updated by RRC signaling and/or MAC CE signaling and/or L1 control signaling.

In one example, $$l_{start}^{PRS}$$

has a value in the range of {0, 1, . . . , 13}. Where the value can be configured or updated by RRC signaling and/or MAC CE signaling and/or L1 control signaling.

In one example, $$l_{start}^{PRS}$$

has a value a value of 0, where the value can be specified in the system specifications for example, when the DL PRS is used for the carrier phase method.

In one example, $$l_{start}^{PRS}$$

can be provided by a higher layer parameter (e.g., dl-PRS-ResourceSymbolOffset), if not provided a default value (e.g., 0) is used.

In one example, $L_{PRS}$ has a value in the range of {2, 4, 6, 12}. Where the value can be configured or updated by RRC signaling and/or MAC CE signaling and/or L1 control signaling.

In one example, $L_{PRS}$ has a value in the range of {2, 4, 6, 12, 14}. Where the value can be configured or updated by RRC signaling and/or MAC CE signaling and/or L1 control signaling.

In one example, $L_{PRS}$ has a value in the range of {2, 4, 6, 7, 12, 14}. Where the value can be configured or updated by RRC signaling and/or MAC CE signaling and/or L1 control signaling.

In one example, $L_{PRS}$ has a value in the range of {2, 4, 6, 14}. Where the value can be configured or updated by RRC signaling and/or MAC CE signaling and/or L1 control signaling.

In one example, $L_{PRS}$ has a value in the range of {2, 4, 7, 14}. Where the value can be configured or updated by RRC signaling and/or MAC CE signaling and/or L1 control signaling.

In one example, $L_{PRS}$ has a value of 14, where the value can be specified in the system specifications for example, when the DL PRS is used for the carrier phase method.

In one example, $L_{PRS}$ can be provided by a higher layer parameter (e.g., dl-PRS-NumSymbols), if not provided a default value (e.g., 14) is used.

In one example, consecutive slots contain DL PRS.

In the following examples, time t=0 is the start of a subframe containing DL PRS symbol l.

In one example, $$s_l^{(p,\mu)}(t)$$

is the generated OFDM symbol for DL PRS in symbol l, $$s_l^{(p,\mu)}(t)$$

can be a non-zero value in the range $$t_{start,l}^{\mu} \le t < t_{start,l}^{\mu} + T_{symb,l}^{\mu}, \text{ where } t_{start,l}^{\mu}$$

is the start of symbol l and $$T_{symb,l}^{\mu}$$

is the duration of symbol l. The generated OFDM symbols for DL PRS, $$s_l^{(p,\mu)}(t), \text{ with } l \in \{l_{start}^{PRS}, l_{start}^{PRS} + 1, \dots, l_{start}^{PRS} + L_{PRS} - 1\},$$

are then up converted to the carrier frequency $f_c$ using the following equation:

$$s_l^{(p,\mu)}(t) = \text{Re}\left\{s_l^{(p,\mu)}(t) \cdot e^{j2\pi f_c\left(t - t_{start,l_{start}^{PRS}}^{\mu} - N_{CP,l_{start}^{PRS}}^{\mu} T_c\right)}\right\}$$

where the phase of the carrier is continuous across the $L_{PRS}$ symbols starting at symbol $$l_{start}^{PRS}.$$

In a variant example, the generated OFDM symbols for DL PRS, $$s_l^{(p,\mu)}(t),$$

with $$l \in \{l_{start}^{PRS}, l_{start}^{PRS} + 1, \dots, l_{start}^{PRS} + L_{PRS} - 1\},$$

are then up converted to the carrier frequency $f_c$ using the following equation:

$$s_l^{(p,\mu)}(t) = \text{Re}\left\{s_l^{(p,\mu)}(t) \cdot e^{j2\pi f_c\left(t - t_{start,l_{start}^{PRS}}^{\mu}\right)}\right\}$$

where the phase of the carrier is continuous across the $L_{PRS}$ symbols starting at symbol $$l_{start}^{PRS}.$$

In a variant example, the generated OFDM symbols for DL PRS, $$s_l^{(p,\mu)}(t),$$

with $$l \in \{l_{start}^{PRS}, l_{start}^{PRS} + 1, \dots, l_{start}^{PRS} + L_{PRS} - 1\},$$

are then up converted to the carrier frequency $f_c$ using the following equation:

$$s_l^{(p,\mu)}(t) = \text{Re}\{s_l^{(p,\mu)}(t) \cdot e^{j2\pi f_c t}\}$$

where the phase of the carrier is continuous across the $L_{PRS}$ symbols starting at symbol $$l_{start}^{PRS}.$$

In a variant example, when the PRS symbols are continuous across a set of slots, phase continuity is maintained across the set of slots.

In a variant example, when the PRS symbols are continuous across a set of slots, phase continuity is maintained across the set of slots in a same subframe.

In a variant example, when the PRS symbols are continuous across a set of slots, phase continuity is maintained across the set of slots in a same frame.

In a variant example, when PRS symbols are allocated to contiguous slots, phase continuity is maintained across the set of contiguous slots.

In a variant example, when PRS symbols are allocated to contiguous slots, phase continuity is maintained across the set of contiguous slots in a same subframe.

In a variant example, when PRS symbols are allocated to contiguous slots, phase continuity is maintained across the set of contiguous slots in a same frame.

In a variant example, phase continuity is maintained after removing the cyclic prefix. This is illustrated in FIG. 18. Let $$s_l^{(p,\mu)}(t)$$

be the generated OFDM symbol for symbol l, and let $$s_{l+1}^{(p,\mu)}(t)$$

be the generated OFDM symbol for symbol l+1. OFDM symbol l is up converted to the carrier frequency according to:

$$s_l^{(p,\mu)}(t) = \mathrm{Re}\left\{ s_l^{(p,\mu)}(t) \cdot e^{j2\pi f_c\left(t - t_{start,l}^\mu - N_{CP,l}^\mu T_c\right)} \right\}.$$

The phase of the carrier (in radians) at the start of the CP in symbol l is $$\left(-2\pi f_c N_{CP,l}^\mu T_c\right) \bmod 2\pi.$$

The phase of the carrier (in radians) after the CP of symbol l is 0. The phase of the carrier (in radians) at the end of symbol l is $$(2\pi f_c N_u^\mu T_c) \bmod 2\pi, N_u^\mu$$

is the length of the symbol excluding the CP in $T_c$ samples $$N_u^\mu = 2048\kappa \cdot 2^{-\mu} \text{ and } \kappa = 64.$$

OFDM symbol l+1 is up converted to the carrier frequency according to:

$$s_{l+1}^{(p,\mu)}(t) = \mathrm{Re}\left\{ s_{l+1}^{(p,\mu)}(t) \cdot e^{j2\pi f_c\left(t - t_{start,l+1}^\mu 0 N_{CP,(l+1)}^\mu T_c\right)} \cdot e^{j\varphi_{l+1}} \right\}$$

where, $\varphi_{l+1}$ is an additional phase term added to symbol l+1, for phase continuity of the carrier from symbol l to symbol l+1 after removing the CP. The phase of the carrier (in radians) at the start of the CP is symbol l+1 is $$\left(-2\pi f_c N_{CP,l+1}^\mu T_c + \varphi_{l+1}\right) \bmod 2\pi.$$

The phase of the carrier (in radians) after the CP of symbol l+1 is $\varphi_{l+1}$. The phase of the carrier (in radians) at the end of symbol $$l + 1 \text{ is } (2\pi f_c N_u^\mu T_c + \varphi_{l+1}) \bmod 2\pi, \text{ where } N_u^\mu$$

is the length of the symbol excluding the CP in $T_c$ samples $$N_u^\mu = 2048\kappa \cdot 2^{-\mu} \text{ and } \kappa = 64.$$

To ensure, phase continuity after the removal of the CP between symbol l and symbol l+1.

The phase at the end of symbol $$l, (2\pi f_c N_u^\mu T_c + \varphi_l)$$

mod $2\pi$, may equal the phase after the CP of symbol l+1, $\varphi_{l+1}$. Therefore, $$\varphi_{l+1} = (2\pi f_c N_u^\mu T_c + \varphi_l) \bmod 2\pi \text{ or if } \varphi_l = 0, \varphi_{l+1} = (2\pi f_c N_u^\mu T_c) \bmod 2\pi.$$

Similarly, for symbol l+2, the additional carrier phase term $$\varphi_{l+2} = (2 \cdot 2\pi f_c N_u^\mu T_c) \bmod 2\pi \text{ or if } \varphi_l \neq 0,$$

$$\varphi_{l+2} = (2 \cdot 2\pi f_c N_u^\mu T_c + \varphi_l) \bmod 2\pi.$$

In general, if the first PRS symbol is $$l_{start}^{PRS},$$

for PRS symbol $$l = l_{start}^{PRS} + l_0,$$

the additional carrier phase term is $$\varphi_{l_{start}^{PRS}+l_0} = (l_0 \cdot 2\pi f_c N_u^\mu T_c) \bmod 2\pi, \text{ i.e., } s_{l_{start}^{PRS}+l_0}^{(p,\mu)}(t) =$$

$$\mathrm{Re}\left\{ s_{l_{start}^{PRS}+l_0}^{(p,\mu)}(t) \cdot e^{j2\pi f_c\left(t - t_{start,l_{start}^{PRS}+l_0}^\mu - N_{CP,(l_{start}^{PRS}+l_0)}^\mu T_c\right)} \cdot e^{j\varphi_{l_{start}^{PRS}+l_0}} \right\}.$$

Alternatively, the term $$e^{j\varphi_{l_{start}^{PRS}+l_0}}$$

can be applied to the baseband signal, i.e., for PRS symbol $$l_{start}^{PRS} + l_0,$$

the generated baseband signal is further multiplied by $$e^{j\varphi_{l_{start}^{PRS}+l_0}}$$

before up conversion, in one example this can be done for each sub-carrier. i.e., $$s_{l_{start}^{PRS}+l_0}^{(p,\mu)}(t)(\text{base band signal}) = s_{l_{start}^{PRS}+l_0}^{(p,\mu)}(t) \cdot e^{j\varphi_{l_{start}^{PRS}+l_0}}.$$

In this example, the base band signal after applying $$e^{j\varphi_{l_{start}^{PRS}+l_0}}$$

is up converted to the carrier frequency as follows:

$$s_{l_{start}^{PRS}+l_0}^{(p,\mu)}(t) = \mathrm{Re}\left\{s_{l_{start}^{PRS}+l_0}^{(p,\mu)}(t) \cdot e^{j2\pi f_c\left(t-t_{start,l_{start}^{PRS}+l_0}^\mu - N_{CP,(l_{start}^{PRS}+l_0)}^\mu T_c\right)}\right\}$$

which in this case follows the last equation (i.e., for all other channels and signals) of TS 38.211.

In a variant example, when the PRS symbols are continuous across a set of slots, phase continuity, after removing the CP, is maintained across the set of slots.

In a variant example, when the PRS symbols are continuous across a set of slots, phase continuity, after removing the CP, is maintained across the set of slots in a same subframe.

In a variant example, when the PRS symbols are continuous across a set of slots, phase continuity, after removing the CP, is maintained across the set of slots in a same frame.

In a variant example, when PRS symbols are allocated to contiguous slots, phase continuity, after removing the CP, is maintained across the set of contiguous slots.

In a variant example, when PRS symbols are allocated to contiguous slots, phase continuity, after removing the CP, is maintained across the set of contiguous slots in a same subframe.

In a variant example, when PRS symbols are allocated to contiguous slots, phase continuity, after removing the CP, is maintained across the set of contiguous slots in a same frame.

In a variant example, phase continuity is maintained after removing the cyclic prefix for each sub-carrier. Consider a sub-carrier, k, with frequency $$f_{sc-k} = \left(k + k_0^\mu - \frac{N_{grid,x}^{size,\mu} \cdot N_{sc}^{RB}}{2}\right)\Delta f,$$

where $\Delta f$ is the sub-carrier spacing. After up conversion to the carrier frequency, this sub-carrier (i.e., sub-carrier k) may have a frequency $f_{c-k}$ given by:

$$f_{c-k} = \left(k + k_0^\mu - \frac{N_{grid,x}^{size,\mu} \cdot N_{sc}^{RB}}{2}\right)\Delta f + f_c.$$

Following the previous analysis, for carrier frequency $f_c$, if the frequency of the sub-carrier is $f_{c-k}$, to maintain phase continuity for this sub-carrier (i.e., sub-carrier k) after removing the CP, the phase of symbol l+1 relative to the phase of symbol l is given by:

$$\varphi_{l+1,k} = (2\pi f_{c-k} N_u^\mu T_c) \bmod 2\pi, \; \varphi_{l+1,k} =$$

$$\left(2\pi\left(\left(k + k_0^\mu - \frac{N_{grid,x}^{size,\mu} N_{sc}^{RB}}{2}\right)\Delta f + f_c\right) N_u^\mu T_c\right) \bmod 2\pi, \; N_u^\mu =$$

$$2048 \; \kappa \cdot 2^{-\mu}, \; T_c = \frac{1}{2048 \; \kappa \cdot (15 \text{ kHz})}, \text{ and } \Delta f = (15 \text{ kHz})2^\mu.$$

Therefore, $$\varphi_{l+1,k} = \left(2\pi\left(k + k_0^\mu - \frac{N_{grid,x}^{size,\mu} \cdot N_{sc}^{RB}}{2} + N_u^\mu T_c f_c\right)\right) \bmod 2\pi.$$

As k is an integer, therefore, $\varphi_{l+1,k}$ is independent of k due to the modulo operation;

$$\phi_{l+1} = \varphi_{l+1,k} = \left(2\pi\left(k_0^\mu - \frac{N_{grid,x}^{size,\mu} \cdot N_{sc}^{RB}}{2} + N_u^\mu T_c f_c\right)\right) \bmod 2\pi.$$

Similarly, for symbol l+2, the additional carrier phase term is:

$$\phi_{l+2} = \left(2 \cdot 2\pi\left(k_0^\mu - \frac{N_{grid,x}^{size,\mu} \cdot N_{sc}^{RB}}{2} + N_u^\mu T_c f_c\right)\right) \bmod 2\pi.$$

In general, if the first PRS symbol is $$l_{start}^{PRS},$$

for PRS symbol $$l = l_{start}^{PRS} + l_0,$$

the additional carrier phase term is:

$$\phi_{l_{start}^{PRS}+l_0} = \left( l_0 \cdot 2\pi \left( k_0^{\mu} - \frac{N_{grid,x}^{size,\mu} \cdot N_{sc}^{RB}}{2} + N_u^{\mu} T_c f_c \right) \right) \bmod 2\pi$$

i.e., $$s_{l_{start}^{PRS}+l_0}^{(p,\mu)}(t) =$$

$$\text{Re}\left\{ s_{l_{start}^{PRS}+l_0}^{(p,\mu)}(t) \cdot e^{j2\pi f_c\left( t - t_{start,l_{start}^{PRS}+l_0}^{\mu} - N_{CP,(l_{start}^{PRS}+l_0)}^{\mu} T_c \right)} \cdot e^{j\phi_{l_{start}^{PRS}+l_0}} \right\}.$$

Alternatively, the term $$e^{j\phi_{l_{start}^{PSR}+l_0}}$$

can be applied to the baseband signal, i.e., for PRS symbol $$l_{start}^{PRS} + l_0,$$

the generated baseband signal is further multiplied by $$e^{j\phi_{l_{start}^{PSR}+l_0}}$$

before up conversion, in one example this can be done for each sub-carrier. i.e., $$s_{l_{start}^{PRS}+l_0}^{(p,\mu)}(t)(\text{base band signal}) = s_{l_{start}^{PRS}+l_0}^{(p,\mu)}(t) \cdot e^{j\phi_{l_{start}^{PRS}+l_0}}.$$

In this example, the base band signal after applying $$e^{j\phi_{l_{start}^{PSR}+l_0}}$$

is up converted to the carrier frequency as follows:

$$s_{l_{start}^{PRS}+l_0}^{(p,\mu)}(t) = \text{Re}\left\{ s_{l_{start}^{PRS}+l_0}^{(p,\mu)}(t) \cdot e^{j2\pi f_c\left( t - t_{start,l_{start}^{PRS}+l_0}^{\mu} - N_{CP,(l_{start}^{PRS}+l_0)}^{\mu} T_c \right)} \right\}$$

which in this case follows the last equation (i.e., for all other channels and signals) of TS 38.211.

In a variant example, when the PRS symbols are continuous across a set of slots, phase continuity for each sub-carrier, after removing the CP, is maintained across the set of slots.

In a variant example, when the PRS symbols are continuous across a set of slots, phase continuity for each sub-carrier, after removing the CP, is maintained across the set of slots in a same subframe.

In a variant example, when the PRS symbols are continuous across a set of slots, phase continuity for each sub-carrier, after removing the CP, is maintained across the set of slots in a same frame.

In a variant example, when PRS symbols are allocated to contiguous slots, phase continuity for each sub-carrier, after removing the CP, is maintained across the set of contiguous slots.

In a variant example, when PRS symbols are allocated to contiguous slots, phase continuity for each sub-carrier, after removing the CP, is maintained across the set of contiguous slots in a same subframe.

In a variant example, when PRS symbols are allocated to contiguous slots, phase continuity for each sub-carrier, after removing the CP, is maintained across the set of contiguous slots in a same frame.

In one example, the DL positioning reference signal when used for the carrier phase method has a comb structure, with a comb size $$K_{comb}^{PRS},$$

where every $$K_{comb}^{PRS}$$

sub-carrier is used for a DL PRS resource. The remaining $$K_{comb}^{PRS} - 1$$

sub-carriers in a set of $$K_{comb}^{PRS}$$

contiguous sub-carriers, in PRBs allocated to DL PRS (e.g., DL PRS resource or DL PRS resource set), is not used for the DL PRS resource (e.g., can be used for other PRS resources).

In one example, the sub carrier offset, with a Comb size of $$K_{comb}^{PRS}, \text{ is given by } k = mK_{comb}^{PRS} + \left( \left( k_{offset}^{PRS} + k' \right) \bmod K_{comb}^{PRS} \right)$$

as described earlier, where the frequency offset k' is a function of PRS symbol position $$l - l_{start}^{PRS}$$

as described earlier.

In one example, a same sub-carrier is used for the DL PRS resource in consecutive PRS symbols, i.e., k' is independent of PRS symbol position $$l - l_{start}^{PRS},$$

for example k'=0. This can allow the same sub-carrier to be used in consecutive symbols and can allow the same sub-carrier to be used for the calculation of the carrier phase across multiple symbols.

In one example, the DL positioning reference signal used for the carrier phase method uses a continuous sub-carrier allocation, i.e., $$K_{comb}^{PRS} = 1$$

or all sub-carriers in PRBs allocated to DL PRS (e.g., DL PRS resource or DL PRS resource set) are used for the DL PRS resource. This can allow fine sub-carrier spacing for better calculation of the carrier phase and of a slope between the carrier phase and frequency.

In one example, the UL positioning reference signal (or positioning SRS) has continuous phase across symbols in a slot. In one example, the UL positioning reference signal (or positioning SRS) in a slot is transmitted across contiguous symbols. Let $l_0$ be the first UL PRS (or positioning SRS) symbol in a slot, this can be given by $$N_{symb}^{slot} - 1 - l_{offset}, \text{ where } l_{offset}$$

is an offset from the end of the slot. Let $$N_{symb}^{SRS}$$

be the number of UL PRS (or positioning SRS) symbols in the slot. The last UL PRS (or positioning SRS) symbol of the slot is $$l_0 + N_{symb}^{SRS} - 1 \text{ or } N_{symb}^{slot} + N_{symb}^{SRS} - 2 - l_{offset}.$$

In one example, $l_0$ has a value in the range of $\{0, 1, \ldots, 12\}$. Where the value can be configured or updated by RRC signaling and/or MAC CE signaling and/or L1 control signaling.

In one example, $l_0$ has a value in the range of $\{0, 1, \ldots, 13\}$. Where the value can be configured or updated by RRC signaling and/or MAC CE signaling and/or L1 control signaling.

In one example, $l_0$ has a value a value of 0, where the value can be specified in the system specifications for example, when the UL PRS (or positioning SRS) is used for the carrier phase method.

In one example, $l_0$ can be provided by a higher layer parameter, if not provided a default value (e.g., 0) is used.

In one example, $l_{offset}$ has a value in the range of $\{0, 1, \ldots, 12\}$. Where the value can be configured or updated by RRC signaling and/or MAC CE signaling and/or L1 control signaling.

In one example, $l_{offset}$ has a value in the range of $\{0, 1, \ldots, 13\}$. Where the value can be configured or updated by RRC signaling and/or MAC CE signaling and/or L1 control signaling.

In one example, $l_{offset}$ has a value a value of 13, where the value can be specified in the system specifications for example, when the UL PRS (or positioning SRS) is used for the carrier phase method.

In one example, $l_{offset}$ can be provided by a higher layer parameter (e.g., startPosition in resourceMapping IE), if not provided a default value (e.g., 13) is used.

In one example, $$N_{symb}^{SRS}$$

has a value in the range of $\{1, 2, 4, 8, 12\}$. Where the value can be configured or updated by RRC signaling and/or MAC CE signaling and/or L1 control signaling.

In one example, $$N_{symb}^{SRS}$$

has a value in the range of $\{1, 2, 4, 8, 12, 14\}$. Where the value can be configured or updated by RRC signaling and/or MAC CE signaling and/or L1 control signaling.

In one example, $$N_{symb}^{SRS}$$

has a value in the range of $\{1, 2, 4, 7, 8, 12, 14\}$. Where the value can be configured or updated by RRC signaling and/or MAC CE signaling and/or L1 control signaling.

In one example, $$N_{symb}^{SRS}$$

has a value in the range of $\{1, 2, 4, 8, 14\}$. Where the value can be configured or updated by RRC signaling and/or MAC CE signaling and/or L1 control signaling.

In one example, $$N_{symb}^{SRS}$$

has a value in the range of $\{1, 2, 4, 7, 14\}$. Where the value can be configured or updated by RRC signaling and/or MAC CE signaling and/or L1 control signaling.

In one example, $$N_{symb}^{SRS}$$

has a value of 14, where the value can be specified in the system specifications for example, when the UL PRS is used for the carrier phase method.

In one example, $$N_{symb}^{SRS}$$

can be provided by a higher layer parameter (e.g., nrofSymbols in resourceMapping IE), if not provided a default value (e.g., 14) is used.

In one example, consecutive slots contain UL PRS (or positioning SRS).

In the following examples, time t=0 is the start of a subframe containing UL PRS (or positioning SRS) symbol l.

In one example, $$s_l^{(p,\mu)}(t)$$

is the generated OFDM symbol for UL PRS (or positioning SRS) in symbol $$l,\ s_l^{(p,\mu)}(t)$$

can be a non-zero value in the range $$t_{start,l}^{\mu} \le t < t_{start,l}^{\mu} + T_{symb,l}^{\mu},\ \text{where } t_{start,l}^{\mu}$$

is the start of symbol l and $$T_{symb,l}^{\mu}$$

is the duration of symbol l. The generated OFDM symbols for UL PRS (or positioning SRS), $$s_l^{(p,\mu)}(t),\ \text{with } l \in \{l_0, l_0 + 1, \ldots, l_0 + N_{symb}^{SRS} - 1\},$$

are then up converted to the carrier frequency $f_c$ using the following equation:

$$s_l^{(p,\mu)}(t) = \mathrm{Re}\left\{ s_l^{(p,\mu)}(t) \cdot e^{j2\pi f_c\left(t - t_{start,l_0}^{\mu} - N_{CP,l_0}^{\mu} T_c\right)} \right\}$$

where the phase of the carrier is continuous across the $$N_{symb}^{SRS}$$

symbols starting at symbol $l_0$.

In a variant example, the generated OFDM symbols for UL PRS (or positioning SRS), $$s_l^{(p,\mu)}(t),\ \text{with } l \in \{l_0, l_0 + 1, \ldots, l_0 + N_{symb}^{SRS} - 1\},$$

are then up converted to the carrier frequency $f_c$ using the following equation:

$$s_l^{(p,\mu)}(t) = \mathrm{Re}\left\{ s_l^{(p,\mu)}(t) \cdot e^{j2\pi f_c\left(t - t_{start,l_0}^{\mu}\right)} \right\}$$

where the phase of the carrier is continuous across the $$N_{symb}^{SRS}$$

symbols starting at symbol $l_0$.

In a variant example, the generated OFDM symbols for UL PRS (or positioning SRS), $$s_l^{(p,\mu)}(t),\ \text{with } l \in \{l_0, l_0 + 1, \ldots, l_0 + N_{symb}^{SRS} - 1\},$$

are then up converted to the carrier frequency $f_c$ using the following equation:

$$s_l^{(p,\mu)}(t) = \mathrm{Re}\left\{ s_l^{(p,\mu)}(t) \cdot e^{j2\pi f_c t} \right\}$$

where the phase of the carrier is continuous across the $$N_{symb}^{SRS}$$

symbols starting at symbol $l_0$.

In a variant example, when the UL PRS (or positioning SRS) symbols are continuous across a set of slots, phase continuity is maintained across the set of slots.

In a variant example, when the UL PRS (or positioning SRS) symbols are continuous across a set of slots, phase continuity is maintained across the set of slots in a same subframe.

In a variant example, when the UL PRS (or positioning SRS) symbols are continuous across a set of slots, phase continuity is maintained across the set of slots in a same frame.

In a variant example, when UL PRS symbols (or positioning SRS) are allocated to contiguous slots, phase continuity is maintained across the set of contiguous slots.

In a variant example, when UL PRS symbols (or positioning SRS) are allocated to contiguous slots, phase continuity is maintained across the set of contiguous slots in a same subframe.

In a variant example, when UL PRS symbols (or positioning SRS) are allocated to contiguous slots, phase continuity is maintained across the set of contiguous slots in a same frame.

In a variant example, phase continuity is maintained after removing the cyclic prefix. This is illustrated in FIG. 18. Let $$s_l^{(p,\mu)}(t)$$

be the generated OFDM symbol for symbol l, and let $$s_{l+1}^{(p,\mu)}(t)$$

be the generated OFDM symbol for symbol l+1. OFDM symbol l is up converted to the carrier frequency according to:

$$s_l^{(p,\mu)}(t) = \mathrm{Re}\left\{ s_l^{(p,\mu)}(t) \cdot e^{j2\pi f_c\left(t - t_{start,l}^{\mu} - N_{CP,l}^{\mu} T_c\right)} \right\}.$$

The phase of the carrier (in radians) at the start of the CP in symbol l is $$\left(-2\pi f_c N_{CP,l}^{\mu} T_c\right) \bmod 2\pi.$$

The phase of the carrier (in radians) after the CP of symbol l is 0. The phase of the carrier (in radians) at the end of symbol l is $(2\pi f_c N_u^{\mu} T_c) \bmod 2\pi$, where $N_u^{\mu}$ is the length of the symbol excluding the CP in $T_c$ samples $$N_u^{\mu} = 2048\kappa \cdot 2^{-\mu} \text{ and } \kappa = 64.$$

OFDM symbol l+1 is up converted to the carrier frequency according to:

$$s_{l+1}^{(p,\mu)}(t) = \mathrm{Re}\left\{ s_{l+1}^{(p,\mu)}(t) \cdot e^{j2\pi f_c \left(t - t_{start,l+1}^{\mu} - N_{CP,(l+1)}^{\mu} T_c\right)} \cdot e^{j\varphi_{l+1}} \right\}$$

where, $\varphi_{l+1}$ is an additional phase term added to symbol l+1, for phase continuity of the carrier from symbol l to symbol l+1 after removing the CP. The phase of the carrier (in radians) at the start of the CP is symbol l+1 is $\left(-2\pi f_c N_{CP,l+1}^{\mu} T_c + \phi_{l+1}\right) \bmod 2\pi.$ The phase of the carrier (in radians) after the CP of symbol l+1 is $\varphi_{l+1}$. The phase of the carrier (in radians) at the end of symbol l+1 $(2\pi f_c N_u^{\mu} T_c + \varphi_{l+1}) \bmod 2\pi$, where $N_u^{\mu}$ is the length of the symbol excluding the CP in $T_c$ samples $$N_u^{\mu} = 2048\kappa \cdot 2^{-\mu} \text{ and } \kappa = 64.$$

To ensure, phase continuity after the removal of the CP between symbol l and symbol l+1. The phase at the end of symbol l, $(2\pi f_c N_u^{\mu} T_c + \varphi_l) \bmod 2\pi$, may equal the phase after the CP of symbol l+1, $\varphi_{l+1}$. Therefore, $$\varphi_{l+1} = (2\pi f_c N_u^{\mu} T_c + \varphi_l) \bmod 2\pi \text{ or if } \varphi_l = 0, \varphi_{l+1} = (2\pi f_c N_u^{\mu} T_c) \bmod 2\pi.$$

Similarly, for symbol l+2, the additional carrier phase term $$\varphi_{l+2} = (2 \cdot 2\pi f_c N_u^{\mu} T_c)$$

mod 2π or if $$\varphi_l \neq 0, \varphi_{l+2} = (2 \cdot 2\pi f_c N_u^{\mu} T_c + \varphi_l)$$

mod 2π. In general, if the first UL PRS (or positioning SRS) symbol is $l_0$, for UL PRS (or positioning SRS) symbol $l=l_0+l_{SRS}$, the additional carries phase term is $$\varphi_{l_0+l_{SRS}} = (l_{SRS} \cdot 2\pi f_c N_u^{\mu} T_c) \bmod 2\pi,$$

i.e., $$s_{l_0+l_{SRS}}^{(p,\mu)}(t) = \mathrm{Re}\left\{ s_{l_0+l_{SRS}}^{(p,\mu)}(t) \cdot e^{j2\pi f_c \left(t - t_{start,l_0+l_{SRS}}^{\mu} - N_{CP,(l_0+l_{SRS})}^{\mu} T_c\right)} \cdot e^{j\varphi_{l_0+l_{SRS}}} \right\}.$$

Alternatively, the term $e^{j\varphi_{l_0+l_{SRS}}}$ can be applied to the baseband signal, i.e., for UL PRS (or positioning SRS) symbol $l_0+l_{SRS}$, the generated baseband signal is further multiplied by $e^{j\varphi_{l_0+l_{SRS}}}$ before up conversion, in one example this can be done for each sub-carrier. i.e., $$s_{l_0+l_{SRS}}^{(p,\mu)}(t) \text{ (base band signal)} = s_{l_0+l_{SRS}}^{(p,\mu)}(t) \cdot e^{j\varphi_{l_0+l_{SRS}}}.$$

In this example, the base band signal after applying $e^{j\varphi_{l_0+l_{SRS}}}$ is up converted to the carrier frequency as follows:

$$s_{l_0+l_{SRS}}^{(p,\mu)}(t) = \mathrm{Re}\left\{ s_{l_0+l_{SRS}}^{(p,\mu)}(t) \cdot e^{j2\pi f_c \left(t - t_{start,l_0+l_{SRS}}^{\mu} - N_{CP,(l_0+l_{SRS})}^{\mu} T_c\right)} \right\}$$

which in this case follows the last equation (i.e., for all other channels and signals) of TS 38.211.

In a variant example, when the UL PRS (or positioning SRS) symbols are continuous across a set of slots, phase continuity, after removing the CP, is maintained across the set of slots.

In a variant example, when the UL PRS (or positioning SRS) symbols are continuous across a set of slots, phase continuity, after removing the CP, is maintained across the set of slots in a same subframe.

In a variant example, when the UL PRS (or positioning SRS) symbols are continuous across a set of slots, phase continuity, after removing the CP, is maintained across the set of slots in a same frame.

In a variant example, when UL PRS (or positioning SRS) symbols are allocated to contiguous slots, phase continuity, after removing the CP, is maintained across the set of contiguous slots.

In a variant example, when UL PRS (or positioning SRS) symbols are allocated to contiguous slots, phase continuity, after removing the CP, is maintained across the set of contiguous slots in a same subframe.

In a variant example, when UL PRS (or positioning SRS) symbols are allocated to contiguous slots, phase continuity, after removing the CP, is maintained across the set of contiguous slots in a same frame.

In a variant example, phase continuity is maintained after removing the cyclic prefix for each sub-carrier. Consider a sub-carrier, k, with frequency $$f_{sc-k} = \left(k + k_0^\mu - \frac{N_{grid,x}^{size,\mu} \cdot N_{sc}^{RB}}{2}\right)\Delta f,$$

where $\Delta f$ is the sub-carrier spacing. After up conversion to the carrier frequency, this sub-carrier (i.e., sub-carrier k) may have a frequency $f_{c-k}$ given by:

$$f_{c-k} = \left(k + k_0^\mu - \frac{N_{grid,x}^{size,\mu} \cdot N_{sc}^{RB}}{2}\right)\Delta f + f_c.$$

Following the previous analysis, for carrier frequency $f_c$, if the frequency of the sub-carrier is $f_{c-k}$, to maintain phase continuity for this sub-carrier (i.e., sub-carrier k) after removing the CP, the phase of symbol l+1 relative to the phase of symbol l is given by:

$$\varphi_{l+1,k} = (2\pi f_{c-k} N_u^\mu T_c) \bmod 2\pi,$$

$$\varphi_{l+1,k} = \left(2\pi\left(\left(k + k_0^\mu - \frac{N_{grid,x}^{size,\mu} \cdot N_{sc}^{RB}}{2}\right)\Delta f + f_c\right)N_u^\mu T_c\right)\bmod 2\pi,$$

$$N_u^\mu = 2048\kappa \cdot 2^{-\mu},$$

$$T_c = \frac{1}{2048\kappa \cdot (15 \text{ kHz})},$$

and $\Delta f = (15 \text{ kHz})2^\mu$.

Therefore, $$\varphi_{l+1,k} = \left(2\pi\left(k + k_0^\mu - \frac{N_{grid,x}^{size,\mu} \cdot N_{sc}^{RB}}{2} + N_u^\mu T_c f_c\right)\right)\bmod 2\pi.$$

As k is an integer, therefore, $\varphi_{l+1,k}$ is independent of k due to the modulo operationn:

$$\phi_{l+1} = \varphi_{l+1,k} = \left(2\pi\left(k_0^\mu - \frac{N_{grid,x}^{size,\mu} \cdot N_{sc}^{RB}}{2} + N_u^\mu T_c f_c\right)\right)\bmod 2\pi.$$

Similarly, for symbol l+2, the additional carrier phase term is:

$$\phi_{l+2} = \left(2 \cdot 2\pi\left(k_0^\mu - \frac{N_{grid,x}^{size,\mu} \cdot N_{sc}^{RB}}{2} + N_u^\mu T_c f_c\right)\right)\bmod 2\pi.$$

In general, if the first UL PRS (or positioning SRS) symbol is $l_0$, for PRS symbol $l=l_0+l_{SRS}$, the additional carrier phase term is:

$$\phi_{l_0+l_{SRS}} = \left(l_{SRS} \cdot 2\pi\left(k_0^\mu - \frac{N_{grid,x}^{size,\mu} \cdot N_{sc}^{RB}}{2} + N_u^\mu T_c f_c\right)\right)\bmod 2\pi$$

i.e.,

-continued $$s_{l_0+l_{SRS}}^{(p,\mu)}(t) = \text{Re}\left\{s_{l_0+l_{SRS}}^{(p,\mu)}(t) \cdot e^{j2\pi f_c\left(t - t_{start,l_0+l_{SRS}}^\mu - N_{CP,(l_0+l_{SRS})}^\mu T_c\right)} \cdot e^{j\phi_{l_0+l_{SRS}}}\right\}.$$

Alternatively, the term $e^{j\varphi_{l_0+l\ SRS}}$ can be applied to the baseband signal, i.e., for PRS symbol $l_0+l_{SRS}$, the generated baseband signal is further multiplied by $e^{j\varphi_{l_0+l\ SRS}}$ before up conversion, in one example this can be done for each sub-carrier. i.e., $$s_{l_0+l_{SRS}}^{(p,\mu)}(t)\ (\text{base band signal}) = s_{l_0+l_{SRS}}^{(p,\mu)}(t) \cdot e^{j\phi_{l_0+l_{SRS}}}.$$

In this example, the base band signal after applying $e^{j\varphi_{l_0+l\ SRS}}$ is up converted to the carrier frequency as follows:

$$s_{l_0+l_{SRS}}^{(p,\mu)}(t) = \text{Re}\left\{s_{l_0+l_{SRS}}^{(p,\mu)}(t) \cdot e^{j2\pi f_c\left(t - t_{start,l_0+l_{SRS}}^\mu - N_{CP,(l_0+l_{SRS})}^\mu T_c\right)}\right\}$$

which in this case follows the last equation (i.e., for all other channels and signals) of TS 38.211.

In a variant example, when the UL PRS (or positioning SRS) symbols are continuous across a set of slots, phase continuity for each sub-carrier, after removing the CP, is maintained across the set of slots.

In a variant example, when the UL PRS (or positioning SRS) symbols are continuous across a set of slots, phase continuity for each sub-carrier, after removing the CP, is maintained across the set of slots in a same subframe.

In a variant example, when the UL PRS (or positioning SRS) symbols are continuous across a set of slots, phase continuity for each sub-carrier, after removing the CP, is maintained across the set of slots in a same frame.

In a variant example, when UL PRS (or positioning SRS) symbols are allocated to contiguous slots, phase continuity for each sub-carrier, after removing the CP, is maintained across the set of contiguous slots.

In a variant example, when UL PRS (or positioning SRS) symbols are allocated to contiguous slots, phase continuity for each sub-carrier, after removing the CP, is maintained across the set of contiguous slots in a same subframe.

In a variant example, when UL PRS (or positioning SRS) symbols are allocated to contiguous slots, phase continuity for each sub-carrier, after removing the CP, is maintained across the set of contiguous slots in a same frame.

In one example, the UL positioning reference signal (or positioning SRS) when used for the carrier phase method has a comb structure, with a transmission comb number (comb size) $K_{TC}$, where every $K_{TC}$ sub-carrier is used for an UL PRS (positioning SRS) resource. The remaining $K_{TC}-1$ sub-carriers in a set of $K_{TC}$ contiguous sub-carriers, in PRBs allocated to UL PRS (positioning SRS) (e.g., UL PRS (positioning SRS) resource or UL PRS (positioning SRS) resource set), is not used for the UL PRS (or positioning SRS) resource (e.g., can be used for other UL PRS or SRS resources).

In one example, the sub-carrier offset, with a transmission comb number (comb size) of $K_{TC}$, is given by $$k = K_{TC}k' + k_0^{(p)}$$

as described earlier, where the frequency offset $$k_0^{(p)}$$

is a function of UL PRS (position SRS) symbol position $1-1_0$ as described earlier.

In one example, a same sub-carrier is used for the UL PRS (or positioning SRS) resource in consecutive UL PRS (or positioning SRS) symbols, i.e., $$k_0^{(p)}$$

is independent of UL PRS (or positioning SRS) symbol position $1-1_0$, for example $$k_0^{(p)} = 0.$$

This can allow the same sub-carrier to be used in consecutive symbols and can allow the same sub-carrier to be used for the calculation of the carrier phase across multiple symbols.

In one example, the UL positioning reference signal (or positioning SRS) used for the carrier phase method uses a continuous sub-carrier allocation, i.e., $K_{TC}=1$ or all sub-carriers in PRBs allocated to UL PRS (or positioning SRS) (e.g., UL PRS resource (or positioning SRS) or UL PRS (or positioning SRS) resource set) are used for the UL PRS (or positioning SRS) resource. This can allow fine sub-carrier spacing for better calculation of the carrier phase and of a slope between the carrier phase and frequency.

A single ray of a radio wave propagating in space can be described as: $\psi(t,r)=A \cos(wt-k \cdot r+\varphi)$. This equation can alternatively be written as: $(t,r)=A \cos(k \cdot r-wt+\varphi)$ where: t is time; r is the position vector; w is the angular frequency, related to wave frequency f by; $w=2\pi f$; k is the wave vector, which is related to the wave number k by $k=|k|$. k is related to the wavelength of the wave, $\lambda$, by $k=2\pi/\lambda$; A is the amplitude of the wave, in general can be a function of time t and position; and $\varphi$ is an initial phase at t=0 and r=0.

Figure 19A:
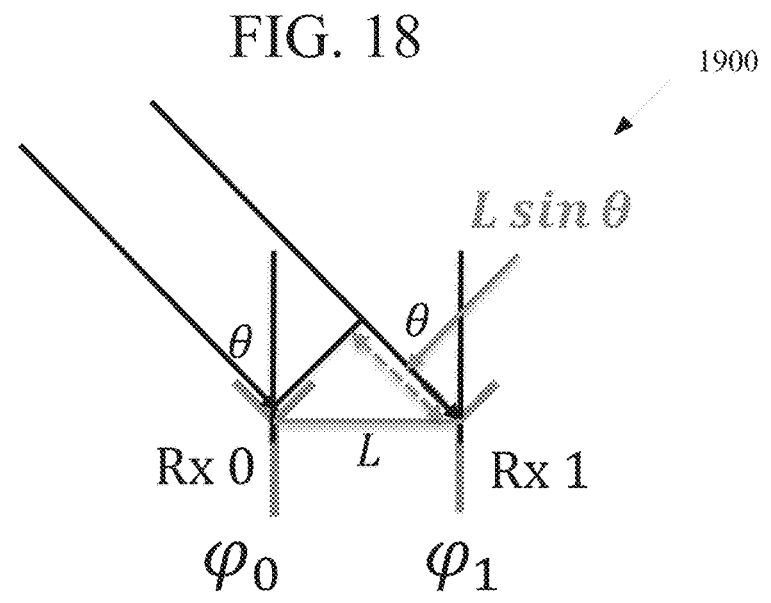
FIG. 19A illustrates examples of rays in parallel according to embodiments of the present disclosure.

FIG. 19A illustrates examples of rays in parallel 1900 according to embodiments of the present disclosure. The embodiment of the rays in parallel 1900 illustrated in FIG. 19A is for illustration only.

Consider rays that travel parallel, as shown in FIG. 19A, the wave front is a plane perpendicular to the direction of the wave. To reach R×1, the wave travels an extra distance L sin $\theta$. Hence, there is a phase lag at R×1 compared to R×0 by $$\frac{2\pi}{\lambda} L \sin\theta.$$

If the signal $S_0$ at R×0 is $S_0=A_0 \cos \varphi_0$, the signal at R×1 is $$S_1 = A_1 \cos\varphi_1 = A_1 \cos\left(\varphi_0 - \frac{2\pi}{\lambda} L \sin\theta\right).$$

Note that this result can also be determined based on the equation (3-1), in this example, in 2-Dimension (i.e., x and y plane), $$k = \frac{2\pi}{\lambda}(\sin\theta \hat{a}_x - \cos\theta \hat{a}_y),$$

where $\hat{a}_x$ is a unit vector in the x-axis direction and $\hat{a}_y$ is a unit vector in the y-axis direction. Taking R×0 as point (0,0), and R×1 as point (L, 0). According to the equation (3-1), the wave at R×0 is $A_0 \cos(wt+\varphi)$, wherein $\varphi_0=wt+\varphi$ and the wave at R×1 is $$A_1 \cos\left(wt - \frac{2\pi}{\lambda} L \sin\theta + \varphi\right),$$

wherein $$\varphi_1 = wt + \varphi - \frac{2\pi}{\lambda} L \sin\theta = \varphi_0 - \frac{2\pi}{\lambda} L \sin\theta.$$

Therefore, by measuring the phase of the signal at R×0 and comparing it to the phase of the signal at R×1 at the same time, it may get the direction of travel $\theta$:

$$\theta = \arcsin\frac{(\varphi_0 - \varphi_1)\lambda}{2\pi L}$$

(equation (B)).

Figure 19B:
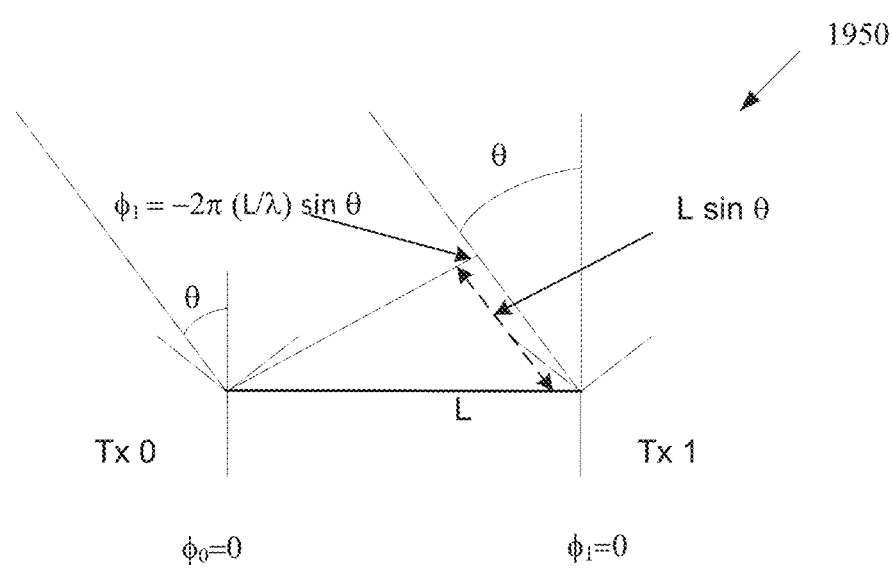
FIG. 19B illustrates examples of phase difference between received ray from the respective transmit element according to embodiments of the present disclosure.

FIG. 19B illustrates examples of phase difference between received ray from the respective transmit element 1950 according to embodiments of the present disclosure. The embodiment of the phase difference between received ray from the respective transmit element 1950 illustrated in FIG. 19B is for illustration only.

Conversely, when two rays are transmitted by two transmit antenna elements and that are synchronized in phase relative to the start the respective transmission periods, the rays are received by a receive antenna element. The phase difference between received ray from the respective transmit element is related to the transmission angle as illustrated in FIG. 19B.

Consider rays that travel parallel, as shown in FIG. 19B (the receiver is far enough from the transmitter antenna elements that two rays are parallel), the wave front is a plane perpendicular to the direction of the wave. To reach the same wave front, the ray from T×1, travels an extra distance L sin $\theta$. Hence, there is a phase lag in the signal from T×1 compared to T×0 by $$\frac{2\pi}{\lambda} L \sin\theta,$$

the direction of transmission can be determined using an equation similar to equation B.

Carrier phase method can be used for positioning to provide a more accurate positioning estimate. Carrier phase (CP) positioning relies on measuring a carrier phase at the RF frequency of a signal transmitted from one device (e.g., device A) and received by another device (e.g., device B). The carrier phase measured at device B is a function of the propagation time, and consequently the propagation distance, from transmitter of device A to the receiver of device B. Device A and device B can be a gNB and a UE respectively or vice versa. In case of PC5 (sidelink) air interface device A can be a first UE and device B can be a second UE.

As illustrated in FIG. 8, signal s(t−τ) is transmitted from a first device at time t−τ and arrives at a second device at time t. A reference signal at the second device is r(t). Consider a signal s(t)=cos $\varphi_s(t)$, where $\varphi_s(t)$ is the phase of the signal at time t. The phase at time $t_0$ is given by $\varphi_s(t_0)$. $\varphi_s(t_0)$ and $\varphi_s(t)$ are related as follows:

$$\phi_S(t) = \phi_S(t_0) + 2\pi \int_{t_0}^{t} f(s)ds$$

equation (3-1) where, f(s) is the frequency of signal s(t) at time s. If the frequency is constant over time and equals $f_s$, the equation (3-1) becomes: $\varphi_s(t)=\varphi_s(t_0)+2\pi f_s(t-t_0)$ equation (3-2).

Let s(t) be the signal transmitted from a transmitter of a first device. The signal is received by a second device at time t. The propagation time from the first device to the second device is τ. Therefore, to be receive at time t, the signal is transmitted by the first device at time t−τ. Therefore, s(t−τ)=cos $\varphi_s(t-\tau)$ is the signal transmitted by the first device to arrive at the second device at time t.

The second device generates a reference signal r(t)=cos $\varphi_r(t)$. Where, assuming that the frequency of the reference signal is constant over time and equals $f_r$:$\varphi_r(t)=\varphi_r(t_0)+2\pi f_r(t-t_0)$ equation (3-3).

The receiver measures the phase difference, $\Delta\varphi(t)$, between the reference signal $\varphi_r(t)$ and the signal from the transmitter s(t−τ): $\Delta\varphi(t)=\varphi_r(t)-\varphi_s(t-\tau)-2\pi N$ equation (3-4) where, N is an integer, N=0, ±1, ±2, . . . , to account for the fact that at the receiver of the second device the phase of the transmitted signal from the first device can only be measured as a fraction of a cycle and there is an integer number of cycles between the transmitted signal from the first device and the reference of the second device as illustrated in FIG. 8. N is known as the integer ambiguity.

It may assume the perfect synchronization between the first device and the second device, i.e.: (1) frequency synchronization, i.e., $f_s=f_r=f$; and (2) timing synchronization, i.e., same time reference for both first device and second device.

Therefore, from equations (3-2), (3-3), and (3-4), following is obtained: $\Delta\varphi=\varphi_r(t_0)-\varphi_s(t_0)-2\pi N+2\pi f_r$ equation (3-5).

Assuming that the first device and the second device are also phase synchronized, i.e., $\varphi_r(t_0)=\varphi_s(t_0)$, it may get: $\Delta\varphi(t)=2\pi f\tau-2\pi N$ equation (3-6).

The propagation delay, τ, can be expressed as a sum of an integer number of cycles at the carrier frequency, N $T_c$, where $T_c$ is the carrier frequency period, and a fraction part of a cycle $T_f$, where $T_f<T_c$, i.e., $\tau=N T_c+T_f$. Let r(t−τ, t) be the distance between the first device at time t−τ and the second device at time t. Therefore, $$\frac{\Delta\phi(t)}{2\pi} = r(t-\tau, t)\frac{f}{c} - N = \frac{r(t-\tau, t)}{\lambda} - N \qquad \text{equation (3-7)}$$

where, c is the speed of light and λ is the wavelength corresponding to frequency f.

The transmitter and receiver clocks are generally not synchronized or are loosely or partially synchronized, and each keeps time independently. Let, t be a time given by a common (global) reference time. The time measured by first device is given by $t_s(t)$. This time can be given by: $t_s(t)=t+\delta t_s(t)$, where $\delta t_s(t)$ is a clock bias (i.e., an offset) between the common (global) reference time and the time of the first device, this clock bias (i.e., offset), in general, can change overtime for example due to instability of the clock. The time measured by the second device is given by $t_r(t)$. This time can be given by: $t_r(t)=t+t_r(t)$, where $\delta t_r(t)$ is a clock bias (i.e., an offset) between the common (global) reference time and the time of the second device, this clock bias (i.e., offset), in general, can change overtime for example due to instability of the clock. In one example, the difference between the common (global) reference time and the time according to the first device is constant (does not depend on time). Therefore, $t_s(t)=t+\delta t_s$. In one example, the difference between the common (global) reference time and the time according to the second device is constant (does not depend on time). Therefore, $t_r(t)=t+\delta t_r$.

If a signal is transmitted from the first device at time $t_1$, where $t_1$ is in the common (global) time reference, according to the time reference of the first device, this is at time $t_s(t_1)=t_1+\delta t_s(t_1)$. The signal arrives at the second device at time $t_2$, where $t_2$ is in the common (global) time reference, according to the time reference of the second device, this is at time $t_r(t_2)=t_2+\delta t_r(t_2)$. The transient time from the first device to the second device is $\tau=t_2-t_1$. The apparent transient time by considering the time according to the first device and the second device and is given by: $t_r(t_2)-t_s(t_1)=\tau+\delta t_r(t_2)-\delta t_s(t_1)$.

A signal is transmitted from the first device at time $t_1$ according to the common (global) reference time, which is time $t_s(t_1)=t_1+\delta t_s(t_1)$ in the time reference of the first device. Therefore, using equation (3-2), with $f_s=f$ and t is the transmit time according the time reference of the first device, i.e., $t=t_s(t_1)$: $\varphi_s(t_s(t_1))=\varphi_s(t_0)+2\pi f(t_1+\delta t_s(t_1)-t_0)$ equation (3-8).

The signal arrives at the second device at time $t_2$ according to the common (global) reference time, which is time $t_r(t_2)=t_2+\delta t_r(t_2)$ in the time reference of the second device. Therefore, using equation (3-3), with $f_r=f$ and t is the receive time according the time reference of the second device, i.e., $t=t_r(t_2)$: $\varphi_r(t_r(t_2))=(t_0)+2\pi f(t_2+\delta t_r(t_2)-t_0)$ equation (3-9). Therefore, the equation for phase difference (equation (3-6)): $\Delta\varphi(t)=\varphi_r(t_r(t_2))-\varphi_s(t_s(t_1))$, taking into account the clock biases of the first (transmit) device and second (receive) device, with $\tau=t_2-t_1$, becomes: $\Delta\varphi(t_1, t_2)=2\pi f\tau+2\pi f(\delta t_r(t_2)-\delta t_s(t_1))-2\pi N$ equation (3-10).

Hence, the equation (3-7), with clock biases becomes:

$$\frac{\Delta\phi(t)}{2\pi} = \frac{r(t-\tau, t)}{\lambda} + f(\delta t_r(t_2) - \delta t_s(t_1)) - N. \qquad \text{equation (3-11)}$$

To derive equation (3-7) and by extension equation (3-11), it may be assumed that $\varphi_r(t_0)=\varphi_s(t_0)$. If $\varphi_r(t_0)\neq\varphi_s(t_0)$, the phase difference at a reference time $t_0$, becomes an additional component in the phase difference measurement, hence equation (3-11) becomes:

$$\frac{\Delta \phi(t)}{2\pi} = \qquad\qquad \text{equation (3-12)}$$

$$\frac{r(t-\tau, t)}{\lambda} + f(\delta t_r(t_2) - \delta t_s(t_1)) + (\phi_r(t_0) - \phi_s(t_0)) - N.$$

Two issues are apparent in equation (3-12) when measuring the carrier phase. The first is the clock biases of the devices involved in the transmission and reception of the signals used to measure the carrier phase. The second is the integer ambiguity represented by N. Methods to solve the first issue include: (1) round-trip carrier phase measurement; and (2) single difference and double difference carrier phase measurement.

Both of these are explained in the following.

To solve the integer ambiguity issue, using the phase of a virtual carrier with frequency smaller than the carrier frequencies used for the RF signal is provided. Using legacy positioning techniques which could be less accurate than the carrier phase method provides an estimate of the number of full cycles for the carrier phase measurement. To assist in getting a reliable estimate of the number of cycles, a virtual frequency can be considered which is smaller than the carrier frequency used for the phase measurement.

FIG. 11 is an illustration of the round-trip carrier phase method. The gNB has a bias in its clock relative to a common (global) reference time of $\delta t_b$. The UE has a bias in its clock relative to the common (global) reference time of $\delta t_u$. A reference symbol is determined at the gNB and the UE. For example, this can be symbol 0 of a slot, a subframe, a frame or a frame with SFN 0. In an alternative example, this can be a DL PRS symbol. In an alternative example, this can be an UL PRS (or positioning SRS) symbol. In one example, the reference time of the reference signal can be the time of the transmission of the reference signal from the corresponding device. In another example, the reference time of the reference signal can be the time of the reception of the reference signal from the corresponding device.

The phase of the reference signal at the gNB's reference time ($t_b=0$) is $\varphi_{b0}$. The phase of the reference signal at the UE's reference time ($t_u=0$) is $\varphi_{u0}$.

The gNB transmits DL PRS n1, the DL PRS is transmitted after time $T_{n1}$ from the gNB's reference time. $T_n$ can be deterministically determined by knowing the reference symbol and the symbol of the PRS. In one example, $T_n$ includes the CP of symbol n1 (DL PRS symbol). In another example, $T_n$ is to the start of symbol n1 (DL PRS symbol). In one example, the phase of symbol n1 (DL PRS symbol) is $\varphi_{b1}$. In one example, $\varphi_{b1}=0$. In one example, $\varphi_{b1}$ is after the CP of symbol n1 (DL PRS symbol). In one example, $\varphi_{b1}$ is at the start of symbol n1 (DL PRS symbol).

The UE receives symbol n1 (DL PRS symbol) after a propagation delay of $\tau$. As illustrated in FIG. 11, symbol n1 (DL PRS symbol) is received after time $T_{n1}+\tau+\delta t_b-\delta t_u$ from the UE's reference time. In FIG. 11, the receive time is after the CP of symbol n1 (DL PRS symbol). In an alternative example, the receive time is at the start of symbol n1 (DL PRS symbol). The UE can measure the phase difference between the UE's reference signal and the received signal. This phase difference is: $\Delta\phi_{ue}=(\varphi_{u0}+(T_{n1}+\tau+\delta t_b-\delta t_u)2\pi f_c-\varphi b_1)$ mod $2\pi$.

The UE transmits UL PRS (positioning SRS) n2, the UL PRS (positioning SRS) is transmitted after time $T_{n2}$ from the UE's reference time. $T_{n2}$ can be deterministically determined, by knowing the reference symbol and the symbol of the UL PRS (positioning SRS) and the time advance at the UE (e.g., the difference in between the start of UL slot or subframe or frame and a corresponding DL slot or subframe or frame respectively). In one example, $T_{n2}$ includes the CP of symbol n2 (UL PRS symbol or positioning SRS symbol). In another example, $T_{n2}$ is to the start of symbol n2 (UL PRS symbol or positioning SRS symbol). In one example, the phase of symbol n2 (UL PRS symbol or positioning SRS symbol) is $\varphi_{u2}$. In one example, $\varphi_{u2}=0$. In one example, $\varphi_{u2}$ is after the CP of symbol n2 (UL PRS symbol or positioning SRS symbol). In one example, $\varphi_{u2}$ is at the start of symbol n2 (UL PRS symbol or positioning SRS symbol).

The gNB receives symbol n2 (UL PRS symbol or positioning SRS symbol) after a propagation delay of $\tau$. As illustrated in FIG. 11, symbol n2 (UL PRS symbol or positioning SRS symbol) is received after time $T_{n2}+\tau-\delta t_b+\delta t_u$ from the gNB's reference time. In FIG. 11, the receive time is after the CP of symbol n2 (UL PRS symbol or positioning SRS symbol). In an alternative example, the receive time is at the start of symbol n2 (UL PRS symbol or positioning SRS symbol). The gNB can measure the phase difference between the gNB's reference signal and the received signal. This phase difference is $\Delta\phi_{bs}=(\varphi_{b0}+(T_{n2}\tau-\delta t_b+\delta t_u)2\pi f_c-\varphi_{u2})$ mod $2\pi$.

By adding $\Delta\phi_{ue}$ and $\Delta\phi_{bs}$, the clock biases of the UE and gNB are eliminated. $\Delta\phi_{ue}+\Delta\phi_{bs}=(\varphi_{u0}+(T_{n1}+T_{n2}+2\tau)2\pi f_c-\varphi_{b1}-\varphi_{u2})$ mod $2\pi$.

In a variant example, the measured phase at the UE can remove the phase effect of $T_{n1}$, i.e., $\Delta\varphi_{ue}=\Delta\phi_{ue}-T_{n1}2\pi f_c=(\phi_{u0}+(\tau+\delta t_b-\delta t_u)2\pi f_c-\phi_{b1})$ mod $2\pi$.

Similarly, the measured phase at the gNB can remove the phase effect of $T_{n2}$, i.e., $\Delta\varphi_{bs}=\Delta\phi_{bs}-T_{n2}2\pi f_c=(\varphi_{b0}+(\tau-\delta t_b+\delta t_u)2\pi f_c-\varphi_{u2})$ mod $2\pi$.

Adding, $\Delta\varphi_{ue}$ and $\Delta\varphi_{bs}$, it may get: $\Delta\varphi_{ue}+\Delta\varphi_{bs}=(\varphi_{u0}+\varphi_{b0}+(2\tau)2\pi f_c-\varphi_{b1}-\varphi_{u2})$ mod $2\pi$.

$T_{n1}$ and $T_{n2}$ can be determined by knowing the reference symbols and symbols of DL PRS and UL PRS (or positioning SRS) and the time advance at the UE (e.g., the difference in between the start of UL slot or subframe or frame and a corresponding DL slot or subframe or frame respectively). $\varphi b1$ and $\varphi_{u2}$ can be specified in the system specification and/or configured or updated by RRC signaling and/or MAC CE signaling and/or L1 control signaling. Alternatively, $\varphi_{b1}$ and $\varphi_{u2}$ can be reported by the gNB and UE respectively. $\varphi_{b0}$ and $\varphi_{u0}$ can be reported by the gNB and UE respectively as separate parameters or can be included in the corresponding phase measurement. Alternatively, the value of $\varphi_{b0}=0$, and $\varphi_{u0}=0$ Hence knowing $\Delta\varphi_{ue}$ and $\Delta\varphi_{bs}$ the propagation delay $\tau$ and corresponding the distance can be determined. While the clock biases have been eliminated by adding $\Delta\varphi_{ue}$ and $\Delta\varphi_{bs}$, the integer ambiguity is still there.

FIG. 11 illustrates that symbol n1, e.g., DL PRS symbol, is transmitted before symbol n2, e.g., UL PRS (or positioning SRS) symbol. In an alternative example, UL PRS (or positioning SRS) symbol is transmitted before DL PRS symbol.

Figure 20:
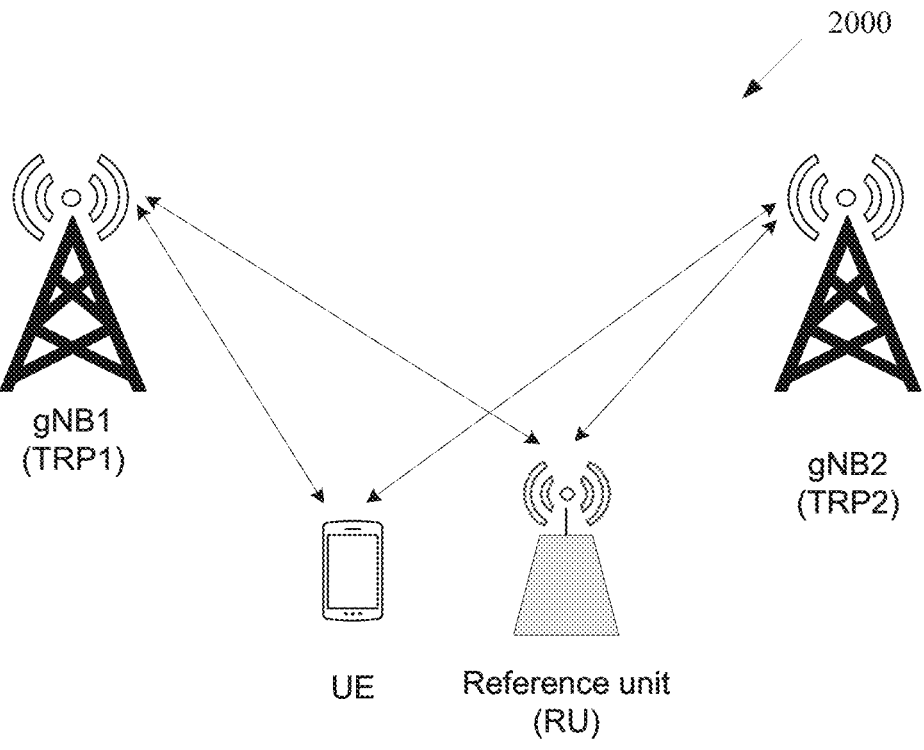
FIG. 20 illustrates examples of network architecture according to embodiments of the present disclosure.

FIG. 20 illustrates examples of network architecture 2000 according to embodiments of the present disclosure. The embodiment of the network architecture 2000 illustrated in FIG. 20 is for illustration only.

An alternative method to eliminate the clock biases between the UE and gNB is to use the single difference carrier phase measurement and double difference carrier phase measurement. Consider a network, as illustrated in FIG. 20, that includes at least a UE, which is being positioned, two gNBs (or TRPs) and a reference device or unit (e.g., a device or unit whose position is known) referred to as RU or positioning reference unit (PRU).

The first gNB, i.e., gNB1 has a bias in its clock relative to a common (global) reference time of $\delta t_{b1}$. The second gNB, i.e., gNB2 has a bias in its clock relative to a common (global) reference time of $\delta t_{b2}$. The UE has a bias in its clock relative to the common (global) reference time of $\delta t_{ue}$. The reference unit (RU) has a bias in its clock relative to the common (global) reference time of $\delta t_{ru}$.

A reference symbol is determined at the gNB1, gNB2, UE and RU. For example, this can be symbol 0 of a slot, a subframe, a frame or a frame with SFN 0. In an alternative example, this can be a DL PRS symbol. In an alternative example, this can be an UL PRS (or positioning SRS) symbol. In one example, the reference time of the reference signal can be the time of the transmission of the reference signal from the corresponding device. In another example, the reference time of the reference signal can be the time of the reception of the reference signal from the corresponding device.

The phase of the reference signal at the gNB1's reference time $(t_{b1}=0)$ is $\varphi_{b01}$. The phase of the reference signal at the gNB2's reference time $(t_{b2}=0)$ is $\varphi_{b02}$. The phase of the reference signal at the UE's reference time $(t_{ue}=0)$ is $\varphi_{ue0}$ The phase of the reference signal at the RU's reference time $(t_{ru}=0)$ is $\varphi_{ru0}$.

A gNB/transmits DL PRS n11, the DL PRS is transmitted after time $T_{n11}$ from gNB1's reference time. $T_{n11}$ can be deterministically determined by knowing the reference symbol and the symbol of the PRS. In one example, $T_{n11}$ includes the CP of symbol n11 (DL PRS symbol). In another example, $T_{n11}$ is to the start of symbol n1 (DL PRS symbol). In one example, the phase of symbol n11 (DL PRS symbol) is $\varphi_{b11}$. In one example, $\varphi_{b11}=0$. In one example, $\varphi_{b11}$ is after the CP of symbol n11 (DL PRS symbol). In one example, $\varphi_{b11}$ is at the start of symbol n11 (DL PRS symbol).

The UE receives symbol n11 (DL PRS symbol) after a propagation delay of $\tau 1$. Symbol n11 (DL PRS symbol from gNB1) is received after time $T_{n11}+\tau 1+\delta t_{b1}-\delta t_{ue}$ from the UE's reference time. The UE can measure the phase difference between the UE's reference signal and the received signal. This phase difference is: $\Delta\phi_{ue1}=(\varphi_{ue0}(T_{n11}+\tau 1+\delta t_{b1}-\delta t_{ue})2\pi f_c-\varphi_{b11})$ mod $2\pi$.

Similarly, gNB2 transmits a DL PRS symbol n12 after time $T_{n12}$ from gNB2's reference time. Symbol n12 is transmitted with phase $\varphi_{b12}$. The UE receives symbol n12 (DL PRS symbol) after a propagation delay of $\tau 2$. The UE can measure the phase difference between the UE's reference signal and the received signal. This phase difference can be shown to equal: $\Delta\phi_{ue2}=((T_{n12}+\tau 2+\delta t_{b2}-\delta t_{ue})2\pi f_c-$ mod $2\pi$.

The equations for $\Delta\phi_{ue1}$ and $\Delta\phi_{ue2}$, include the clock bias of gNB1, $\delta t_{b1}$, gNB2, $\delta t_{b2}$ as well as the UE $\delta t_{ue}$. By subtracting the two equations, it may get the single difference, which eliminates the clock bias of the UE, i.e., $\Delta\phi_{ue-sd}=\Delta\phi_{ue1}-\Delta\phi_{ue2}=((T_{n11}-T_{n12}+\tau 1-\tau 2+\delta t_{1b}-\delta t_{b2})2\pi f_c-\varphi_{b11}+\varphi_{b12})$ mod $2\pi$.

It similarly can calculate the single difference carrier phase of the RU. In the following equation, it is assumed that the RU uses the same DL PRS symbols n11 and n12 for its phase measurement, however different symbols can be used as well, different from those used for the UE. The RU receives symbol n11 (DL PRS symbol from gNB1) after a propagation delay of $\tau 1_{ru}$. The RU receives symbol n12 (DL PRS symbol from gNB2) after a propagation delay of $\tau 2_{ru}$. The single difference for the RU is given by: $\Delta\phi_{ru-sd}=(\varphi_{ru0}+(T_{n11}-T_{n12}+\tau 1_{ru}-\tau 2_{ru}+\delta t_{b1}-\delta t_{b2})2\pi f_c-\varphi_{b11}+\varphi_{b12})$ mod $2\pi$.

If the single difference carrier phase of the RU is subtracted from the single difference carrier phase of the UE, it may get the double difference carrier phase. This is given by: $\Delta\phi_{ru-us}=\Delta\phi_{ue-sd}-\Delta\phi_{ru-sd}=(((\tau 1-\tau 2)-(\tau 1_{ru}-\tau 2_{ru}))2\pi f_c)$ mod $2\pi$.

In the double difference equation, $\Delta\phi_{ue-dd}$, the clock biases and phase biases for all devices have been eliminated. The remaining factor is $(\tau 1_{ru}-\tau 2_{ru})$. However, the location of the RU is known, the difference in propagation delay from gNB1 and gNB2 to the RU can be also known. $\Delta\phi_{ue-dd}$ can be expressed as: $\Delta\phi_{ue-dd}=((\tau 1-\tau 2)-(\tau 1_{ru}-\tau 2_{ru}))2\pi f_c-2\pi N$ where, N is the integer ambiguity given by N=0, +1, +2, . . . .

While the previous description for the double difference phase was described for DL PRS, it can also be applied to UL PRS (positioning SRS). In this case, each gNB measures the phase of the signal received from the UE and RU. The measurements can be provided to the LMF or to one of the gNB or the UE, where the difference between the phase measured at each gNB is calculated for the UE and RU respectively (single difference). The difference between the single difference phase of the UE and the single difference phase of the RU is then calculated to get the double difference phase that eliminates the clock biases.

The accuracy of the carrier phase measurement can be in the range of 0.01 to 0.05 cycles. For a carrier frequency of 3 GHz, the wavelength is 10 cm, this corresponds to 1 mm to 5 mm, which is well within the cm-level accuracy.

Figure 21:
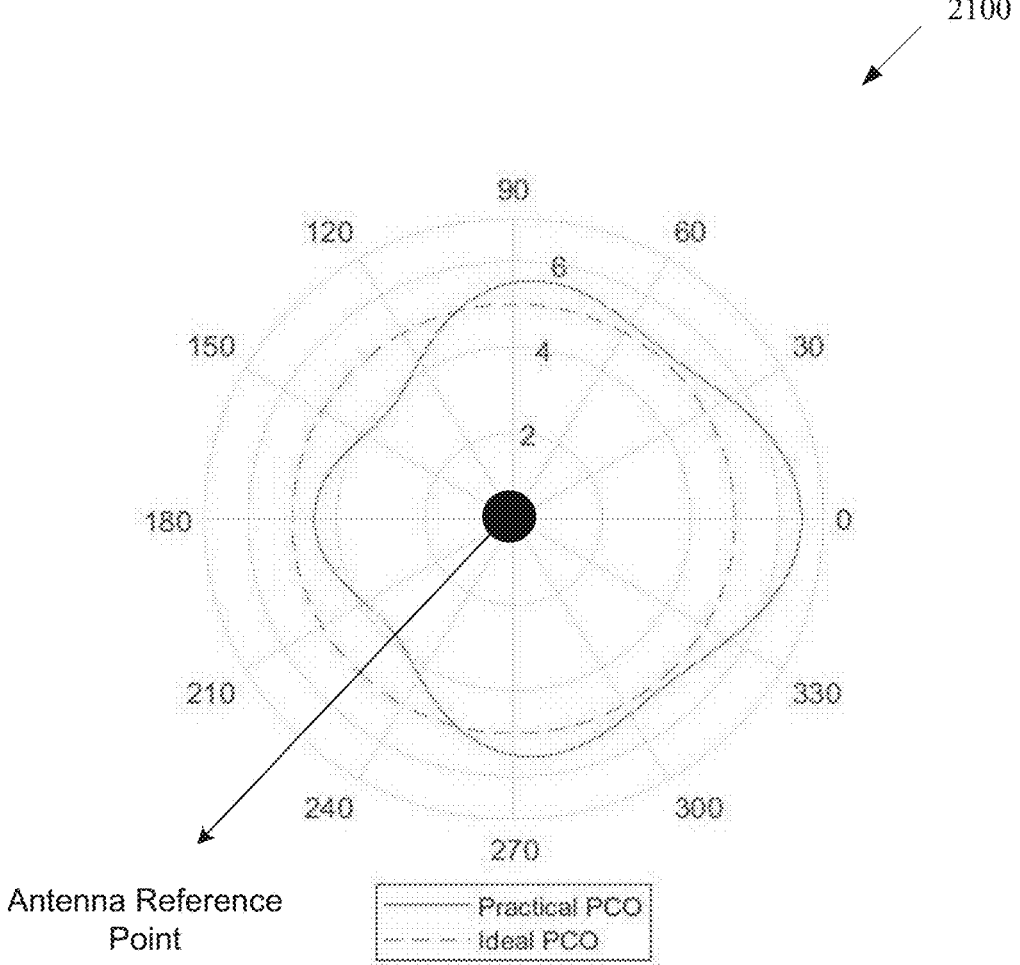
FIG. 21 illustrates examples of phase center offset according to embodiments of the present disclosure.

FIG. 21 illustrates examples of phase center offset 2100 according to embodiments of the present disclosure. The embodiment of the phase center offset 2100 illustrated in FIG. 21 is for illustration only.

Another issue with the carrier phase method is the phase center offset. The phase center offset manifests itself as an additional phase shift (or offset) that gets added to the signal, where the value of the phase shift depends on direction. For example, the direction the signal is received in or the direction the signal is transmitted in. An example of the phase center offset (PCO) can be as illustrated in FIG. 21, where it is evident that the phase shift changes with direction.

The phase center offset in general is not a linear function as illustrated in FIG. 21. However, a first order approximation can linearize the model within a small angular spread around a reference direction. In this case, the phase center offset can be expressed as: $PCO(\theta)=\alpha(\theta-\theta_0)+PCO(\theta_0)$ where $\theta_0$ is a reference direction, $\theta$ is the angle the signal is received or transmitted in. $|\theta-\theta_0|$ is small for the linear model to be valid or accurate. $\alpha$ is a constant.

In the present disclosure, methods are provided to mitigate the effect of the center phase offset.

The present disclosure relates to a 5G/NR communication system.

The preset disclosure introduces signaling and methods for mitigating the phase center offset by measuring the phase of multiple signals within a small angular spread, and subtracting the measured phases to eliminate the effect of the phase center offset.

In one example, the DL positioning reference signal (e.g., DL PRS) in this disclosure is a reference signal designed for the carrier-phase method.

In one example, the DL positioning reference signal (e.g., DL PRS) in this disclosure is a reference signal introduced in the Rel-16 and Rel-17 3GPP specifications for positioning.

In one example, the UL positioning reference signal (e.g., positioning sounding reference signal—Pos-SRS) in this disclosure is a reference signal designed for the carrier-phase method.

In one example, the UL positioning reference signal (e.g., positioning sounding reference signal—Pos-SRS) in this disclosure is a reference signal introduced in the Rel-16 and Rel-17 3GPP specifications for positioning.

The propagation delay between the gNB and UE can be expressed as: $T_p = N \cdot T_c + T_f$ where: $T_c$ is the period of the carrier, $$T_c = \frac{1}{f_c} \cdot f_c$$

is the frequency of the carrier; and $T_f$ corresponds to a time of a partial cycle $T_f < T_c$.

The carrier phase in this case is given by: $\phi = 2\pi f_c T_p$ mod $2\pi = 2\pi f_c d/c$ mod $2\pi$, and $\phi = 2\pi f_c T_p - 2\pi N = 2\pi f_c d/c - 2\pi N$. N is the integer ambiguity, where N=0, ±1, ±2, . . . .

Now it may consider that the double carrier phase method is used. The effect of the phase center offset is described by the following equations.

A first gNB, gNB1, transmits a DL PRS to the UE. The UE can measure the phase difference between the UE's reference signal and the received signal. This phase difference is: $\Delta\phi_{ue1} = (\varphi_{u0} + (T_{n11} + \tau_1 + \delta t_{b1} - \delta t_u)2\pi f_c - \varphi_{b11})$ mod $2\pi + \alpha(\theta_1 - \theta_0) + PCO(\theta_0)$.

The term $\alpha(\theta_1 - \theta_0) + PCO(\theta_0)$ is the phase center offset at angle $\theta_1$. $\theta_0$ is a reference direction, and $|\theta_1 - \theta_0|$ is small enough for the linear phase center offset model to be valid.

Similarly, for a second gNB, gNB2, transmits a DL PRS to the UE. The UE can measure the phase difference between the UE's reference signal and the received signal. This phase difference is: $\Delta\phi_{ue2} = (\varphi_{u0} + (T_{n12} + \tau_2 + \delta t_{b2} - \delta t_u)2\pi f_c - \varphi_{b12})$ mod $2\pi + \alpha(\theta_2 - \theta_0) + PCO(\theta_0)$.

The term $\alpha(\theta_2 - \theta_0) + PCO(\theta_0)$ is the phase center offset at angle $\theta_2$. $\theta_0$ is a reference direction, and $|\theta_2 - \theta_0|$ is small enough for the linear phase center offset model to be valid.

The single difference carrier phase for signals transmitted from gNB1 and gNB2 is given by: $\Delta\phi_{ue12-sd} = \Delta\phi_{ue1} - \Delta\phi_{ue2} = ((T_{n11} - T_{n12} + \tau_1 - \tau_2 + \delta t_{b1} - \delta t_{b2})2\pi f_c - \varphi_{b11} + \varphi_{b12})$ mod $2\pi + \alpha(\theta_1 - \theta_2)$.

The impact of center phase offset on the single difference carrier phase is evident in the term: $\alpha(\theta_1 - \theta_2)$. Now it may eliminate the effect of the centre phase offset. It may consider that a third base station gNB3 with a ray arriving at angle $\theta_3$ that is close to the reference direction $\theta_0$, the measured phase difference of a DL PRS transmitted from gNB3 at the UE taking into account the phase centre offset is given by: $\Delta\phi_{ue3} = (\varphi_{u0}(T_{n13} + \tau 3 + \delta t_{b3} - \delta t_u)2\pi f_c - \varphi_{b13})$ mod $2\pi + \alpha(\theta_3 - \theta_0) + PCO(\theta_0)$.

Now it may calculate the single difference carrier phase between gNB3 and gNB2, it may get: $\Delta\phi_{ue32-sd} = \Delta\phi_{ue3} - \Delta\phi_{ue2} = ((T_{n13} - T_{n12} + \tau_3 - \tau_2 + \delta t_{b3} - \delta t_{b2})2\pi f_c - \varphi_{b13} + \varphi_{b12})$ mod $2\pi + \alpha(\theta_3 - \theta_2)$.

This equation too, as the effect of the centre phase offset evident in the term: $\alpha(\theta_3 - \theta_2)$. To eliminate, the effect of the centre phase offset, it may calculate a second single difference carrier phase as follows:

$$\Delta\varphi_{ue-2sd} = \frac{\Delta\varphi_{ue12-sd}}{\theta_1 - \theta_2} - \frac{\Delta\varphi_{ue32-sd}}{\theta_3 - \theta_2}.$$

Therefore, $$\Delta\varphi_{ue-2sd} = \frac{((T_{n11} - T_{n12} + \tau_1 - \tau_2 + \delta t_{b1} - \delta t_{b2})2\pi f_c - \phi_{b11} + \phi_{b12})\text{mod}2\pi}{\theta_1 - \theta_2} -$$

-continued
$$\frac{((T_{n13} - T_{n12} + \tau_3 - \tau_2 + \delta t_{b3} - \delta t_{b2})2\pi f_c - \phi_{b13} + \phi_{b12})\text{mod}2\pi}{\theta_3 - \theta_2}.$$

Now consider a reference unit (RU). The RU has been calibrated for phase center offset, hence effect of the center phase offset is absent from the equation. The single difference carrier phase between gNB1 and gNB2 is calculated at the RU is given by: $\Delta\varphi_{ru12-sd} = \Delta\phi_{ue1} - \Delta\phi_{ue2} = ((T_{n11} - T_{n12} + \tau_{1ru} - \tau_{2ru} + \delta t_{b1} - \delta t_{b2})2\pi f_c - \varphi_{b11} + \varphi_{b12})$ mod $2\pi$.

Similarly, the single difference carrier phase between gNB3 and gNB2 is calculated at the RU is given by: $\Delta\varphi_{ru32-sd} = \Delta\phi_{ue3} - \Delta\phi_{ue2} = ((T_{n13} - T_{n12} + \tau_{3ru} - \tau_{2ru} + \delta t_{b3} - \delta t_{b2} - \varphi_{b13} + \varphi_{b12})2\pi f_c)$ mod $2\pi$.

Subtract $\Delta\varphi_{ru32-sd}$ from $\Delta\varphi_{ru12-sd}$ after dividing by $\theta_3 - \theta_2$ and $\theta_1 - \theta_2$ respectively, where $\theta_1$, $\theta_2$, and $\theta_3$ are the angles at the UE. Hence, it may get the second single difference carrier phase of the RU:

$$\Delta\varphi_{ru-2sd} = \\ \frac{((T_{n11} - T_{n12} + \tau_{1ru} - \tau_{2ru} + \delta t_{b1} - \delta t_{b2})2\pi f_c - \phi_{b11} + \phi_{b12})\text{mod}2\pi}{\theta_1 - \theta_2} - \\ \frac{((T_{n13} - T_{n12} + \tau_{3ru} - \tau_{2ru} + \delta t_{b3} - \delta t_{b2})2\pi f_c - \phi_{b13} + \phi_{b12})\text{mod}2\pi}{\theta_3 - \theta_2}.$$

If the second single difference carrier phase of the RU is subtracted from the second single difference carrier phase of the UE, it may get the quantity that can be referred to as the second double difference carrier phase which is given by:

$$\Delta\varphi_{ue-2dd} = \frac{(((\tau_1 - \tau_2) - (\tau_{1ru} - \tau_{2ru}))2\pi f_c)\text{mod}2\pi}{\theta_1 - \theta_2} - \\ \frac{(((\tau_3 - \tau_2) - (\tau_{3ru} - \tau_{2ru}))2\pi f_c)\text{mod}2\pi}{\theta_3 - \theta_2}.$$

In the second double difference equation $\Delta\phi_{ue-2dd}$, the clock biases and phase biases for all devices have been eliminated. The factors $(\tau_{1ru} - \tau_{2ru})$ and $(\tau_{3ru} - \tau_{2ru})$ are known. Hence, the final equation of the second double difference relates $\tau_1$, $\tau_2$ and $\tau_3$ that can be used for determining the positioning of the UE.

In one example, the UE is configured to report phase measurement for at least 3 gNBs, e.g., $\Delta\phi_{ue1}$, $\Delta\phi_{ue2}$ and $\Delta\phi_{ue3}$ for PRS configured for gNB1, gNB2 and gNB3.

In one example, the UE is configured to report the single difference carrier phase between gNB1 and gNB2 and between gNB3 and gNB2, for example, the UE can report $\Delta\phi_{ue12-sd} = \Delta\phi_{ue1} - \Delta\phi_{ue2}$ and $\Delta\phi_{ue32-sd} = \Delta\phi_{ue3} - \Delta\phi_{ue2}$ respectively.

In one example, the UE is configured to report the angle of arrival from gNB1, gNB2, and gNB3, denoted as $\theta_1$, $\theta_2$ and $\theta_3$ respectively.

In one example, the angles $\theta_1$, $\theta_2$ and $\theta_3$ are relative to the UE's co-ordinate system.

In one example, the angles $\theta_1$, $\theta_2$ and $\theta_3$ are relative to a global co-ordinate system.

In one example, the angles $\theta_1$, $\theta_2$ and $\theta_3$ are relative to reference direction $\theta_0$.

In one example, the UE is configured to report $\theta_0$ relative to the UE's co-ordinate system.

In one example, the UE is configured to report $\theta_0$ relative to a global co-ordinate system.

In one example, the UE does not report $\theta_0$.

In one example, the angles $\theta_1$, $\theta_2$ and $\theta_3$ are co-planer (in the same plane).

In one example, the UE is configured to report the difference in angle of arrival from gNB1, gNB2, and gNB3, e.g., $\theta_1 - \theta_2$, $\theta_3 - \theta_2$.

In one example, the UE selects gNB1, gNB2, gNB3, . . . such that $|\theta_i - \theta_0| < \Delta_\theta$, or $|\theta_i - \theta_0| \leq \Delta_\theta$, wherein i=1, 2, 3, . . . . Wherein, $\Delta_\theta$ can be specified in the system specifications and/or configured or updated by higher layer RRC signaling and/or MAC CE signaling and/or L1 control signaling. In one example, if $\Delta_\theta$ is configured, the configured value is used, otherwise a system specified (e.g., default) value is used. The UE can select $\theta_0$ by its implementation, or it can be determined by a rule, for example as a function of $\theta_1$, $\theta_2$, $\theta_3$, for example this function can be the average of these values or one of these values.

In one example, UE selects gNB1, gNB2, gNB3, . . . such that $|\theta_i - \theta_j| < \Delta_\theta$, or $|\theta_i - \theta_0| < \Delta_\theta$, wherein i=1, 2, 3, . . . and j=1, 2, 3, . . . . Wherein, $\Delta_\theta$ can be specified in the system specifications and/or configured or updated by higher layer RRC signaling and/or MAC CE signaling and/or L1 control signaling. In one example, if $\Delta_\theta$ is configured, the configured value is used, otherwise a system specified (e.g., default) value is used.

In one example, the angle of arrival can be measured as described in the equation (B) by measuring the phase at different elements of an antenna array.

The description of the method above is to mitigate the phase center offset of the UE. The phase center offset of the gNB can be mitigated using a similar method. Alternatively, the phase center offset of the gNB can be measured as a function of direction and compensated based on this measurement.

This procedure can also be applied to positioning reference signals transmitted in the UL direction (positioning SRS), where the phase measurement is performed at the gNB.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, from a first transmit receive point (TRP), a first downlink (DL) position reference signal (PRS); and
a processor operably coupled to the transceiver, the processor configured to perform a measurement for the DL PRS, and wherein the transceiver is further configured to transmit, to the first TRP, a first report for the measurement,
wherein the first report includes a DL reference signal carrier phase (RSCP) associated with a center frequency for the DL PRS, and
wherein the DL RSCP is associated with a first path derived from first resource elements for carrying the DL PRS.

2. The UE of claim 1, wherein the first report further includes at least one of a UE receive-transmit time difference, a DL PRS reference signal received power (RSRP), and a DL PRS reference signal received path power (RSRPP) of the DL PRS.

3. The UE of claim 1, wherein the first report further includes a time stamp indicating a symbol index associated with the DL RSCP.

4. The UE of claim 1, wherein the first report further includes a line of sight (LoS) indicator or a non line of sight (NLOS) indicator.

5. The UE of claim 1, wherein the transceiver is further configured to transmit, to a second TRP, an uplink (UL) sounding reference signal (SRS) for positioning of an UL RSCP associated with a center frequency of the UL SRS.

6. The UE of claim 5, wherein:
the UL SRS is for the positioning of at least one of a relative time of arrival (RTOA), an UL SRS reference signal received power (RSRP), and an UL SRS reference signal received path power (RSRPP), and
the UL RSCP is associated with a second path derived from second resource elements for carrying the UL SRS.

7. A transmit receive point (TRP) comprising:
a processor; and
a transceiver operably coupled to the processor, the transceiver configured to:
transmit, to a user equipment (UE), a downlink (DL) positioning reference signal (PRS); and
receive, from the UE, a first report for a measurement,
wherein the first report includes a DL reference signal carrier phase (RSCP) associated with a center frequency for the DL PRS, and
wherein the DL RSCP is associated with a first path derived from first resource elements for carrying the DL PRS.

8. The TRP of claim 7, wherein the first report further includes at least one of a UE receive-transmit time difference, a DL PRS reference signal received power (RSRP), and a DL PRS reference signal received path power (RSRPP) of the DL PRS.

9. The TRP of claim 7, wherein the first report further includes a time stamp indicating a symbol index associated with the DL RSCP.

10. The TRP of claim 7, wherein the first report further includes a line of sight (LoS) indicator or a non line of sight (NLOS) indicator.

11. The TRP of claim 8, wherein:
the transceiver is further configured to receive, from a second UE, an uplink (UL) sounding reference signal (SRS) for positioning,
the processor is further configured to perform a measurement for a UL RSCP based on the UL SRS, and
the UL RSCP is associated with a center frequency of the UL SRS.

12. The TRP of claim 11, wherein at least one of a relative time of arrival (RTOA), an UL SRS reference signal received power (RSRP), and an UL SRS reference signal received path power (RSRPP) is measured based on the UL SRS.

13. A method of operating a user equipment (UE), the method comprising:

receiving, from a first transmit receive point (TRP), a first downlink (DL) position reference signal (PRS), performing a measurement for the first DL PRS, and transmitting, to the first TRP, a first report for the measurement, wherein the first report includes a DL reference signal carrier phase (RSCP) associated with a center frequency for the DL PRS, and wherein the DL RSCP is associated with a first path derived from first resource elements for carrying the DL PRS.

14. The method of claim 13, wherein the first report further includes at least one of a UE receive-transmit time difference, a DL PRS reference signal received power (RSRP), and a DL PRS reference signal received path power (RSRPP) of the DL PRS.

15. The method of claim 13, wherein the first report further includes a time stamp indicating a symbol index associated with the DL RSCP.

16. The method of claim 13, wherein the first report further includes a line of sight (LoS) indicator or a non line of sight (NLOS) indicator.

17. The method of claim 13, further comprising transmitting, to a second TRP, an uplink (UL) sounding reference signal (SRS) for positioning of an UL RSCP associated with a center frequency of the UL SRS wherein the first DL PRS has a continuous phase across symbols within a slot.

18. The method of claim 17, wherein;

the UL SRS is for the positioning of at least one of a relative time of arrival (RTOA), an UL SRS reference signal received power (RSRP), and an UL SRS reference signal received path power (RSRPP), and the UL RSCP is associated with a second path derived from second resource elements for carrying the UL SRS.

* * * * *